United States Patent
Moeller et al.

(10) Patent No.: US 9,410,315 B2
(45) Date of Patent: Aug. 9, 2016

(54) CURTAIN WALL PANEL BRACKET LEVELING SYSTEM

(71) Applicant: Illinois Tool Works Inc., Glenview, IL (US)

(72) Inventors: Larry Moeller, Schaumburg, IL (US); Stanislaw Piotrowski, Addison, IL (US); James C. Fournier, Gurnee, IL (US); Gary Lind, Franklin Park, IL (US); Frank Otte, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/637,071

(22) Filed: Mar. 3, 2015

(65) Prior Publication Data

US 2015/0176288 A1 Jun. 25, 2015

Related U.S. Application Data

(63) Continuation of application No. 14/095,051, filed on Dec. 3, 2013, now Pat. No. 9,068,347.

(60) Provisional application No. 61/734,741, filed on Dec. 7, 2012.

(51) Int. Cl.
*E04H 1/00* (2006.01)
*E04H 3/00* (2006.01)
*E04H 5/00* (2006.01)
(Continued)

(52) U.S. Cl.
CPC ............... *E04B 2/90* (2013.01); *E04B 1/4157* (2013.01); *E04B 2/88* (2013.01); *E04F 13/23* (2013.01); *F16B 5/0225* (2013.01); *E04B 1/4121* (2013.01); *F16B 5/0233* (2013.01)

(58) Field of Classification Search
CPC ........... E04B 2/90; E04B 2/88; E04B 1/4121; E04B 4/4157; E04B 5/0225; F16B 5/0225; F16B 5/0233; E04F 13/23; E04G 17/0658
USPC ............... 52/126.1, 126.3, 126.4, 126.6, 235, 52/699, 707
See application file for complete search history.

(56) References Cited

U.S. PATENT DOCUMENTS

| | | | |
|---|---|---|---|
| 975,242 | A | 11/1910 | Higgins et al. |
| 1,199,077 | A | 9/1916 | James |

(Continued)

FOREIGN PATENT DOCUMENTS

| | | |
|---|---|---|
| DE | 20 2009 002973 U1 | 6/2009 |
| EP | 1 467 038 A1 | 10/2004 |

(Continued)

OTHER PUBLICATIONS

FFI Rapid Spaces for Aluminum & PVC Vinyl Frames, Functional Fenestraition Inc. website, printed Apr. 18, 2011 (2 pages).

(Continued)

*Primary Examiner* — Brian Mattei
(74) *Attorney, Agent, or Firm* — Neal, Gerber & Eisenberg LLP

(57) ABSTRACT

Various embodiments of the present disclosure provide a curtain wall panel bracket leveling system that facilitates leveling a panel bracket mounted to a fixture (such as an embedment or an anchor array) cast in a concrete slab.

24 Claims, 52 Drawing Sheets

(51) Int. Cl.
*E04H 6/00* (2006.01)
*E04H 14/00* (2006.01)
*E04B 2/90* (2006.01)
*E04B 2/88* (2006.01)
*F16B 5/02* (2006.01)
*E04F 13/23* (2006.01)
*E04B 1/41* (2006.01)

(56) References Cited

U.S. PATENT DOCUMENTS

| | | |
|---|---|---|
| 1,382,082 A | 6/1921 | Heltzel |
| 1,643,578 A | 9/1927 | Eaton et al. |
| 2,301,306 A | 11/1942 | McDonald |
| 2,971,616 A | 2/1961 | Bayley, Jr. |
| 3,124,222 A | 3/1964 | Mote |
| 3,219,308 A | 11/1965 | Halstead |
| 3,266,207 A | 8/1966 | Birum, Jr. |
| 3,266,210 A | 8/1966 | Abraham |
| 3,316,681 A | 5/1967 | Eber |
| 3,376,010 A | 4/1968 | Myer |
| 3,719,014 A | 3/1973 | Sukolics |
| 3,722,165 A | 3/1973 | Forsberg et al. |
| 3,797,191 A | 3/1974 | Sukolics |
| 3,912,218 A | 10/1975 | Lister et al. |
| 3,913,287 A | 10/1975 | Chapman, Jr. |
| 3,936,986 A | 2/1976 | Steel |
| 3,960,356 A | 6/1976 | Adams |
| 3,963,210 A | 6/1976 | Macklin |
| 3,974,608 A | 8/1976 | Grearson |
| 4,009,549 A | 3/1977 | Hala |
| 4,055,923 A | 11/1977 | Biebuyck |
| 4,074,486 A | 2/1978 | Grearson |
| 4,261,544 A | 4/1981 | Addison |
| 4,307,551 A | 12/1981 | Crandell |
| 4,418,506 A | 12/1983 | Weber et al. |
| 4,423,576 A | 1/1984 | Farina et al. |
| 4,438,610 A | 3/1984 | Fifer |
| 4,506,482 A | 3/1985 | Pracht et al. |
| 4,543,755 A | 10/1985 | Crandell |
| 4,577,450 A | 3/1986 | Large |
| 4,644,711 A | 2/1987 | Eickhof |
| 4,662,145 A | 5/1987 | Tanikawa et al. |
| 4,685,263 A | 8/1987 | Ting |
| 4,712,345 A | 12/1987 | Kaminaga |
| 4,738,065 A | 4/1988 | Crandell |
| 4,768,322 A | 9/1988 | Kafarowski |
| 4,782,635 A | 11/1988 | Hegle |
| 4,783,941 A | 11/1988 | Loper et al. |
| 4,798,035 A | 1/1989 | Mitchell et al. |
| 4,831,805 A | 5/1989 | Noborisaka et al. |
| 4,883,590 A | 11/1989 | Papp |
| 4,899,508 A | 2/1990 | Biebuyck |
| 4,903,454 A | 2/1990 | Rose |
| 4,905,435 A | 3/1990 | Horst |
| 4,905,444 A | 3/1990 | Semaan |
| 4,922,670 A | 5/1990 | Naka et al. |
| 4,951,438 A | 8/1990 | Thoresen |
| 4,996,804 A | 3/1991 | Naka et al. |
| 5,048,254 A | 9/1991 | Merlau |
| 5,063,718 A | 11/1991 | Nonis |
| 5,067,272 A | 11/1991 | Constantz |
| 5,072,557 A | 12/1991 | Naka et al. |
| 5,118,060 A | 6/1992 | Spronken |
| 5,239,798 A | 8/1993 | Saito |
| 5,240,543 A | 8/1993 | Fetterhoff |
| 5,333,423 A | 8/1994 | Propst |
| 5,390,468 A | 2/1995 | Probst |
| 5,415,510 A | 5/1995 | Funaki et al. |
| 5,449,542 A | 9/1995 | Chiba et al. |
| 5,548,939 A | 8/1996 | Carmical |
| 5,671,576 A * | 9/1997 | Kluser ............... 52/512 |
| 6,282,860 B1 | 9/2001 | Ramirez |
| 6,658,804 B2 | 12/2003 | Leytes et al. |
| 6,729,080 B1 | 5/2004 | Zambelli et al. |
| 7,533,501 B2 | 5/2009 | Neal |
| 7,681,366 B2 | 3/2010 | De Gobbi |
| 8,347,906 B1 | 1/2013 | Ismert et al. |
| 2003/0033764 A1 | 2/2003 | Ting |
| 2004/0079038 A1 | 4/2004 | Crooker |
| 2006/0248814 A1 | 11/2006 | Chen et al. |
| 2007/0039258 A1 | 2/2007 | Walker |
| 2008/0222981 A1 | 9/2008 | De Gobbi |
| 2010/0257812 A1 | 10/2010 | Schultz et al. |
| 2011/0185675 A1* | 8/2011 | Knight et al. ............ 52/741.1 |
| 2012/0273032 A1 | 11/2012 | Franklin |
| 2013/0051903 A1 | 2/2013 | Ra |
| 2013/0067849 A1* | 3/2013 | Espinosa ............... 52/699 |

FOREIGN PATENT DOCUMENTS

| | | |
|---|---|---|
| EP | 1 688 551 A1 | 8/2006 |
| JP | H06 200630 | 7/1997 |
| JP | 2001 020528 | 1/2001 |
| WO | WO 01/80474 A2 | 10/2001 |

OTHER PUBLICATIONS

International Search Report and Written Opinion of the International Searching Authority for PCT/US2013/073470, dated May 15, 2014 (15 pages).

European Communication dated May 24, 2016 for European Application No. 13808428.0 (5 pages).

Canadian Office Action dated May 18, 2016 for Canadian Application No. 2,894,151 (4 pages).

* cited by examiner

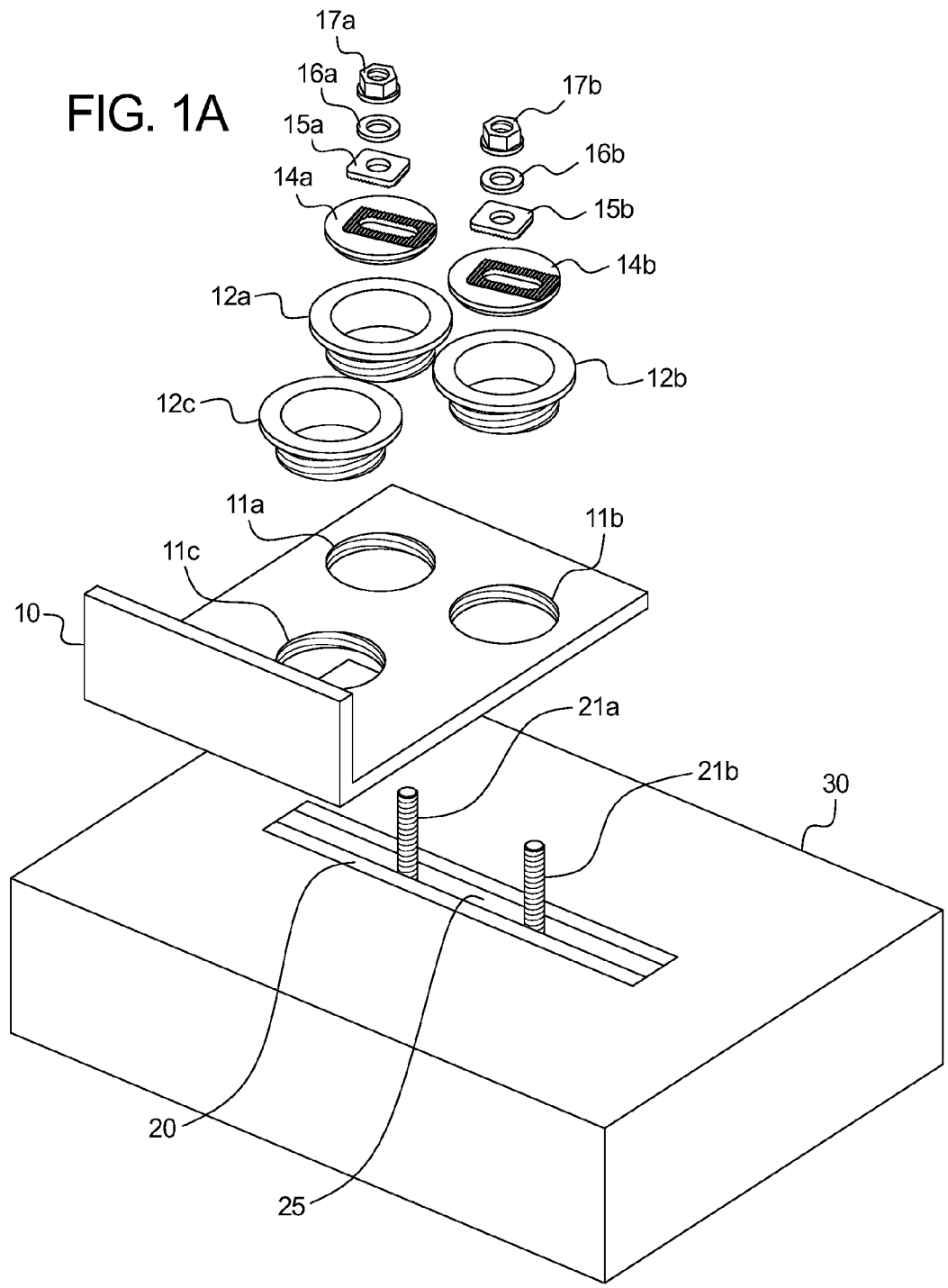

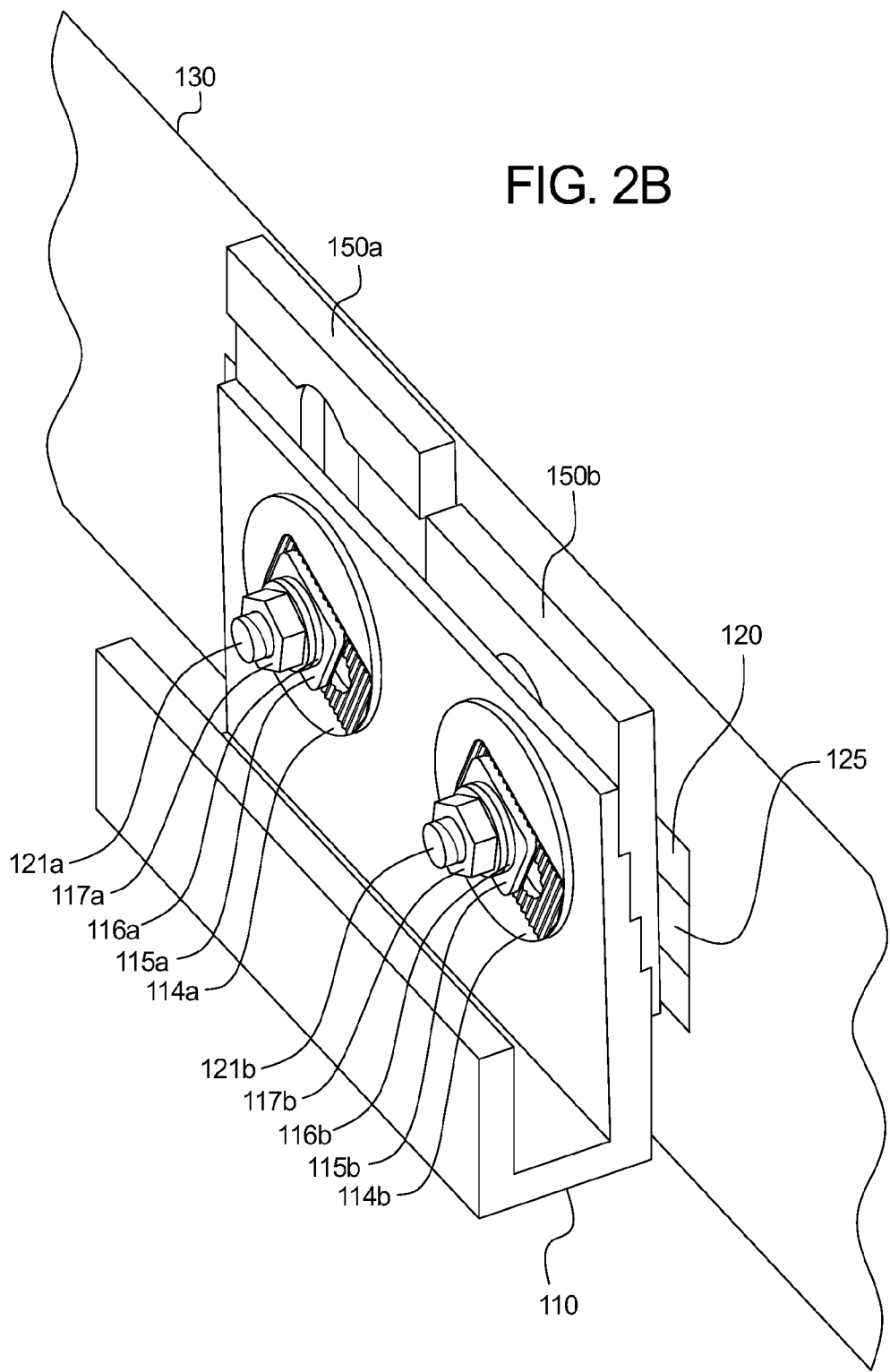

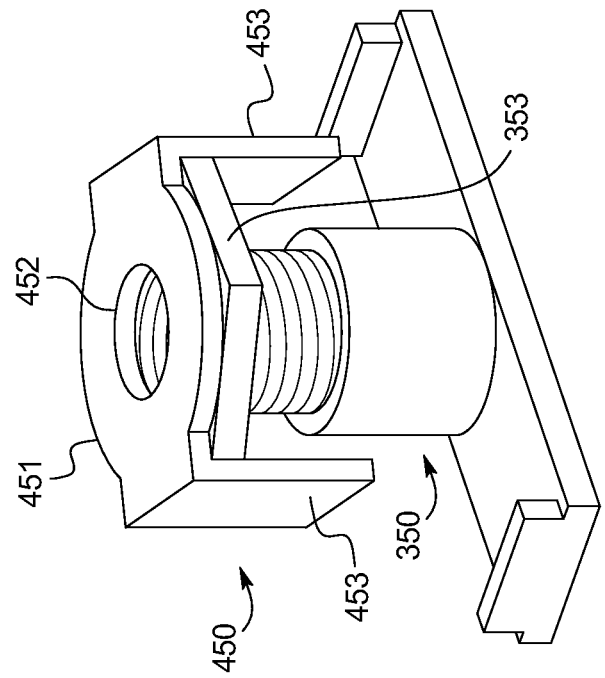
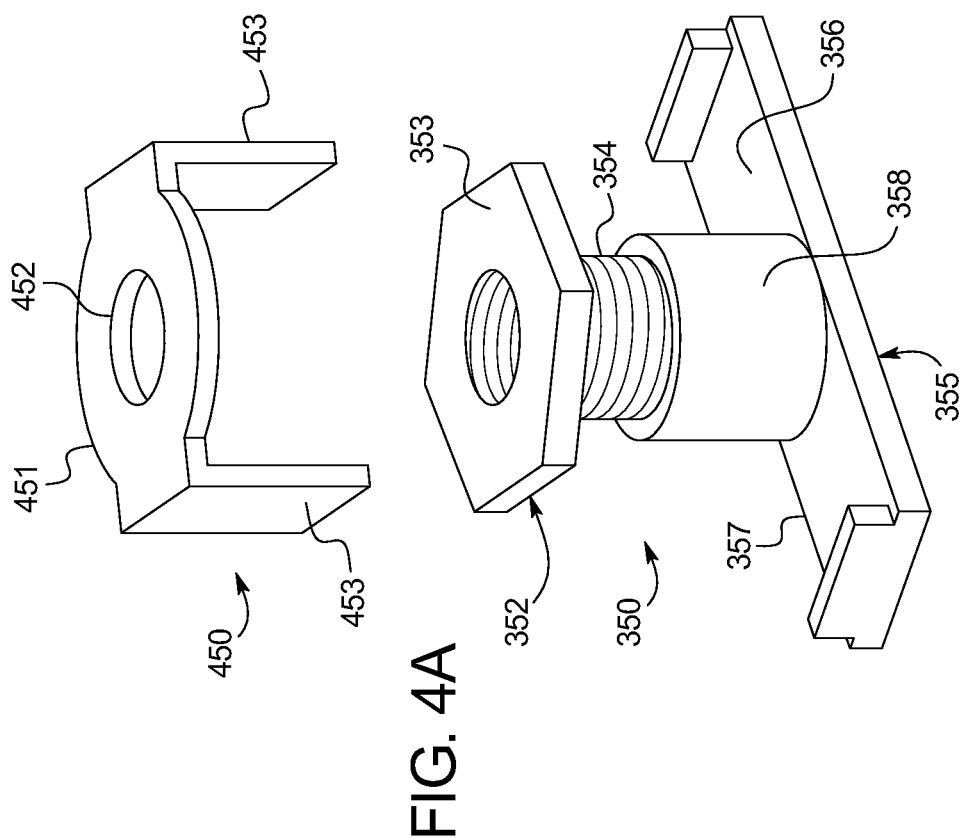

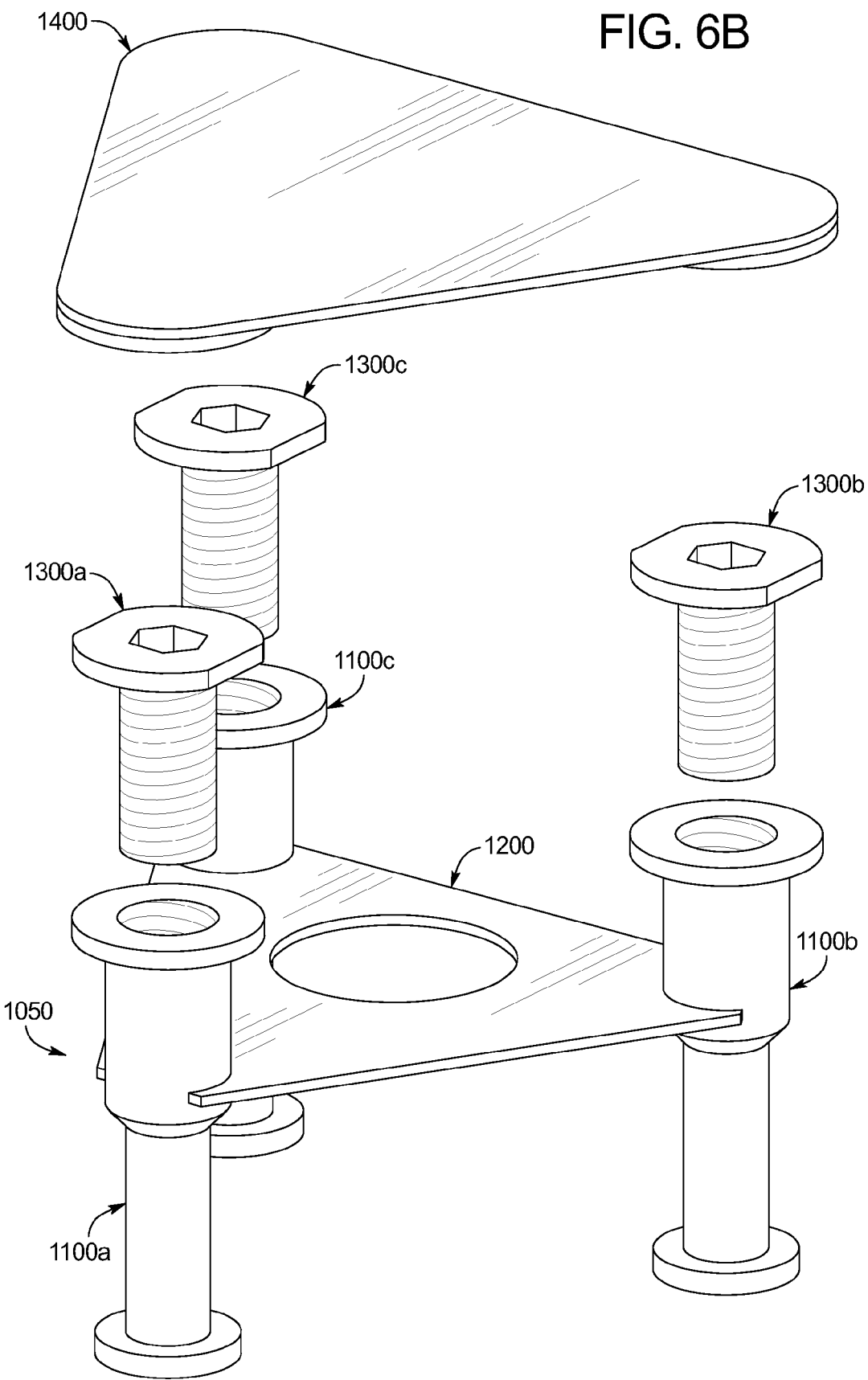

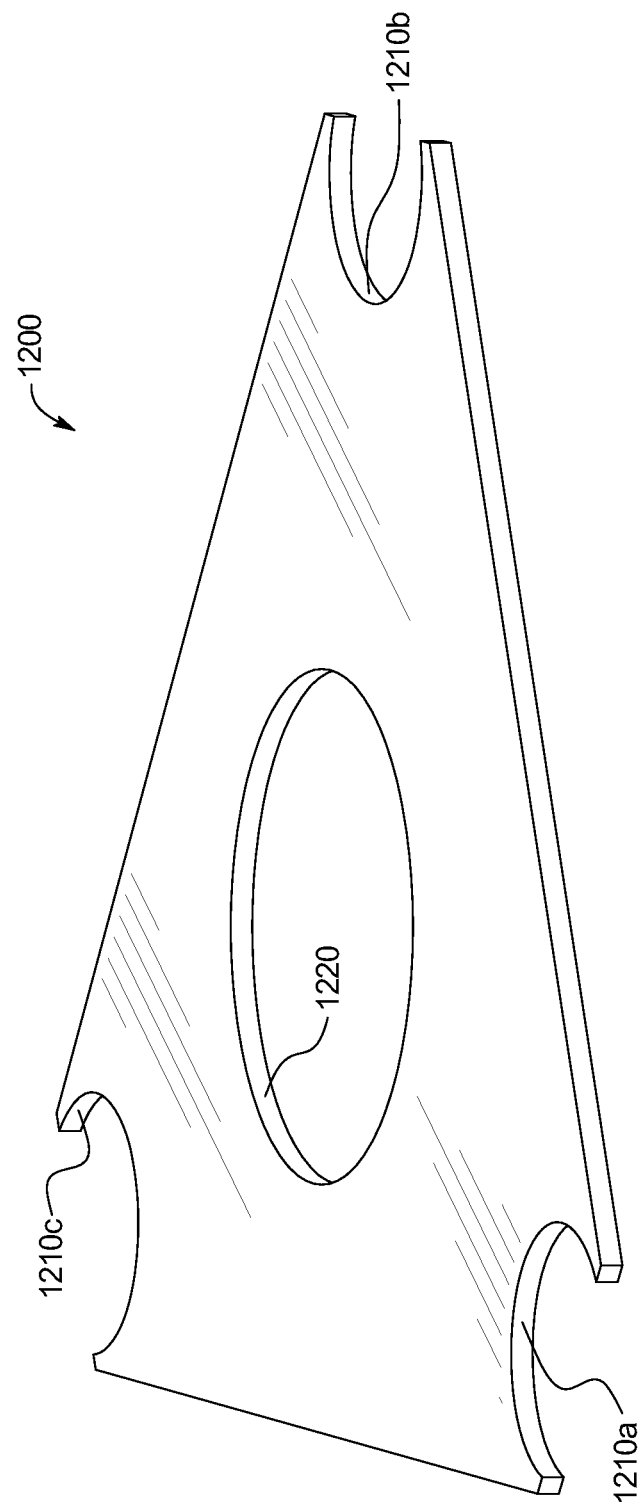

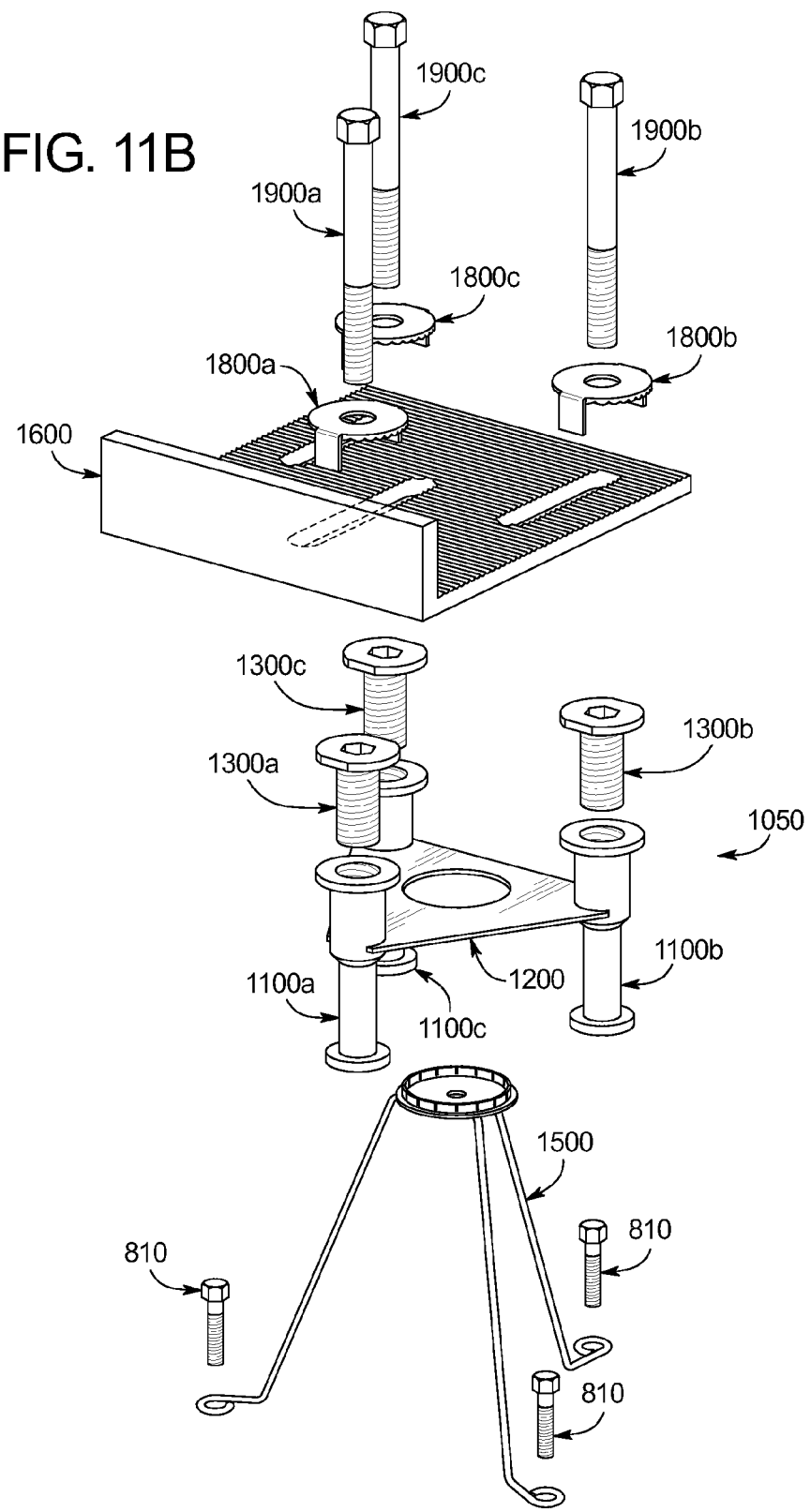

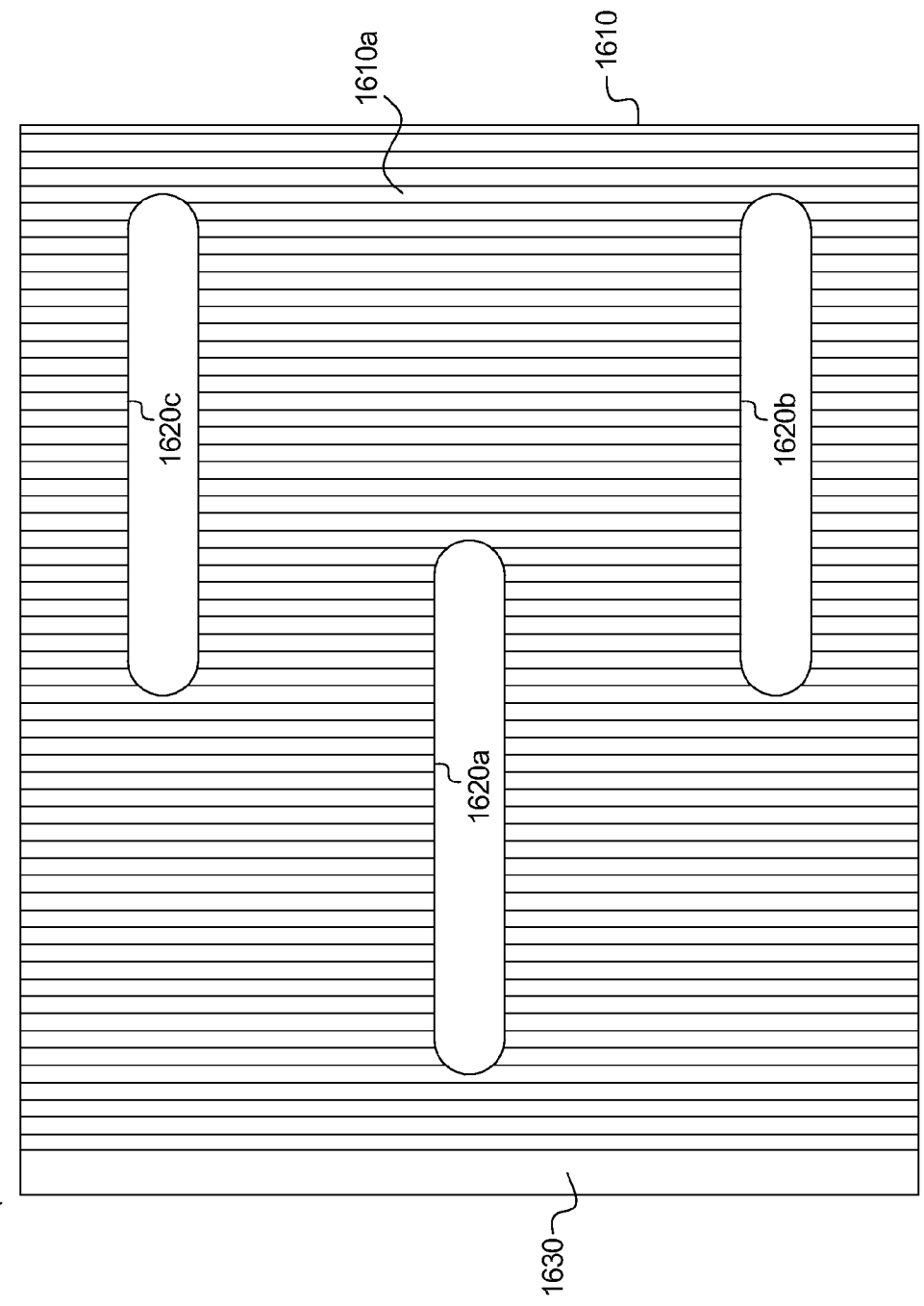

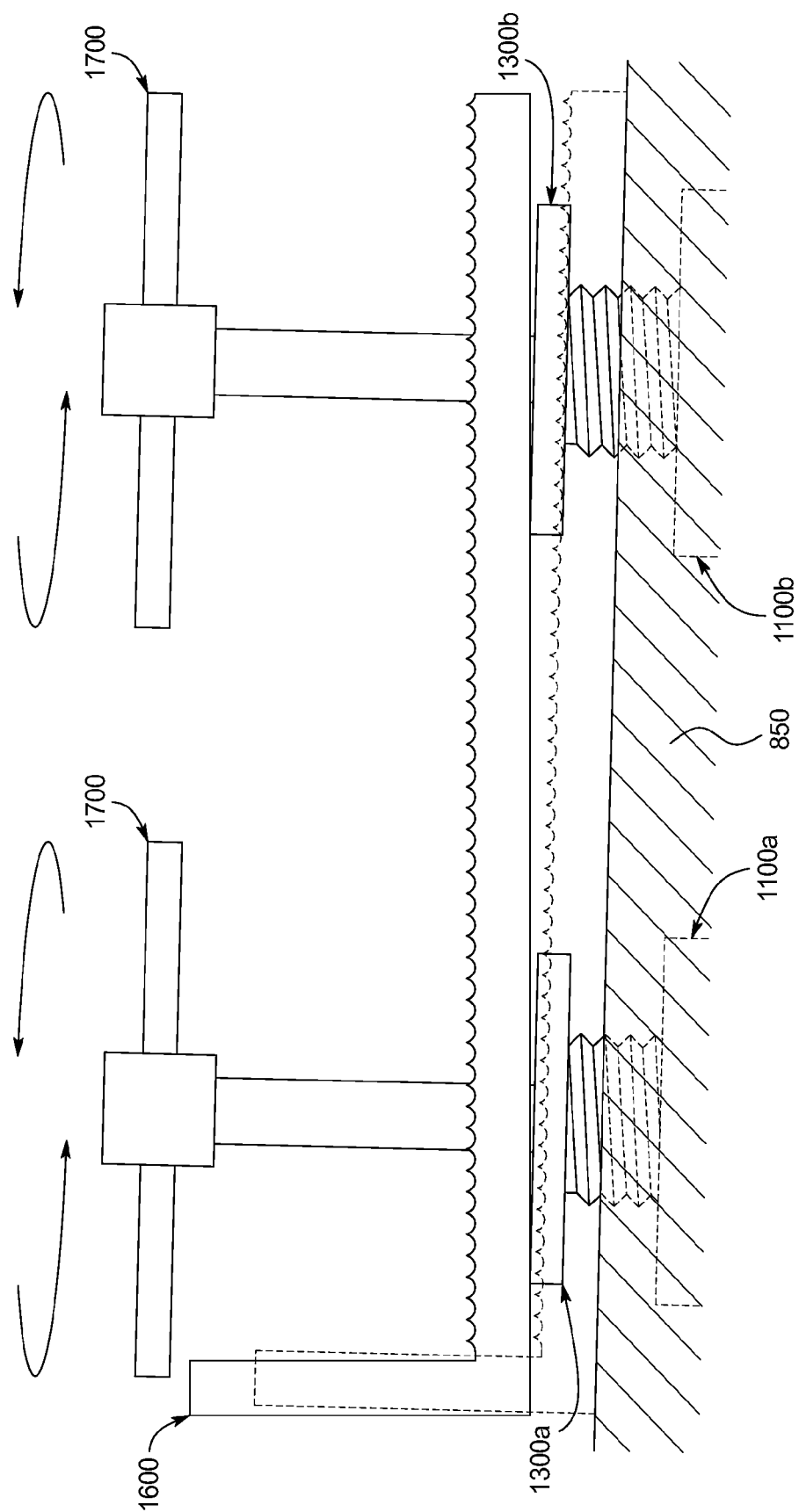

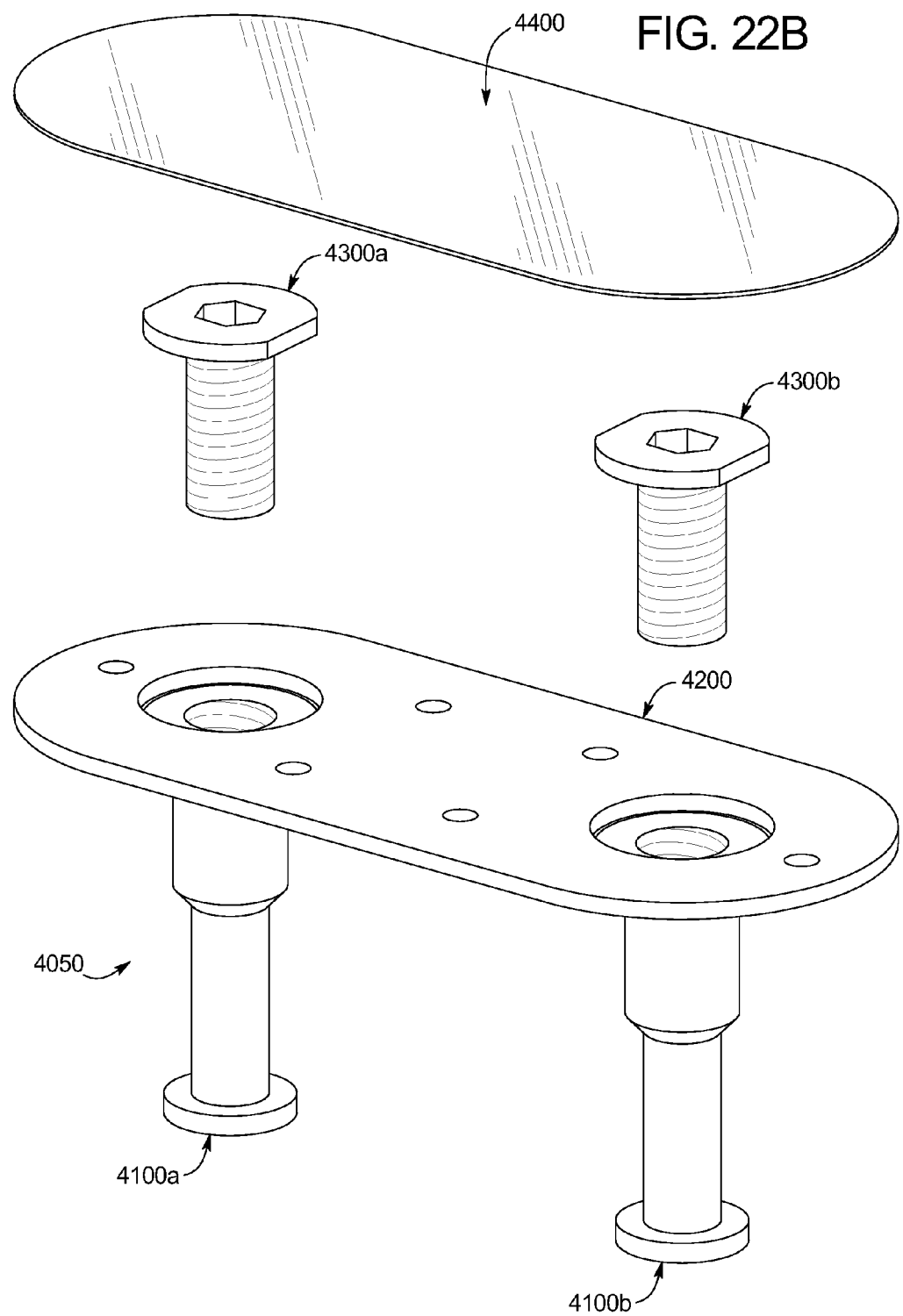

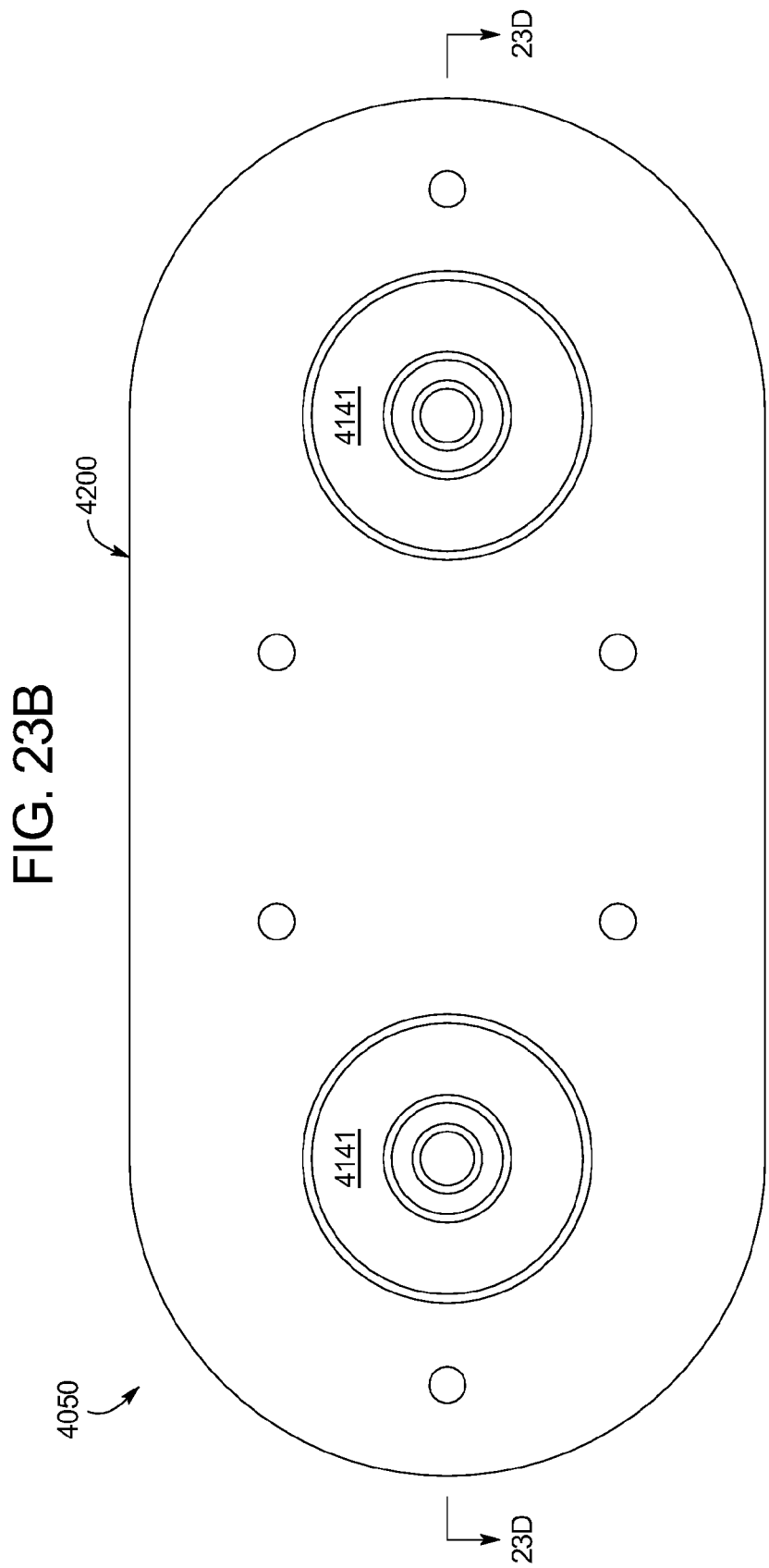

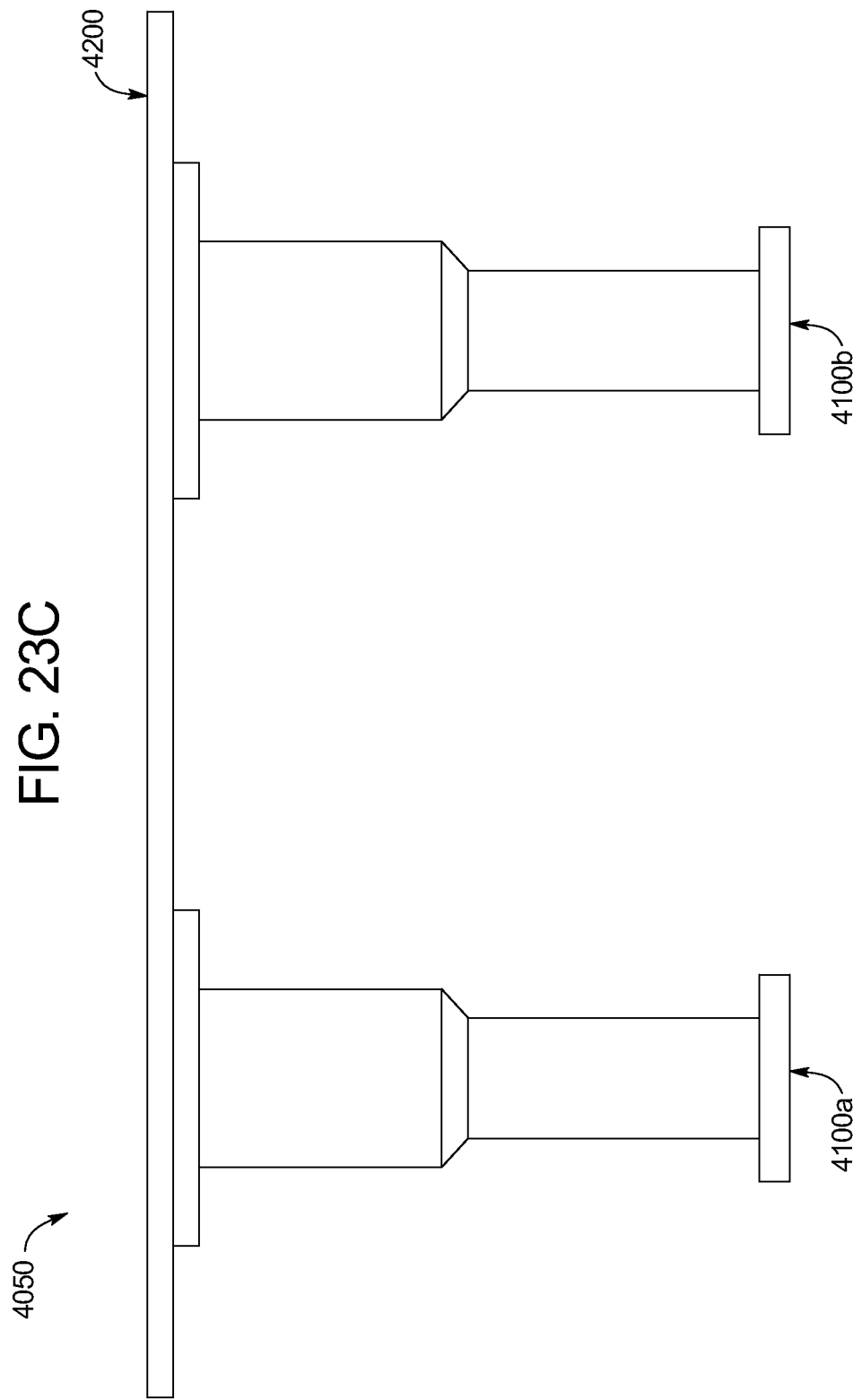

CURTAIN WALL PANEL BRACKET LEVELING SYSTEM

PRIORITY CLAIM

This application is a continuation of, and claims priority to and the benefit of, U.S. patent application Ser. No. 14/095,051, filed on Dec. 3, 2013, which claims priority to and the benefit of U.S. Provisional Patent Application Ser. No. 61/734,741, filed on Dec. 7, 2012, the entire contents of each of which are incorporated herein by reference.

BACKGROUND

Building envelopes of certain commercial and mixed use residential buildings include a curtain wall. The curtain wall of a building defines the appearance of the building and, more importantly, separates the interior controlled or conditioned space from the outside environment. The curtain wall is usually formed from a plurality of curtain wall panels that typically contain glass, metal, and/or stone. The curtain wall panels are attached to the building's structural elements via anchors and curtain wall panel hanging brackets (sometimes referred to as curtain wall panel brackets or panel brackets). The anchors are located at discrete attachment points along the edges of the building's concrete floor slabs. The anchors typically include embedments (sometimes referred to as embeds) that are each cast into a concrete floor slab and that may be located on the top of the slab, on the face of the slab, or beneath the slab. A panel bracket is attached to each embedment, and a curtain wall panel is hung from each panel bracket.

For a given concrete floor slab, before the concrete that forms that concrete floor slab is poured into the concrete form, an array of rebar, metallic cables, and/or other material used to reinforce the concrete floor slab is installed within the concrete form. Embedments are then positioned along an edge of the concrete form by a one or more workers using a tape measure and control lines provided by the general contractor. That is, the worker typically uses the tape measure to hand measure where to position each embedment along the edge of the concrete form using the control lines for reference, though in certain instances the embedments are positioned along the edge of the concrete form with the aid of survey equipment.

This installation process requires another measurement by the worker to assure the embedment has the proper edge spacing from the concrete form (i.e., to ensure the embedment is located at the proper distance from the edge of the concrete form). More specifically, after determining the position along the edge of the concrete form at which to attach the embedment, the worker must then use the tape measure to hand measure the distance of the embedment from the edge of the concrete form. The worker then anchors the embedment into place by either nailing the embedment to the concrete form, wire tying the embedment to rebar, or wire tying the embedment to scraps of lumber and then nailing the lumber to the concrete form such that the anchored embedment has the proper edge spacing from, and is positioned at the desired position along the edge of, the concrete form.

Concrete is then poured into the concrete form, typically via a high pressure concrete pumping hose. Concrete pumping hoses are heavy and unwieldy, and typically require multiple workers to control and operate the concrete pumping hose while walking on and around the rebar, metallic cables, and/or other reinforcing materials within the concrete form. As and after the concrete is being poured (pumped) into the concrete form, several workers level the poured concrete, which again involves the workers walking on and around the rebar, metallic cables, and/or other reinforcing materials. This movement, shifting, and jostling of the rebar, metallic cables, and/or other reinforcing materials, along with the vibration of the concrete pumping hose and the movement of the poured concrete itself, is problematic because it may alter the position of one or more of the embedments or dislodge one or more of the embedments.

Sometime after the concrete has been poured, each embedment must be located and exposed, which sometimes requires workers to chip away any concrete that may be covering the embedment. After the embedments are located and exposed, a survey is conducted to determine whether any of the embedments are potentially problematic. More specifically, the survey is conducted to determine whether any embedments are missing, any embedments are buried too deep within the concrete floor slab, any embedments are improperly positioned or misaligned, and/or whether any embedments conflict with other features of the building, in which case a panel bracket may not be able to be safely or properly mounted to that embedment. After the survey is completed, any problematic embedments must be fixed before construction can continue.

After any problematic embedments are fixed, workers attach a panel bracket to each embedment using fasteners. Certain curtain wall panels include attachment fixtures that "hang" onto the panel brackets. These attachment fixtures often include a mechanism that enables some level adjustment to aid in leveling the curtain wall panels. These leveling mechanisms are seldom used, however, because they increase the time it takes to the hang the curtain wall panels, thereby increasing installation costs due to labor and equipment (such as cranes). As a result, the panel brackets are usually leveled per floor prior to the installation of the curtain wall panels.

More specifically, for each floor of the building, the panel brackets on that floor are leveled relative to one another such that they are all planar and at a same elevation so the installed curtain wall will be level after the curtain wall panels are craned into position. The leveling of the panel brackets relative to one another is typically accomplished through the use of shims of different thicknesses. More specifically, to level a particular panel bracket, one or more workers (who may have different levels of experience) pick one or more shims from a variety of different sized shims of different materials and manually insert the shims between various areas of the panel bracket and the concrete to level that panel bracket.

The manual shimming process is cumbersome and time consuming, which increases labor costs and delays construction. Further, the variation in skill level among the workers who shim the panel brackets leads to inconsistent and, in some instances, improper shimming, which has costly and sometimes dangerous consequences. Additionally, shims are an added expense, and must be purchased in advance in large enough quantities to service the entire building. If adequate inventory is not maintained, construction will be delayed while more shims are ordered and shipped. In certain instances, custom shims may be required, which adds another layer of expense.

In addition to increasing costs, in some instances improper or inconsistent shimming adversely affects the integrity of the panel brackets and the installed curtain wall. For instance, in certain cases in which one or more panel brackets are improperly or poorly shimmed: the mounting bolts (which are used to mount the panel bracket to the embedment) may, over time, bend out of alignment; the embedment channel itself may, over time, uncurl; and the shims themselves may, over time, shift. These occurrences are likely to cause the curtain wall panels themselves to shift and become uneven. Uneven curtain wall panels create leaks, broken glass, and result in an unappealing building façade.

There is a need for new apparatuses and methods for leveling panel brackets that solve the above problems.

SUMMARY

Various embodiments of the present disclosure provide a curtain wall panel bracket leveling system that facilitates leveling a panel bracket mounted to a fixture (such as an embedment or an anchor array) cast in a concrete slab and solves the above-described problems.

In one embodiment, the panel bracket leveling system includes a panel bracket defining a plurality of threaded adjuster receiving openings therethrough, each of which is configured to threadably receive one of a plurality of threaded adjusters. In this embodiment, when a user positions the panel bracket on a plurality of mounting bolts positioned within an embedment channel defined by an embedment encased in a concrete slab, the user determines whether the panel bracket is level and at a desired elevation from the surface of the concrete slab. If the panel bracket is not level and/or is not at the desired elevation, the user may screw one or more of the adjusters further into or further out of the respective adjuster receiving openings until the panel bracket is level and at the desired elevation.

In another embodiment, the panel bracket leveling system includes a panel bracket having a back surface that is jagged or "stepped" and a plurality of spacer plates having front surfaces that are jagged or "stepped" in a corresponding manner. In this embodiment, when the user positions the panel bracket on a plurality of mounting bolts positioned within an embedment channel defined by an embedment encased in a concrete slab, if the panel bracket is not level and/or is not at a desired distance from the face of the concrete slab upon installation, the user may re-mount the panel bracket such that one or more of the spacer plates are positioned between the concrete slab and the back jagged or "stepped" surface of the panel bracket. The "stepped" front surfaces of the spacer plates enable the worker to position the spacer plates to adjust to different thicknesses of the space between the concrete slab and the panel bracket that must be filled to level the panel bracket and/or to position the panel bracket the desired distance from the concrete slab.

In another embodiment, the panel bracket leveling system includes a panel bracket having a plurality of threaded adjuster receiving openings therethrough, each of which is configured to threadably receive one of a plurality of threaded adjusters. Additionally, in this embodiment, expansion nuts are employed to secure the panel bracket to an embedment encased in a concrete slab. In this embodiment, the use of the expansion nuts thus provides a rigid and secure support for the panel bracket while leveling the panel bracket without causing "bridging" that occurs during manual shimming. Further, if the panel bracket is not level and/or is not at the desired elevation, the user may screw one or more of the adjusters further into or further out of the respective adjuster receiving openings until the panel bracket is level and at the desired elevation.

In another embodiment, the panel bracket leveling system includes a panel bracket and employs a leveling compound to aid in leveling the panel bracket and ensuring that the panel bracket is at a desired elevation. In this embodiment, after the user positions the panel bracket on a plurality of mounting bolts positioned within an embedment channel defined by an embedment encased in a concrete slab, the user introduces leveling compound onto the top surface of the concrete slab below the bottom surface of the panel bracket to help level the panel bracket and achieve the desired elevation.

In another embodiment, the panel bracket leveling system of the present disclosure includes an anchor assembly including a plurality of anchors, each of which includes an independently rotatable leveler. Generally, in operation of this embodiment: (a) a user positions an anchor assembly mounting base at a desired location on a deck; (b) the user secures the anchor assembly mounting base to the deck; (c) the user attaches the anchor assembly to the anchor assembly mounting base; (d) concrete is poured to a desired depth above the deck to encase the anchor assembly; (e) the user removes a protective cover of the anchor assembly to expose the levelers; (f) the user places a panel bracket atop the concrete and above the levelers; (g) if necessary, the user independently adjusts (e.g., raises or lowers) one or more of levelers using a leveler adjuster to ensure that the panel bracket is level and at a desired elevation; (h) once the panel bracket is level and at the desired elevation, the user installs a plurality of leveler rotation preventers that prevent the levelers from rotating relative to the anchors and that prevent the panel bracket from sliding relative to the anchors; and (i) the user secures the panel bracket and leveler rotation preventers to the anchors using a plurality of fasteners threaded into the anchors.

Additional features and advantages of the present invention are described in, and will be apparent from, the following Detailed Description and the Figures.

BRIEF DESCRIPTION OF THE FIGURES

FIG. 1A is an exploded perspective view of one embodiment of the panel bracket leveling system of the present disclosure.

FIG. 2B is a perspective view of the panel bracket leveling system of FIG. 2A in an assembled configuration.

FIG. 4A is a perspective view of another embodiment of the expansion nut including a head having a hexagonal outer profile and of an example expansion nut rotation preventer.

FIG. 4B is a perspective view of the expansion nut rotation preventer of FIG. 4A engaging the head of the expansion nut of FIG. 4A.

FIG. 6B is an exploded perspective view of the anchor assembly of FIG. 6A.

FIG. 8 is a perspective view of an anchor connector of the anchor assembly of FIGS. 6A and 6B.

FIG. 11B is an exploded view of the components used to cast the anchor array of FIG. 11A in the concrete and to secure the panel bracket to the anchors, with the concrete not shown for clarity.

FIG. 13B is a top plan view of the panel bracket of FIG. 13A.

FIGS. 17A, 17B, 17C, 17D, 17E, 17F, 17G, 17H, 17I, 17J, and 17K illustrate a process by which the anchor assembly of FIGS. 6A and 6B is employed to mount a panel bracket while ensuring that the panel bracket is level and at a desired elevation.

FIG. 22B is an exploded perspective view of the anchor assembly of FIG. 22A.

FIG. 23B is a top plan view of the anchor array of FIG. 23A.

FIG. 23C is a side elevational view of the anchor array of FIG. 23A.

DETAILED DESCRIPTION OF EXAMPLE EMBODIMENTS

Various embodiments of the present disclosure provide a curtain wall panel bracket leveling system that facilitates leveling a panel bracket mounted to a fixture (such as an embedment or an anchor array) cast in a concrete slab.

Panel Bracket Leveling System Including Rotatable Slotted Plates

Figure 1B:
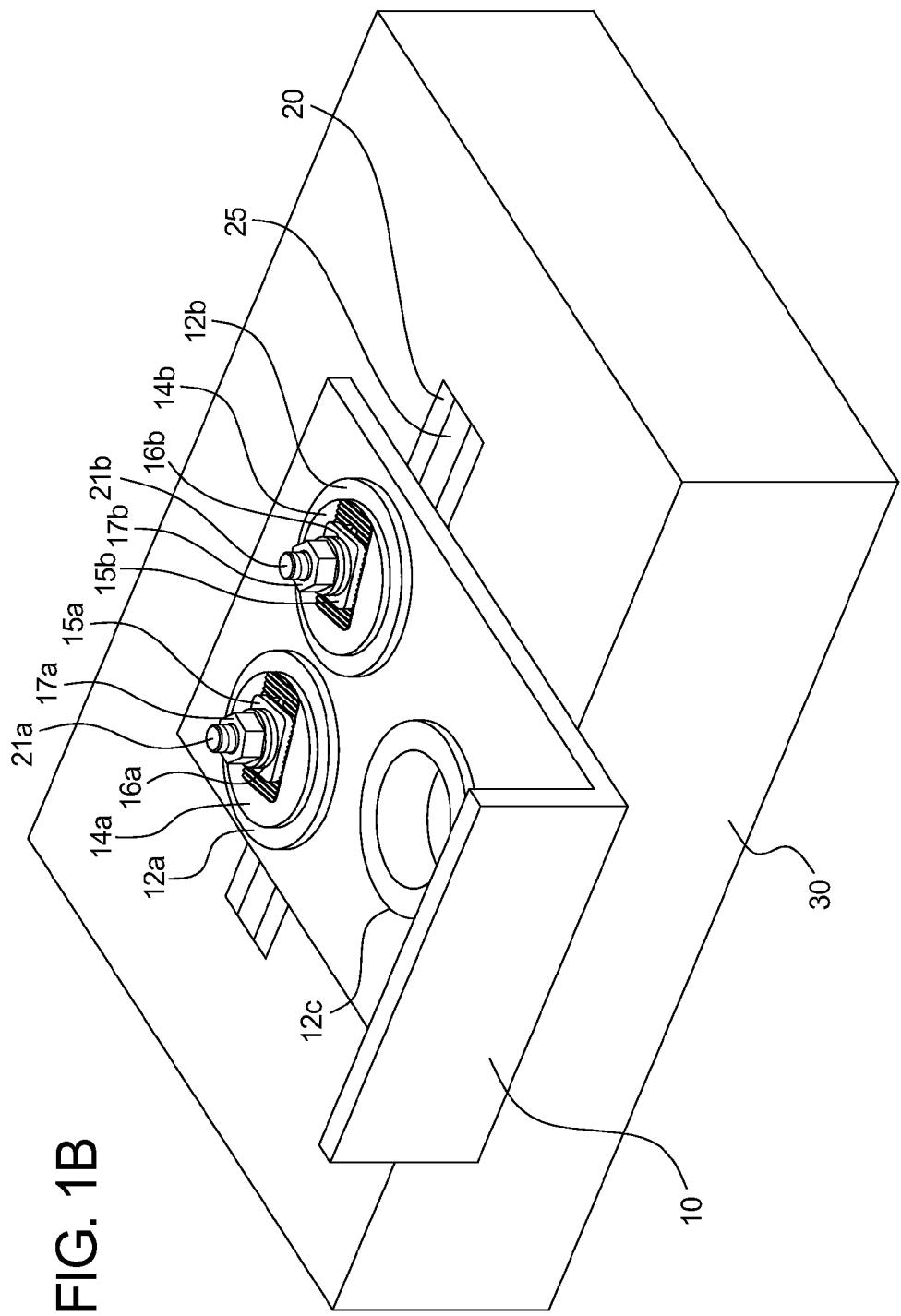
FIG. 1B is a perspective view of the panel bracket leveling system of FIG. 1A in an assembled configuration.

Turning now to the Figures and particularly to FIGS. 1A and 1B, one example of the panel bracket leveling system of the present disclosure includes: (a) a panel bracket 10 defining a plurality of threaded adjuster receiving openings 11a, 11b, and 11c therethrough; (b) a plurality of threaded adjusters 12a, 12b, and 12c each configured to be screwed into (and threadably received by) one of the adjuster receiving openings 11a, 11b, and 11c; (c) a plurality of circular slotted plates 14a and 14b each configured to be received by one of the adjusters 12a, 12b, and 12c; (d) a plurality of locking washers 15a and 15b each configured to engage one of the circular slotted plates 14a and 14b; (e) a plurality of mounting bolts 21a and 21b, (f) a plurality of washers 16a and 16b, and (g) a plurality of nuts 17a and 17b.

In operation, a user positions the mounting bolts 21a and 21b within an embedment channel 25 defined by an embedment 20 cast in a concrete slab 30 such that the mounting bolts 21a and 21b extend upwardly from the embedment channel 25. The user positions the panel bracket 10 on the mounting bolts 21a and 21b such that the mounting bolt 21a passes through the adjuster receiving opening 11a and the mounting bolt 21b passes through the adjuster receiving opening 11b. In this example, the adjusters 12a, 12b, and 12c are screwed into (and threadably received by) their corresponding adjuster receiving openings 11a, 11b, and 11c, respectively, before the user positions the panel bracket 10 on the mounting bolts 21a and 21b. Accordingly, the mounting bolt 21a also passes through the adjuster 12a and the mounting bolt 21b also passes through the adjuster 12b when the user positions the panel bracket 10 on the mounting bolts 21a and 21b. It should be appreciated that, in other embodiments, the user screws one or more of the adjusters into their corresponding adjusters after positioning the panel bracket on the mounting bolts.

After the panel bracket is positioned on the mounting bolts and the adjusters are screwed into (and threadably received by) their corresponding adjuster receiving openings, the user determines whether the panel bracket is level and at a desired elevation. If the panel bracket is not level and/or is not at the desired elevation, the user may screw one or more of the adjusters further into or further out of the respective adjuster receiving openings until the panel bracket is level and at the desired elevation. It should be appreciated that screwing an adjuster further into its respective adjuster receiving opening raises the panel bracket, while screwing the adjuster further out of its respective adjuster receiving opening lowers the panel bracket.

After the panel bracket is level and at the desired elevation, the user completes the panel bracket mounting process by installing the locking washers, the washers, and the nuts. More specifically, the user threads the circular slotted plate 14a over the mounting bolt 21a and manipulates the circular slotted plate 14a until it is received by the adjuster 12a, threads the locking washer 15a over the mounting bolt 21a and manipulates the locking washer 15a until the locking washer 15a engages with the circular slotted plate 14a (such as until teeth of the locking washer 15a engage and interlock with corresponding teeth of the circular slotted plate 14a), threads the washer 16a over the mounting bolt 21a, and threads the nut 17a onto the mounting bolt 21a until snug. The user repeats this process for the circular slotted plate 14b, the locking washer 15b, the washer 16b, and the nut 17b with respect to the mounting bolt 21b.

It should be appreciated that the use of the circular slotted plates enables the mounting bolts to be positioned at almost any location within the adjuster receiving openings and still be used to mount the panel bracket to the embedment. In instances in which the circular slotted plates are threaded over the mounting bolts and received by the adjusters before the adjusters are manipulated (screwed in or out) to level the panel bracket or to raise or lower the panel bracket to the desired elevation, the fact that the circular slotted plates are configured to freely rotate relative to the adjusters when resting within the adjusters (before the locking washers are installed and the nuts tightened) enables the position of the bolts within the adjuster receiving openings to vary, thus facilitating the adjustment of the level and/or of the elevation of the panel bracket. In other words, as the panel bracket is leveled or its elevation adjusted, the circular slotted plates enable the positions of the bolts within the adjuster receiving openings to vary.

As explained above, the fact that the adjusters of the present disclosure facilitate leveling the panel bracket and raising or lowering the panel bracket to the desired elevation eliminates the need for manual shimming. It should also be appreciated that the adjusters need not be used if the panel bracket is level and at the desired elevation upon initial installation.

In one embodiment, the circular slotted plates are the Orbi-Plate sold by Reid Construction Systems, though any suitable circular slotted plates may be employed. It should be appreciated that, in various embodiments, the circular slotted plates may be used without the adjusters.

In certain embodiments, the adjusters each include notches that enable a user to use a screwdriver or other tool to screw the adjusters further into or further out of their respective adjuster receiving openings. In other embodiments, the adjusters have an outer profile corresponding to a standard wrench size, which enables a user to use a wrench of that size to screw the adjusters further into or further out of their respective adjuster receiving openings.

It should be appreciated that, in certain embodiments, the user does not screw the adjusters into their respective adjuster receiving openings unless and until the panel bracket needs leveling and/or an elevation adjustment. That is, in such embodiments, the user screws the adjusters into their corresponding adjuster receiving openings to raise or lower the panel bracket to the desired elevation after positioning the panel bracket on the mounting bolts and after determining that the panel bracket is not level and/or that the panel bracket needs an elevation adjustment.

This embodiment of the panel bracket leveling system including rotatable slotted plates solves certain of the above-described problems. First, this embodiment of the panel bracket leveling system eliminates the need to manually shim each individual panel bracket, which eliminates: the time required to sift through a variety of shims to pick the proper shim(s) for the job, the time and labor (and associated cost) required to manually insert the shim(s) to level the panel bracket, the need to maintain an inventory of shims, and the need to (in certain instances) purchase custom shims. Second, this embodiment of the panel bracket leveling system enables installers of different skill levels to more consistently level panel brackets, which reduces the potential for improper installation and compromised panel brackets and curtain wall panels. Third, the variable adjustment of the adjusters of this embodiment of the panel bracket leveling system enables a wide range of adjustment, unlike shims that enable a comparatively smaller range of adjustment.

Fourth, the elimination of shims increases the speed at which each panel bracket is installed and leveled, which reduces construction time and labor costs. Fifth, the elimination of shims eliminates the need to weld stacks of shims together in certain instances. Sixth, the elimination of shims significantly reduces the likelihood of the mounting bolts bending over time. Seventh, unlike shims, the adjusters of this embodiment of the panel bracket leveling system enable future level adjustments. Eighth, unlike shims, the adjusters of this embodiment of the panel bracket leveling system are unlikely to shift in areas where seismic activity occurs.

Panel Bracket Leveling System Including Spacer Plates

Figure 2A:
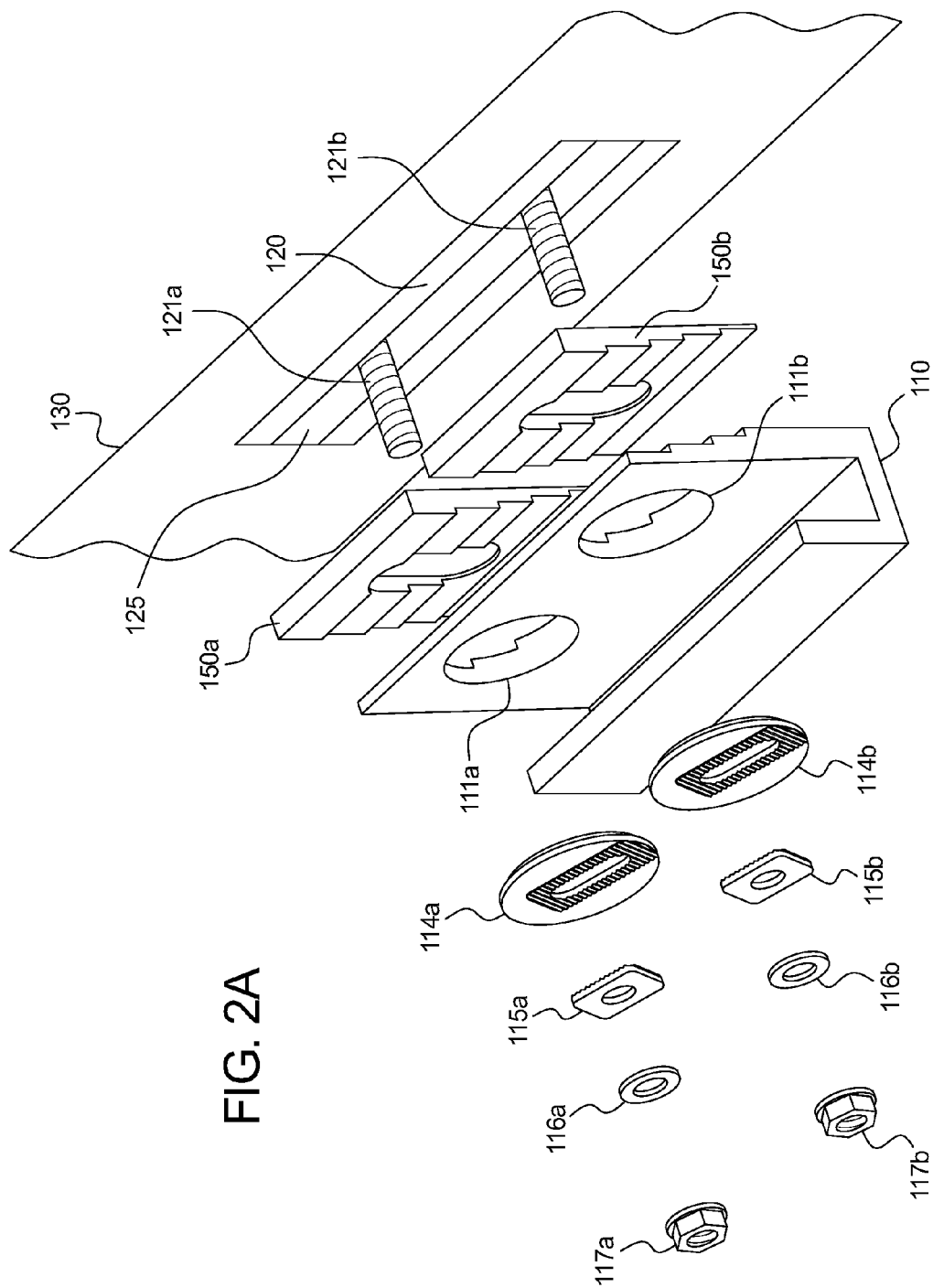
FIG. 2A is an exploded perspective view of another embodiment of the panel bracket leveling system of the present disclosure.

Turning to FIGS. 2A and 2B, another embodiment of the panel bracket leveling system of the present disclosure includes: (a) a panel bracket 110 defining a plurality of circular slotted plate receiving openings 111a and 111b therethrough, (b) a plurality of circular slotted plates 114a and 114b each configured to be received by one of the circular slotted plate receiving openings 111a and 111b, (c) a plurality of locking washers 115a and 115b each configured to engage one of the circular slotted plates 114a and 114b, (d) a plurality of mounting bolts 121a and 121b, (e) a plurality of washers 116a and 116b, (e) a plurality of nuts 117a and 117b, and (f) a plurality of spacer plates 150a and 150b. In this illustrated example, the back surface (with respect to the orientation shown in FIGS. 2A and 2B) of the panel bracket 110 is jagged or "stepped," and the front surfaces (with respect to the orientation shown in FIGS. 2A and 2B) of the spacer plates 150a and 150b are jagged or "stepped" in a corresponding manner.

In operation, a user positions the mounting bolts 121a and 121b within an embedment channel 125 defined by an embedment 120 encased in a concrete slab 130 such that the mounting bolts 121a and 121b extend leftward from the embedment channel 125. The user positions the panel bracket 110 on the two mounting bolts 121a and 121b such that the mounting bolt 121a passes through the circular slotted plate receiving opening 111a and the mounting bolt 121b passes through the circular slotted plate receiving opening 111b. After positioning the panel bracket 110 is positioned on the mounting bolts 121a and 121b, the user threads the circular slotted plate 114a over the mounting bolt 121a and manipulates the circular slotted plate 114a until it is received by the circular plate receiving opening 111a, threads the locking washer 115a over the mounting bolt 121a and manipulates the locking washer 115a until the locking washer 115a engages with the circular slotted plate 114a (such as until teeth of the locking washer 115a engage and interlock with corresponding teeth of the circular slotted plate 114a), threads the washer 116a over the mounting bolt 121a, and threads the nut 117a onto the mounting bolt 121a until snug. The user repeats this process for the circular slotted plate 114b, the locking washer 115b, the washer 116b, and the nut 117b with respect to the mounting bolt 121b.

If the panel bracket 110 is not level and/or is not at a desired distance from the face of the concrete slab 130 upon installation, the user may re-mount the panel bracket 110 such that one or more of the spacer plates 150a and 150b are threaded over the mounting bolts 121a and 121b between the concrete slab 130 and the back jagged or "stepped" surface of the panel bracket 110. The "stepped" front surfaces of the spacer plates enable the user to position the spacer plates to adjust to different thicknesses of the space between the concrete slab and the panel bracket that must be filled to level the panel bracket and/or to position the panel bracket the desired distance from the concrete slab.

It should be appreciated that the use of the circular slotted plates enables the mounting bolts to be positioned at almost any location within the circular plate receiving openings and still be used to mount the panel bracket to the embedment. In instances in which the circular slotted plates are threaded over the mounting bolts and received by the circular plate receiving openings before the spacer plates are manipulated to level the panel bracket or to position the panel bracket the desired distance from the concrete slab, the fact that the circular slotted plates are configured to freely rotate relative to the panel bracket after being received by the circular plate receiving openings (before the locking washers are installed and the nuts tightened) enables the position of the bolts within the circular plate receiving openings to vary, thus facilitating the adjustment of the level of the panel bracket. In other words, as the panel bracket is leveled, the circular slotted plates enable the positions of the bolts within the circular plate receiving openings to vary.

It should be appreciated that the size and the quantity of steps on the front surfaces of the spacer plates and on the back surface of the panel bracket may vary. It should also be appreciated that the spacer plates may be perforated at one or more locations, which enables a user to snap off a protruding portion of a spacer plate after it is installed to level the panel bracket. In various embodiments, a single spacer plate is employed that the user may thread over both mounting bolts at once.

This embodiment of the panel bracket leveling system including spacer plates solves certain of the above-described problems. First, this embodiment of the panel bracket leveling system eliminates the need to manually shim each individual panel bracket, which eliminates: the time required to sift through a variety of shims to pick the proper shim(s) for the job, the time and labor (and associated cost) required to manually insert the shim(s) to level the panel bracket, the need to maintain an inventory of shims, and the need to (in certain instances) purchase custom shims. Second, this embodiment of the panel bracket leveling system enables installers of different skill levels to more consistently level panel brackets, which reduces the potential for improper installation and compromised panel brackets and curtain wall panels. Third, the variable adjustment of the spacer plates of this embodiment of the panel bracket leveling system enables a wide range of adjustment, unlike shims that enable a comparatively smaller range of adjustment.

Fourth, the elimination of shims increases the speed at which each panel bracket is installed and leveled, which reduces construction time and labor costs. Fifth, the elimination of shims eliminates the need to weld stacks of shims together in certain instances. Sixth, the elimination of shims significantly reduces the likelihood of the mounting bolts bending over time. Seventh, unlike shims, the spacer plates of this embodiment of the panel bracket leveling system are unlikely to shift in areas where seismic activity occurs.

Panel Bracket Leveling System Including Expansion Nuts

Figure 3A:
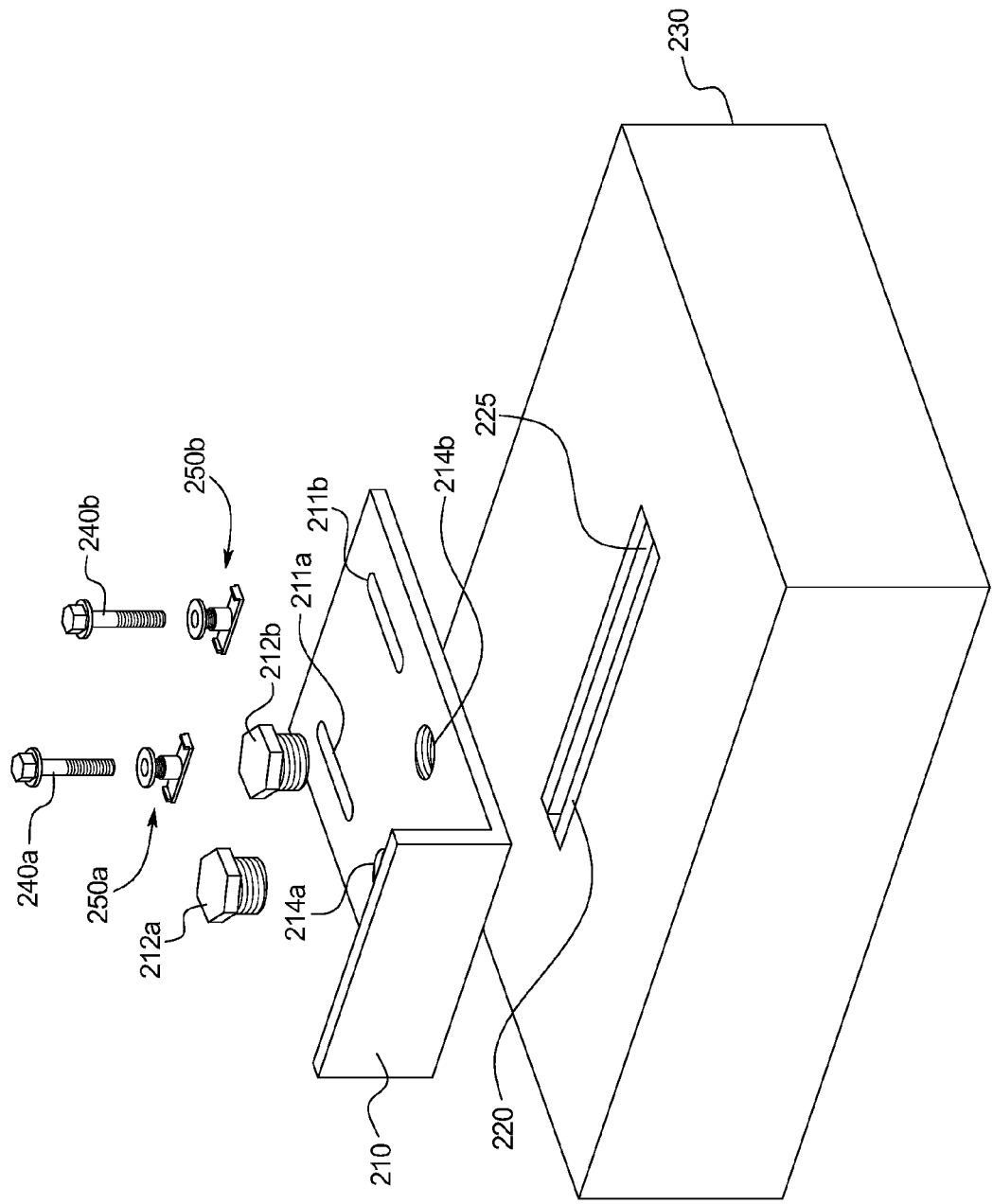
FIG. 3A is an exploded perspective view of another embodiment of the panel bracket leveling system of the present disclosure.
Figure 3B:
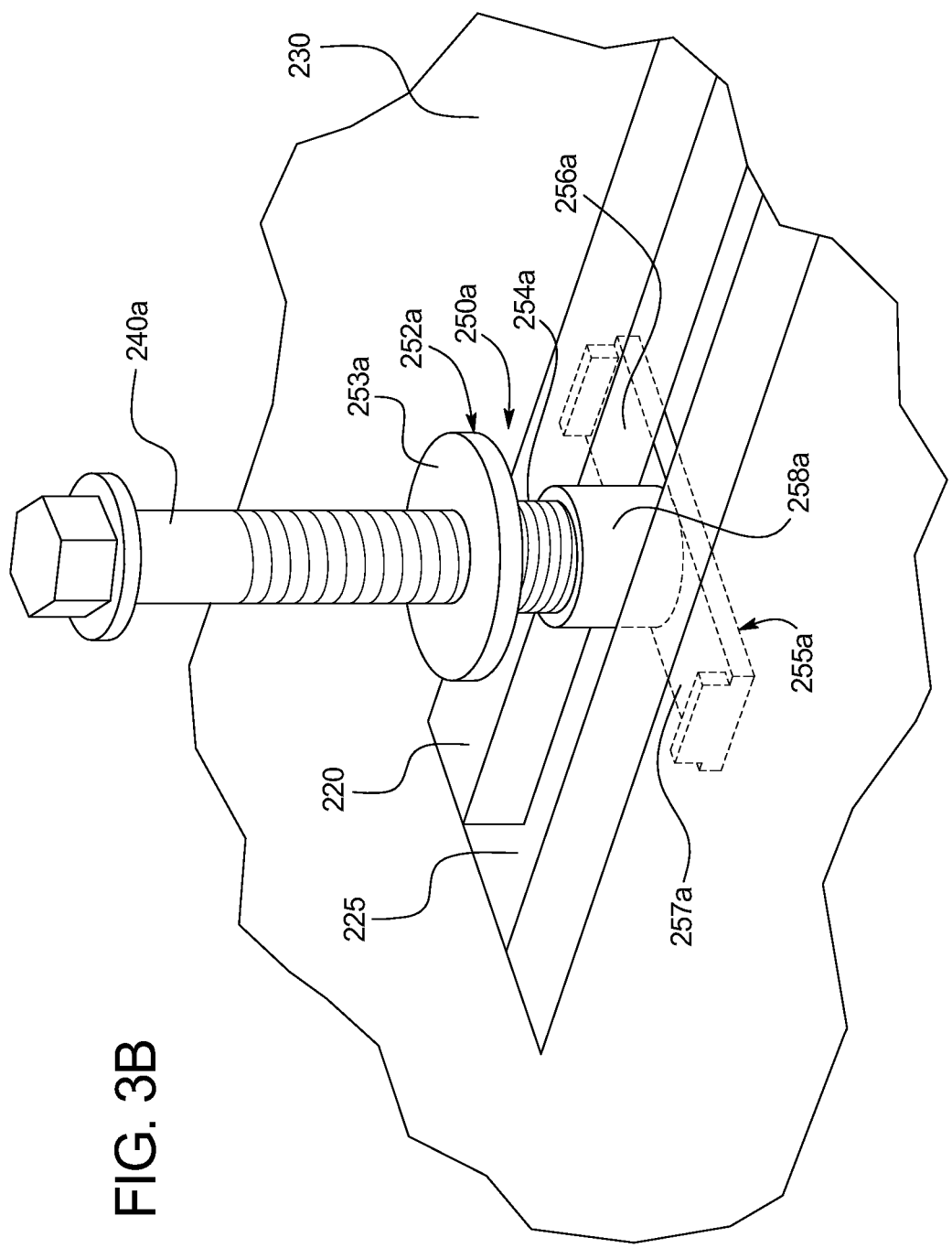
FIG. 3B is a perspective view of one of the expansion nuts of the panel bracket leveling system of FIG. 3A within the embedment channel.
Figure 3C:
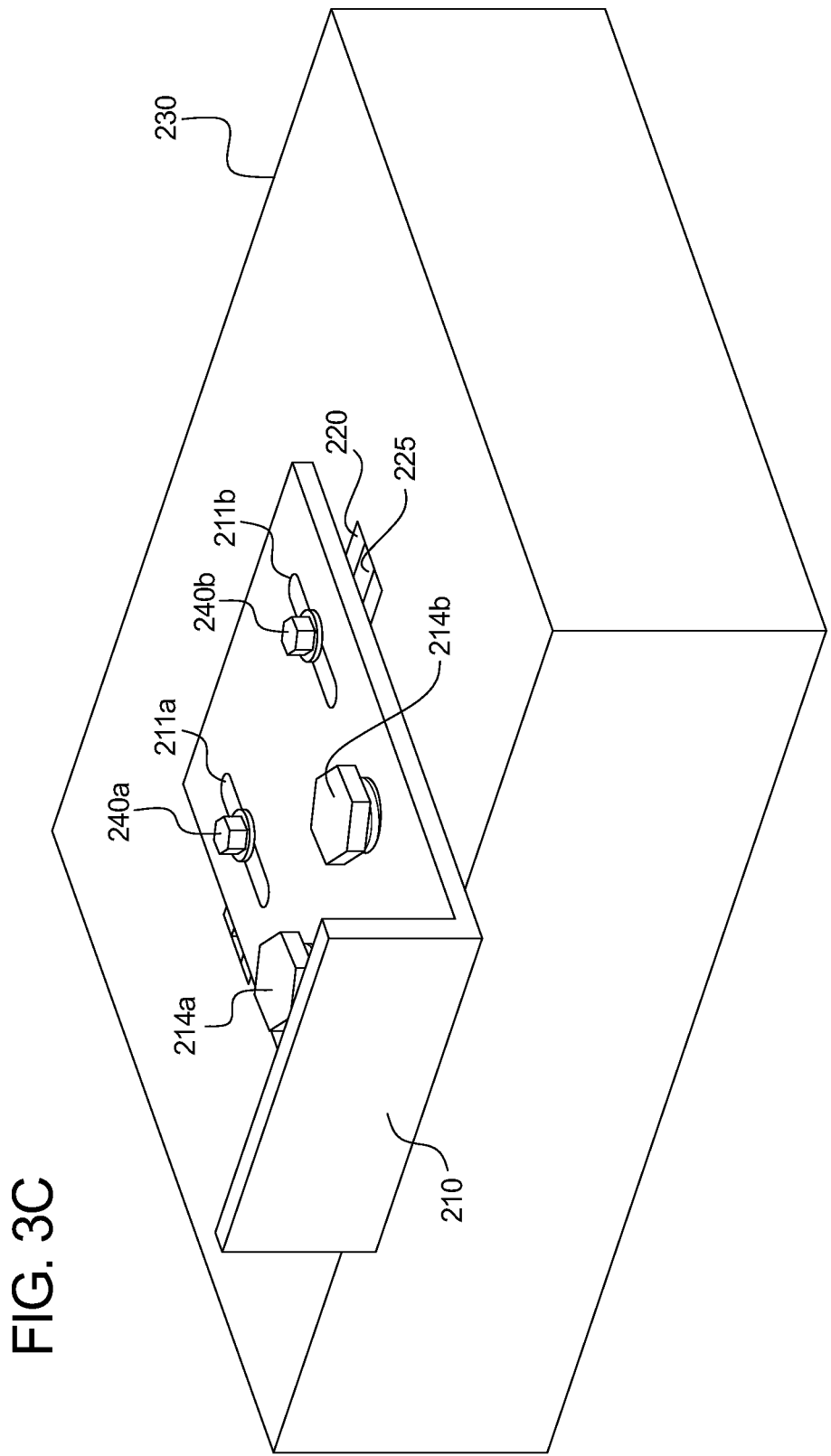
FIG. 3C is a perspective view of the panel bracket leveling system of FIG. 3A in an assembled configuration.

Turning to FIGS. 3A, 3B, and 3C, another embodiment of the panel bracket leveling system of the present disclosure includes: (a) a panel bracket 210 defining a plurality of threaded adjuster receiving openings 214a and 214b therethrough and a plurality of slotted mounting openings 211a and 211b therethrough, (b) a plurality of threaded adjusters 212a and 212b each configured to be threadably received by one of the adjuster receiving openings 214a and 214b, (c) a plurality of mounting bolts 240a and 240b, and (d) a plurality of expansion nuts 250a and 250b configured to threadably receive the mounting bolts 240a and 240b.

Each of the expansion nuts 250 includes a T-shaped base 255 and a supporter 252 threadably received by the base 255. More specifically, the base 255 includes: (a) a supporter receiver 258 configured to threadably receive a threaded portion 254 of the supporter 252 (described below), and (b) a plurality of opposing arms 256 and 257 extending therefrom. Each of the arms includes a flange extending from the arm proximate the end of the arm opposite the supporter receiver. The supporter 252 includes a head 253 having a circular outer profile and the threaded portion 254 extending therefrom. The head 253 and the threaded portion 254 define a threaded mounting bolt receiving opening therethrough that may threadably receive one of the mounting bolts 240. An outer surface of the threaded portion 254 is reverse-threaded (with respect to the mounting bolt receiving opening therethrough) and configured to be threadably received by the supporter receiver 258. Because the threaded portion 254 is reverse-threaded, when the mounting bolt 240 is screwed into the mounting bolt receiving opening, the supporter 252 moves in a direction opposite the mounting bolt 240 (until sufficient resistance is met). For instance, if the mounting bolt is screwed downward into the mounting bolt receiving opening, the supporter moves upward, and if the mounting bolt is subsequently unscrewed, the supporter moves downward.

In operation, a user positions the expansion nuts 250a and 250b within an embedment channel 225 defined by an embedment 220 cast in a concrete slab 230, as best shown in FIG. 3B, such that at least a portion of the base 255a is disposed within the embedment channel. It should be appreciated that panel bracket 210 is not shown in FIG. 3B for clarity. The user positions the panel bracket 210 such that the mounting bolt 240a may be threaded through the slotted mounting opening 211a and into the expansion nut 250a, and such that the mounting bolt 240b may be threaded through the slotted mounting opening 211b and into the expansion nut 250b. As the user screws each mounting bolt into its corresponding expansion nut, the expansion nut fills the gap (if any) between the bottom surface of the panel bracket and the top surface of the concrete. More specifically, as the mounting bolt is screwed into its corresponding expansion nut (i.e., into the mounting bolt receiving opening of its corresponding expansion nut), the supporter rises to fill that gap. Once the head of the supporter of the expansion nut contacts the bottom surface of the panel bracket (i.e., once sufficient resistance is met), the gap between the panel bracket and the concrete is filled, and the mounting bolt may be fully screwed into its corresponding expansion nut until snug without the supporter rising any further. The use of the expansion nuts thus provides a rigid and secure support for the panel bracket while leveling the panel bracket without causing "bridging" that occurs during manual shimming.

Additionally, user screws the adjusters 212a and 212b into their corresponding adjuster receiving openings 214a and 214b, respectively. If the panel bracket is not level and/or is not at a desired elevation, the user may screw one or more of the adjusters further into or further out of the respective adjuster receiving openings until the panel bracket is level and at the desired elevation, as described above. It should be appreciated that the adjusters may be screwed into their corresponding adjuster receiving openings before or after the mounting bolts are screwed into the expansion nuts.

FIG. 4A illustrates another embodiment of the expansion nut 350. In this embodiment, the head 353 of the supporter 352 has a hexagonal outer profile. FIG. 4A also illustrates an example expansion nut rotation preventer 450 including a substantially flat base 451 defining a mounting bolt opening 452 therethrough and including a plurality of locking tabs 453 extending therefrom. In operation of this example, as shown in FIG. 4B, a mounting bolt (not shown) is threaded through the mounting bolt opening 420 of the expansion nut rotation preventer 450, threaded through the slotted mounting opening of the panel bracket (not shown), and threaded into the expansion nut 350. In this example, the expansion nut rotation preventer is held away from the head of the supporter of the expansion nut until the supporter fills the gap between the bottom surface of the panel bracket and the top surface of the concrete. Once the gap is filled, the user guides the expansion nut rotation preventer downward over the head of the supporter such that the locking tabs of the expansion nut rotation preventer engage opposing edges of the head of the supporter. The engagement of the locking tabs with the head of the supporter prevents the head from rotating any further (which potentially could cause the head of the expansion nut to lower, thereby altering the level of the panel bracket).

This embodiment of the panel bracket leveling system including expansion nuts solves certain of the above-described problems. First, this embodiment of the panel bracket leveling system eliminates the need to manually shim each individual panel bracket, which eliminates: the time required to sift through a variety of shims to pick the proper shim(s) for the job, the time and labor (and associated cost) required to manually insert the shim(s) to level the panel bracket, the need to maintain an inventory of shims, and the need to (in certain instances) purchase custom shims. Second, this embodiment of the panel bracket leveling system enables installers of different skill levels to more consistently level panel brackets, which reduces the potential for improper installation and compromised panel brackets and curtain wall panels. Third, the variable adjustment of the adjusters and the expansion nuts of this embodiment of the panel bracket leveling system enables a wide range of adjustment, unlike shims that enable a comparatively smaller range of adjustment.

Fourth, the elimination of shims increases the speed at which each panel bracket is installed and leveled, which reduces construction time and labor costs. Fifth, the elimination of shims eliminates the need to weld stacks of shims together in certain instances. Sixth, the elimination of shims significantly reduces the likelihood of the mounting bolts bending over time. Seventh, unlike shims, the adjusters and the expansion nuts of this embodiment of the panel bracket leveling system enable future level adjustments. Eighth, unlike shims, the adjusters and the expansion nuts of this embodiment of the panel bracket leveling system are unlikely to shift in areas where seismic activity occurs.

Panel Bracket Leveling System Including Leveling Compound

Figure 5A:
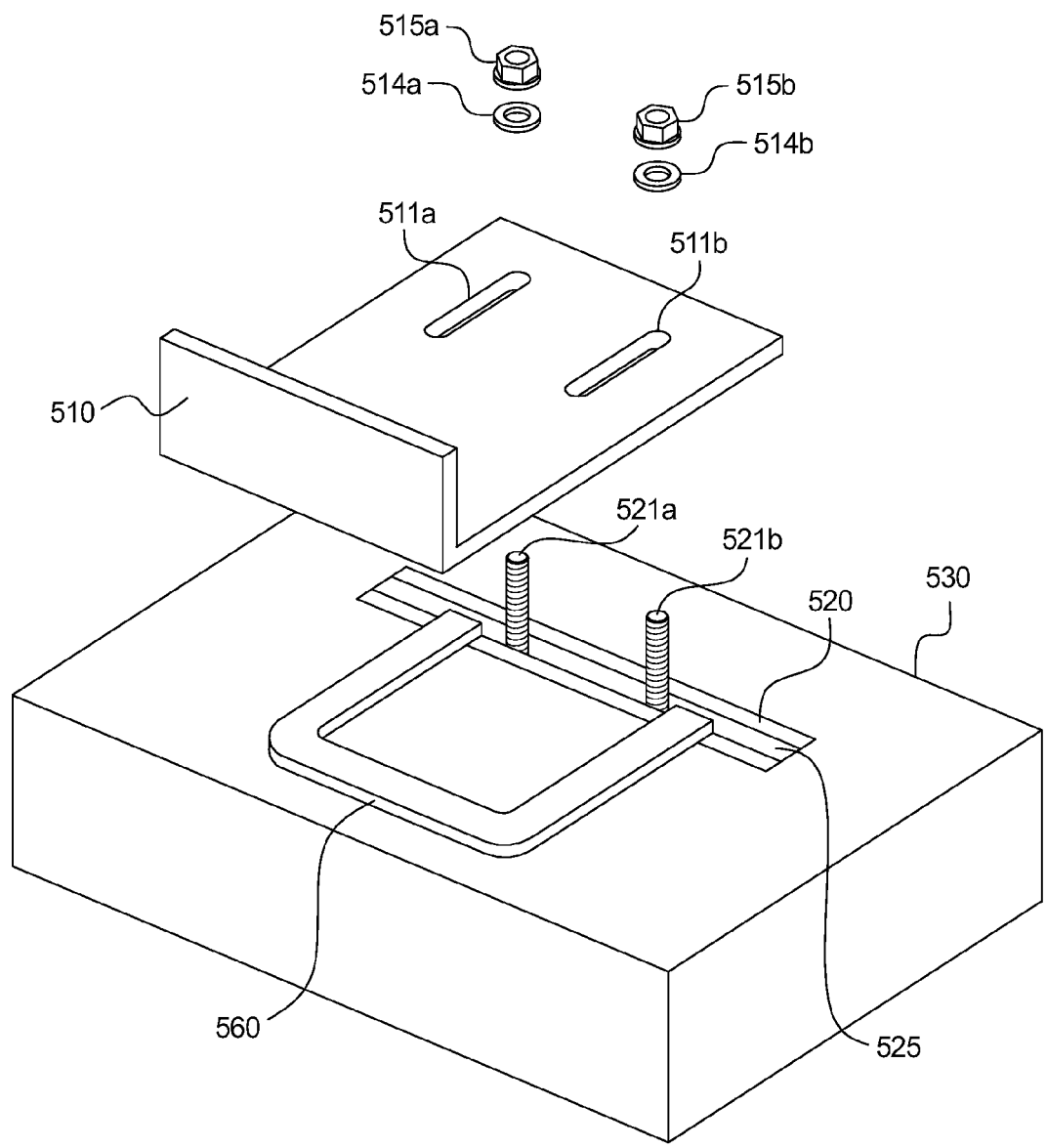
FIG. 5A is an exploded perspective view of another embodiment of the panel bracket leveling system of the present disclosure.

Turning to FIG. 5A, another embodiment of the panel bracket leveling system of the present disclosure includes: (a) a panel bracket 510 defining a plurality of slotted mounting openings 511a and 511b therethrough, (b) a plurality of mounting bolts 521a and 521b, (c) a plurality of washers 514a and 514b, (d) a plurality of nuts 515a and 515b, and (e) a leveling compound 560. The leveling compound may be a single part or a two-part product. In certain embodiments, the leveling compound includes an adhesive component.

In operation of this example, a user applies the leveling compound 560 to a top surface of a concrete slab 530 by applicator, by trowel, or by gasket. The user positions the mounting bolts 521a and 521b within an embedment channel 525 defined by an embedment 520 encased in a concrete slab 530 such that the mounting bolts 521a and 521b extend upwardly from the embedment channel 525. The user positions the panel bracket 510 on the mounting bolts 521a and 521b such that the mounting bolt 521a passes through the slotted mounting opening 511a and the mounting bolt 521b passes through the slotted mounting opening 511b.

The user then presses the panel bracket 510 down onto the leveling compound 560. The user may then adjust the depth of the panel bracket 510 and the position of the panel bracket 510 and/or add additional leveling compound to achieve the desired alignment, elevation, and level. The user then installs the washers 514a and 514b and nuts 515a and 515b as described above.

Figure 5B:
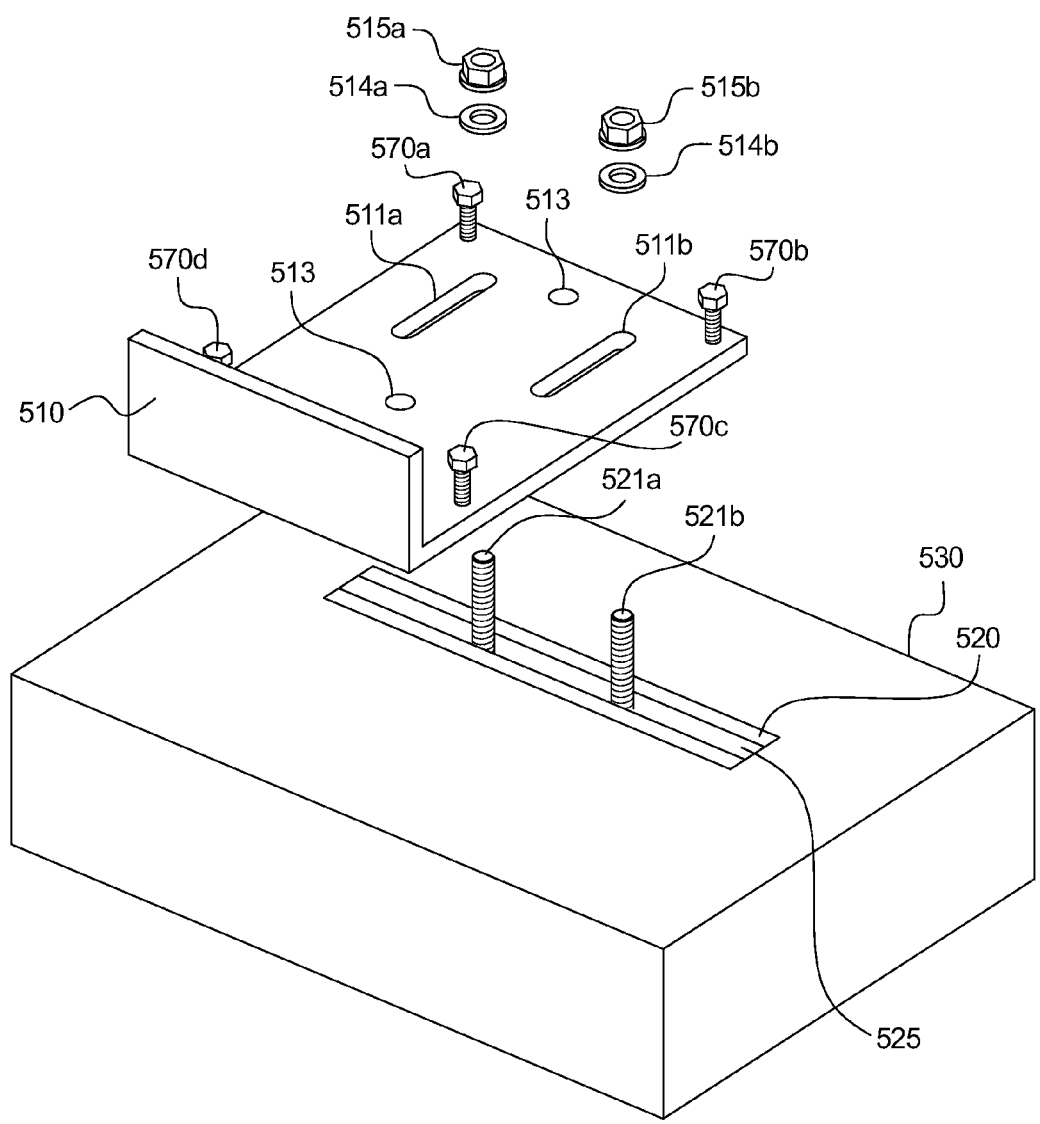
FIG. 5B is an exploded perspective view of another embodiment of the panel bracket leveling system of the present disclosure.

FIG. 5B illustrates another embodiment of the panel bracket leveling system in which each corner of the panel bracket 510 includes a threaded adjustment bolt 570 threadably received by a threaded adjustment bolt receiving opening (not shown). It should be appreciated that the adjustment bolt receiving openings are configured such that the adjustment bolt 570 may protrude below the bottom surface of the panel bracket 540. In this example, the panel bracket 510 also defines a plurality of leveling compound filling ports or openings 513 therethrough. In certain embodiments, the panel bracket defines a single leveling compound filling port therethrough or any suitable quantity of leveling compound filling ports therethrough at any suitable location(s).

In operation, the user positions the panel bracket 510 on the two mounting bolts 521a and 521b as described above. After positioning the panel bracket on the mounting bolts, the user determines whether the panel bracket is level and at a desired elevation. If the panel bracket is not level and/or is not at the desired elevation, the user may screw one or more of the adjustment bolts 570 further into or further out of the respective adjustment bolt receiving openings until the panel bracket is level and at the desired elevation. It should be appreciated that screwing an adjustment bolt further into its respective adjustment bolt receiving opening raises the panel bracket, while screwing the adjustment bolt further out of its respective adjustment bolt receiving opening lowers the panel bracket. The washers and nuts are then installed to secure the panel bracket 510 to the embedment 520, as described above.

After securing the panel bracket 510 to the embedment 520, the user pours, pumps, or otherwise introduces leveling compound (not shown) through the leveling compound filling ports 513. In certain embodiments, the leveling compound filling ports include fittings that facilitate such filling. When the leveling compound cures, it operates with the adjustment bolts to support and maintain the panel bracket such that it remains level and at the desired elevation.

Figure 5C:
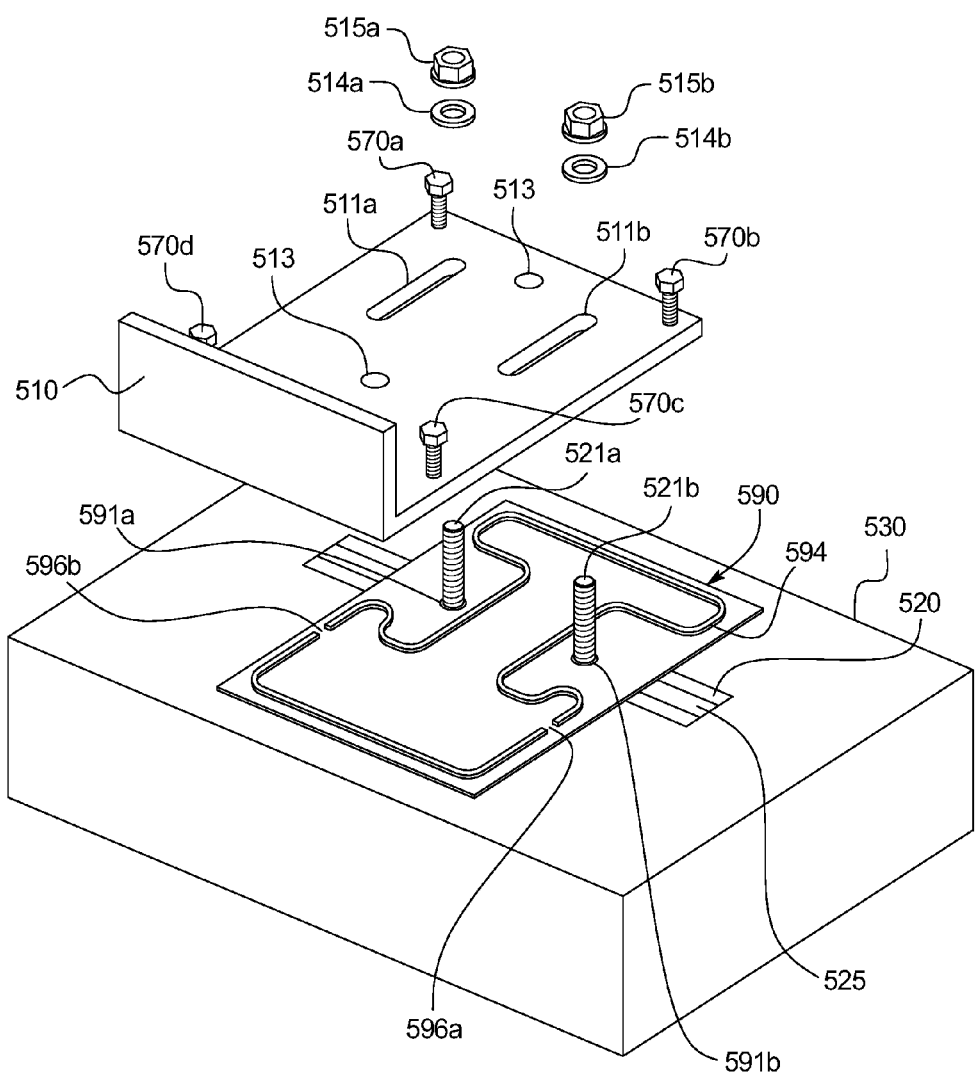
FIG. 5C is an exploded perspective view of another embodiment of the panel bracket leveling system of the present disclosure employing a gasket plate.

FIG. 5C illustrates an embodiment in which a gasket plate 590 is employed to facilitate the introduction of the leveling compound. The gasket plate 590 includes a base 591 defining a plurality of mounting openings 591a and 591b therethrough. The base includes a leveling compound retaining wall 594. The leveling compound retaining wall 594 defines a plurality of weep ports 596a and 596b, which are gaps in the leveling compound retaining wall 594.

In operation, the user positions the gasket plate 590 on the two mounting bolts 521a and 521b such that the mounting bolt 521a passes through the mounting opening 591a and the mounting bolt 521b passes through the mounting opening 591b. As described above, the user positions the panel bracket 510 on the mounting bolts 521a and 521b, levels the panel bracket 510, and secures the panel bracket 510 to the embedment 520 via the washers 514a and 514b and the nuts 515a and 515b, as described above. The user introduces leveling compound through the leveling compound filling ports. In this example, the leveling compound retaining wall 594 prevents the leveling compound from leaking out the sides of the panel bracket 510 until the volume defined by the base of the gasket plate 590, the leveling compound retaining wall 594, and the bottom surface of the panel bracket 510 fills with leveling compound. Once this occurs, a portion of the introduced leveling compound leaks out of one or more of the weep ports 596a and 596b, indicating to the user that enough leveling compound has been introduced.

It should be appreciated that the leveling compound retaining wall may be of any suitable shape and include any suitable quantity of weep ports. In certain embodiments, the gasket plate is made of a pliable material, such as a rubber material, or any other suitable material.

This embodiment of the panel bracket leveling system including leveling compound solves certain of the above-described problems. First, this embodiment of the panel bracket leveling system eliminates the need to manually shim each individual panel bracket, which eliminates: the time required to sift through a variety of shims to pick the proper shim(s) for the job, the time and labor (and associated cost) required to manually insert the shim(s) to level the panel bracket, the need to maintain an inventory of shims, and the need to (in certain instances) purchase custom shims. Second, this embodiment of the panel bracket leveling system enables installers of different skill levels to more consistently level panel brackets, which reduces the potential for improper installation and compromised panel brackets and curtain wall panels. Third, the variable adjustment of the adjusters of this embodiment of the panel bracket leveling system enables a wide range of adjustment, unlike shims that enable a comparatively smaller range of adjustment.

Fourth, the elimination of shims increases the speed at which each panel bracket is installed and leveled, which reduces construction time and labor costs. Fifth, the elimination of shims eliminates the need to weld stacks of shims together in certain instances. Sixth, the elimination of shims significantly reduces the likelihood of the mounting bolts bending over time. Seventh, unlike shims, the adjusters and leveling compound of this embodiment of the panel bracket leveling system are unlikely to shift in areas where seismic activity occurs.

Panel Bracket Leveling System Including an Anchor Assembly With Levelers

In another embodiment, the panel bracket leveling system of the present disclosure includes an anchor assembly including a plurality of anchors, each of which includes an independently rotatable leveler. Generally, in operation of this embodiment: (a) a user positions an anchor assembly mounting base at a desired location on a deck; (b) the user secures the anchor assembly mounting base to the deck; (c) the user attaches the anchor assembly to the anchor assembly mounting base; (d) concrete is poured to a desired depth above the deck to encase the anchor assembly; (e) the user removes a protective cover of the anchor assembly to expose the levelers; (f) the user places a panel bracket atop the concrete and above the levelers; (g) if necessary, the user independently adjusts (e.g., raises or lowers) one or more of levelers using a leveler adjuster to ensure that the panel bracket is level and at a desired elevation; (h) once the panel bracket is level and at the desired elevation, the user installs a plurality of leveler rotation preventers that prevent the levelers from rotating relative to the anchors and that prevent the panel bracket from sliding relative to the anchors; and (i) the user secures the panel bracket and leveler rotation preventers to the anchors using a plurality of fasteners threaded into the anchors.

Figure 6A:
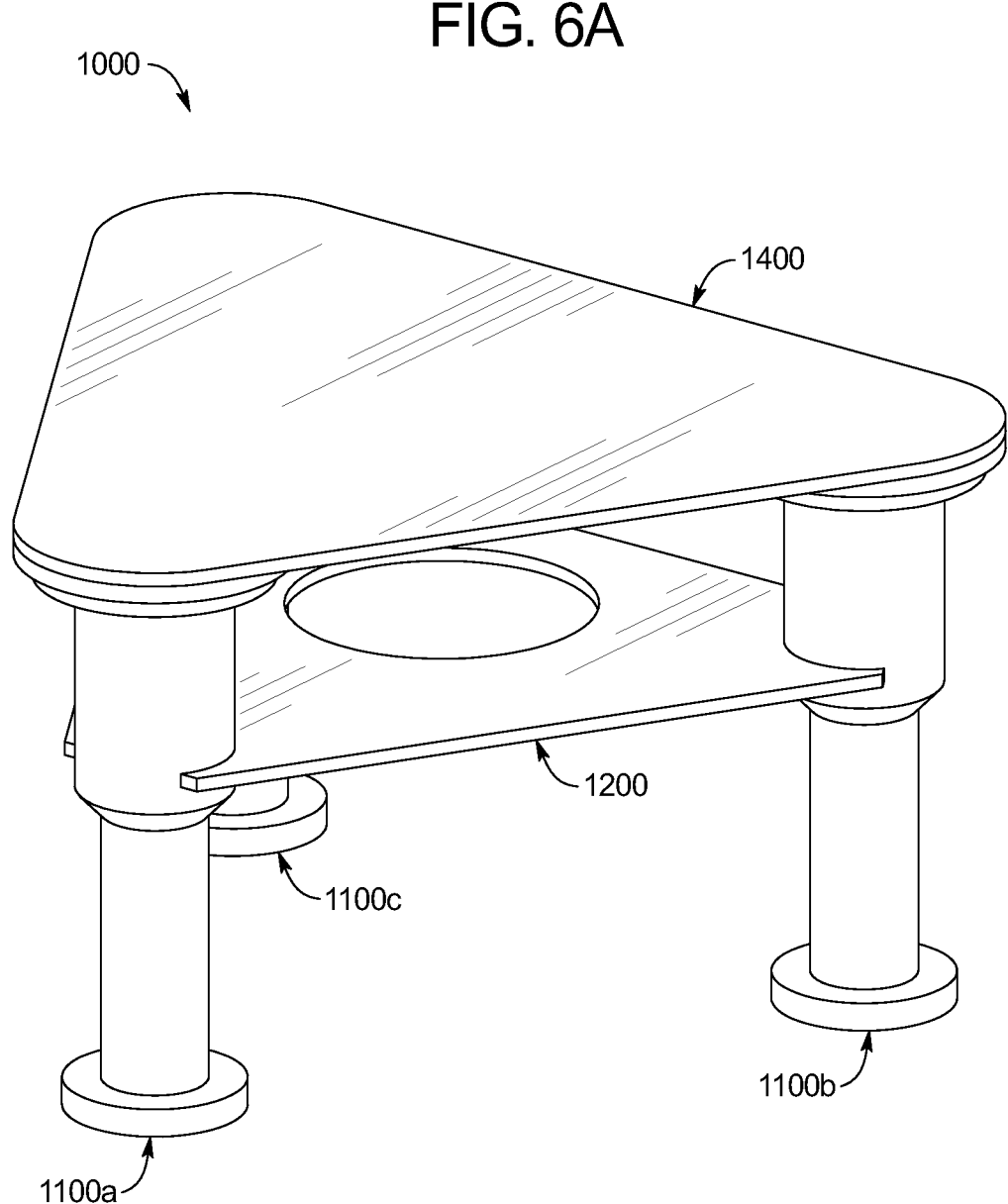
FIG. 6A is a perspective view of an anchor assembly of another embodiment of the panel bracket leveling system of the present disclosure in an assembled configuration.
Figure 11A:
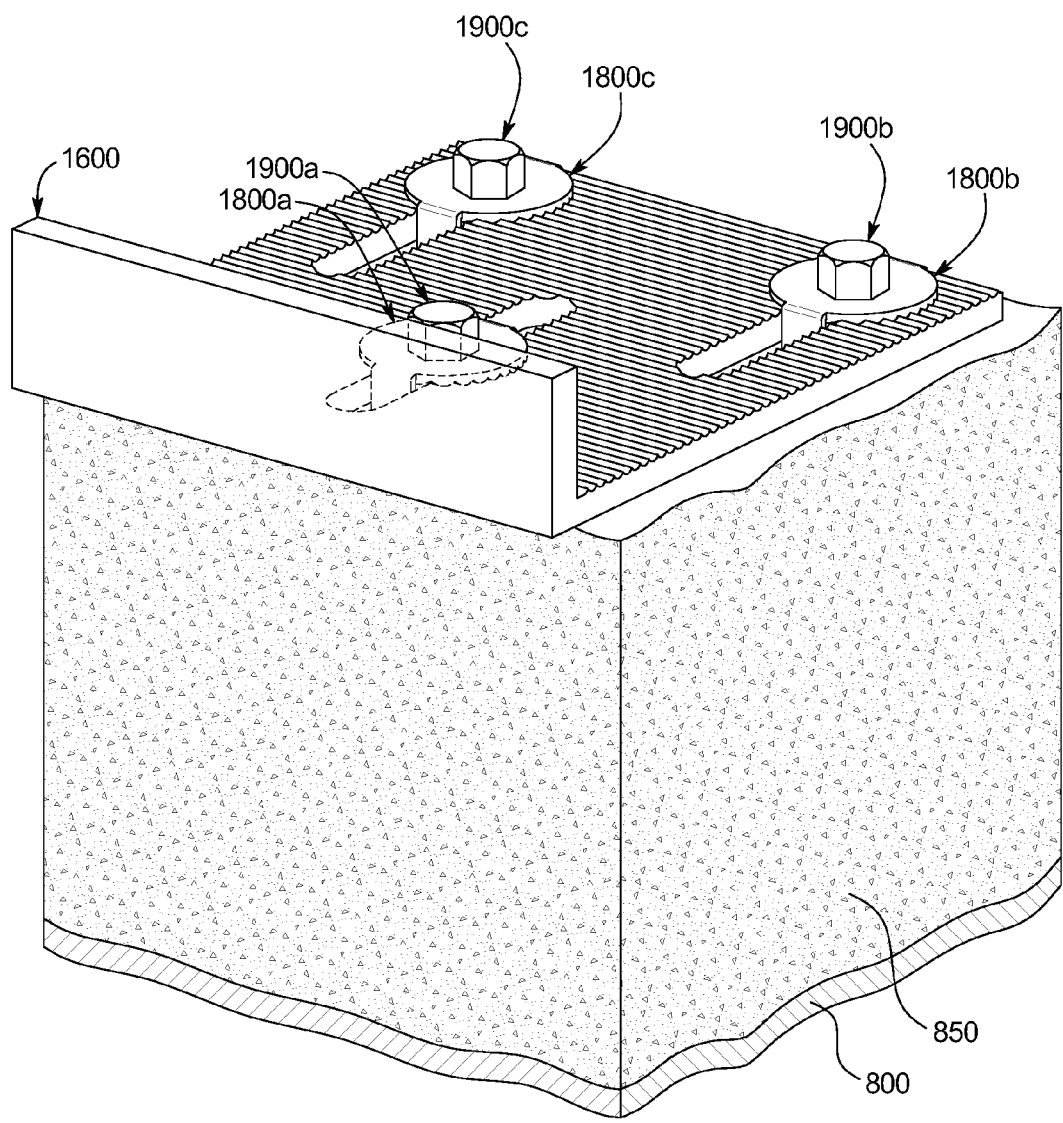
FIG. 11A is a perspective view of the anchor array of the anchor assembly of FIGS. 6A and 6B after it is cast in the concrete and after a panel bracket is secured to the anchors.
Figure 12A:
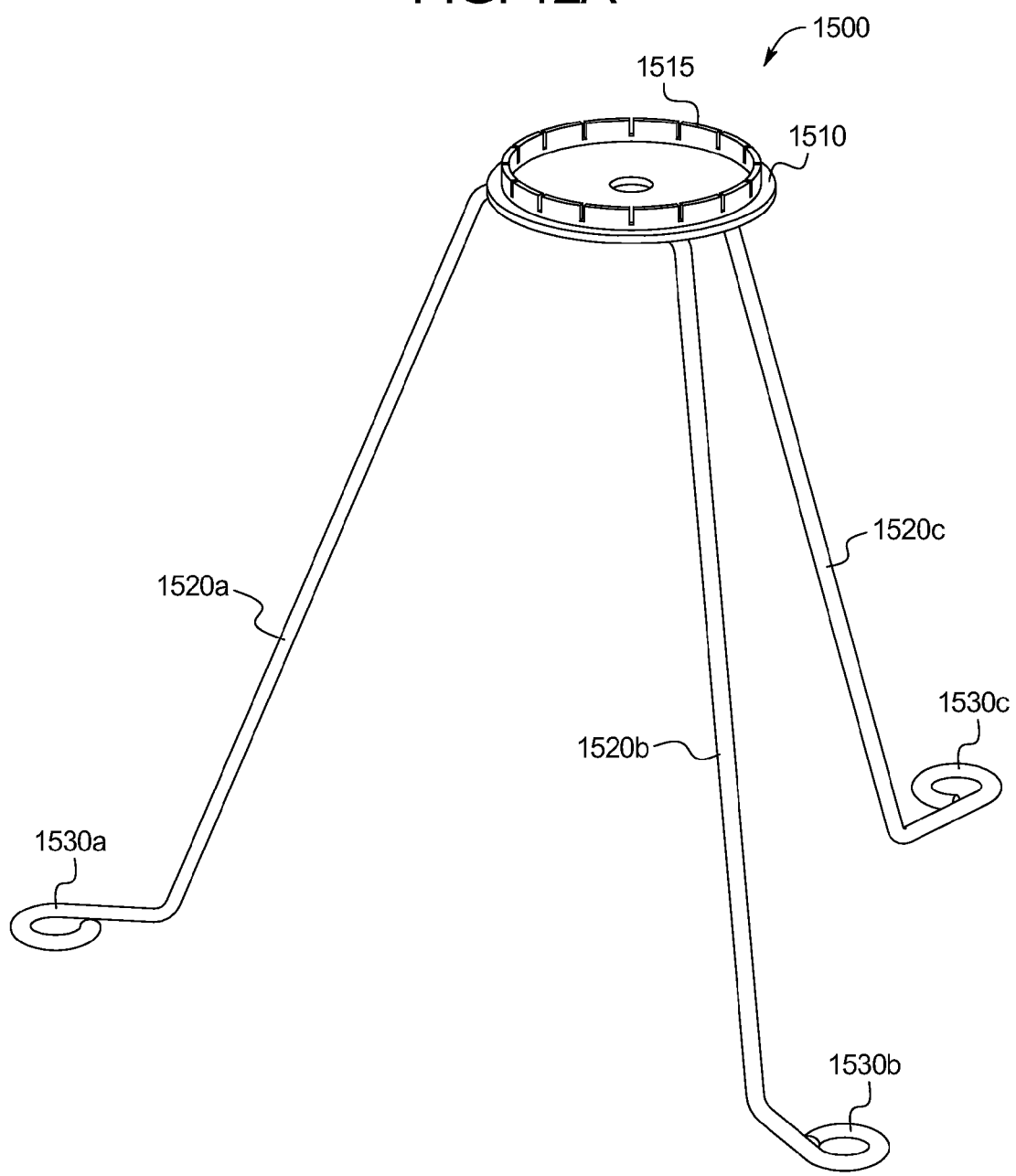
FIG. 12A is a perspective view of an anchor assembly mounting base of FIGS. 11A and 11B.
Figure 12B:
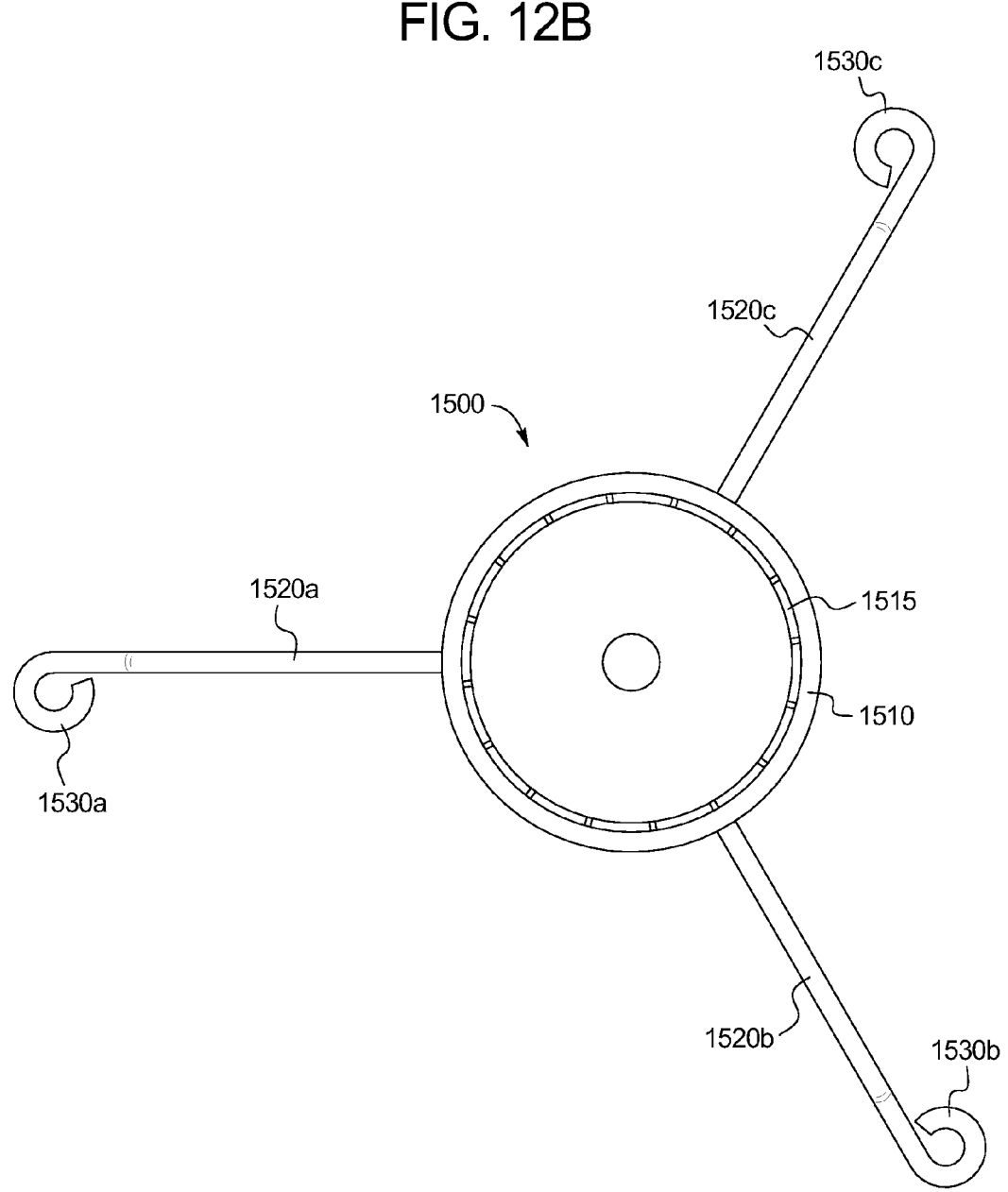
FIG. 12B is a top plan view of the anchor assembly mounting base of FIG. 12A.
Figure 13A:
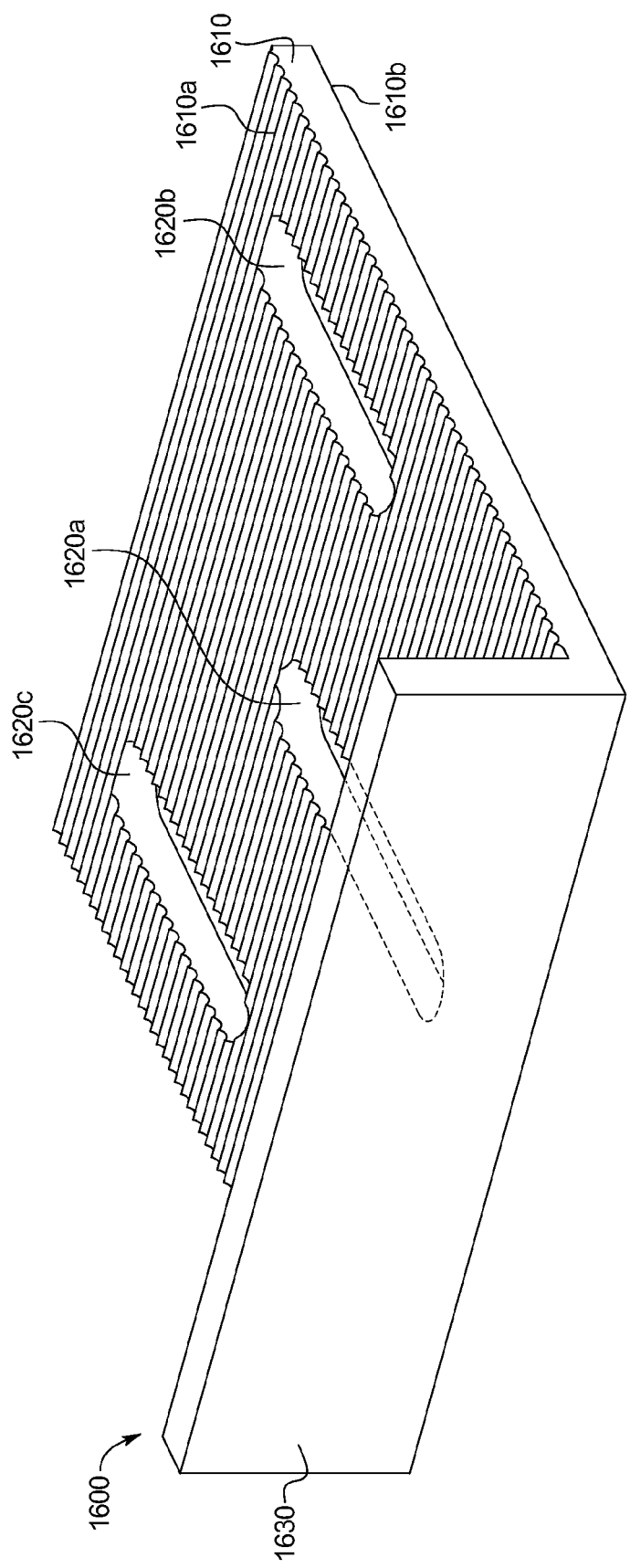
FIG. 13A is a perspective view of a panel bracket of FIGS. 11A and 11B.
Figure 13C:
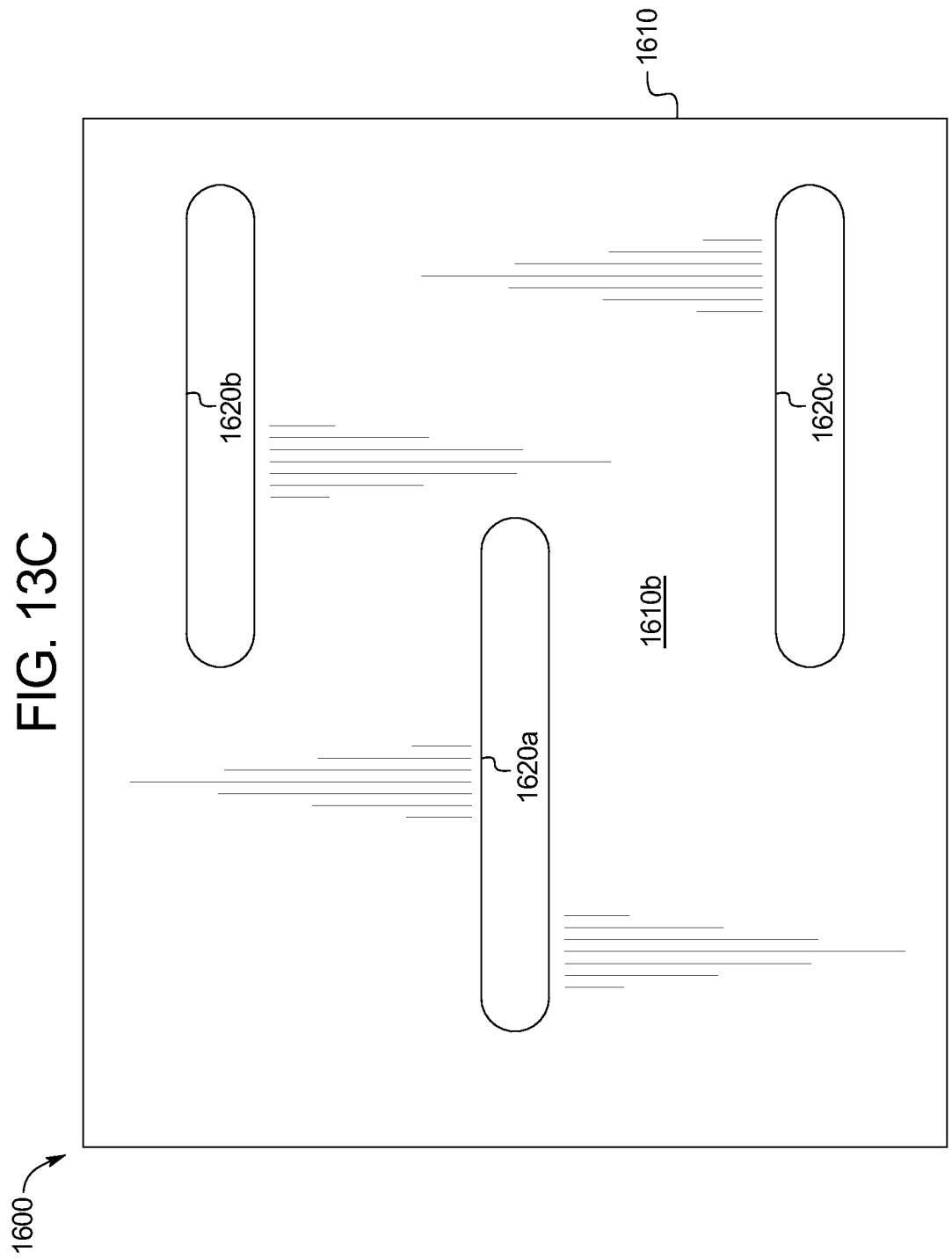
FIG. 13C is a bottom plan view of the panel bracket of FIG. 13A.
Figure 13D:
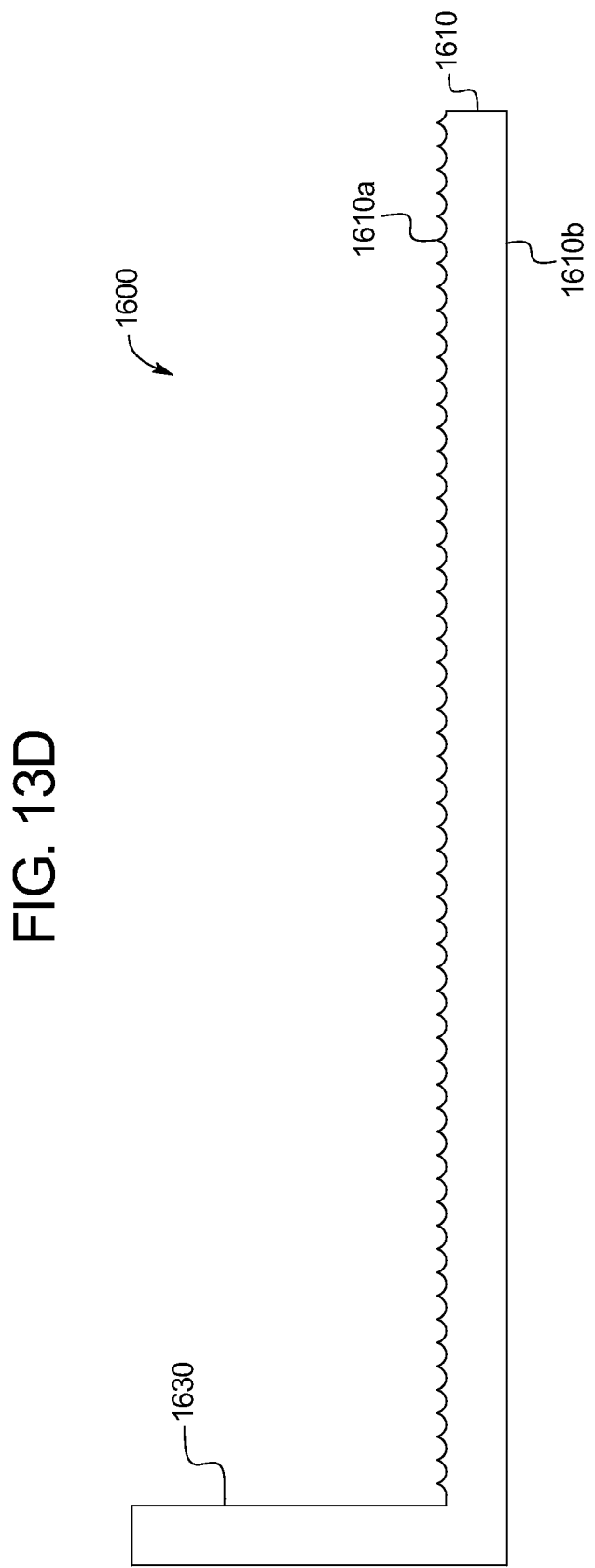
FIG. 13D is a side elevational view of the panel bracket of FIG. 13A.
Figure 14A:
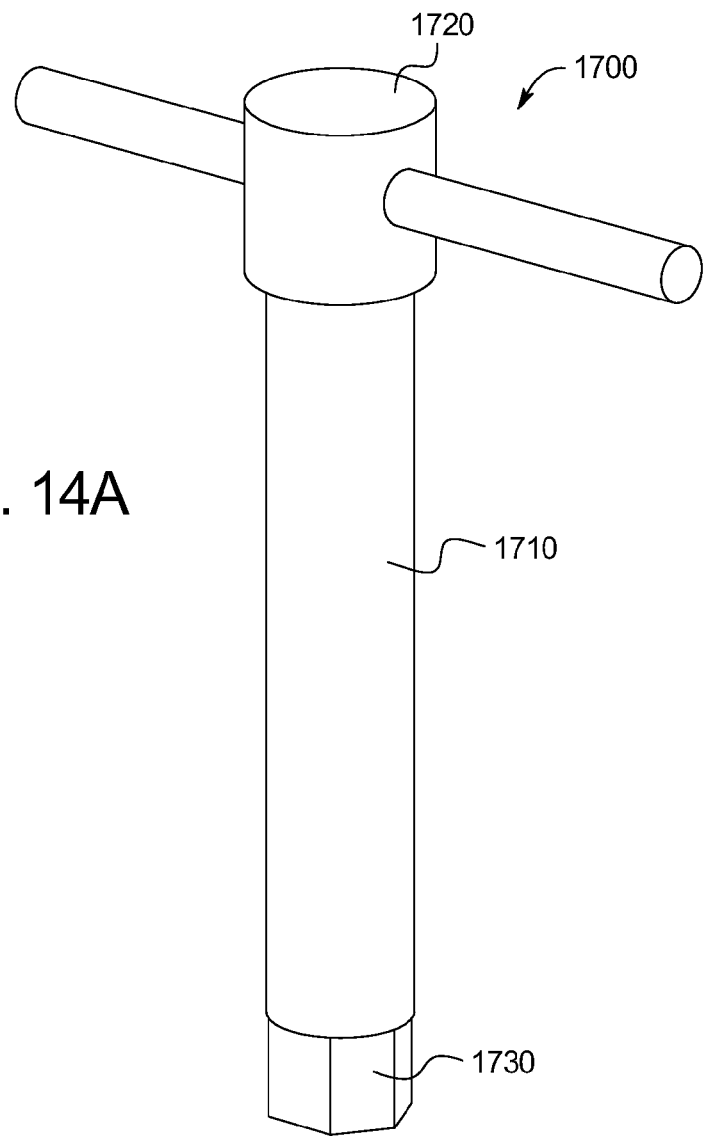
FIG. 14A is a perspective view of a leveler adjuster.
Figure 14B:
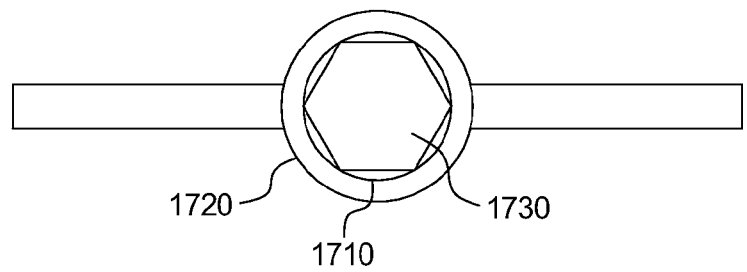
FIG. 14B is a bottom plan view of the leveler adjuster of FIG. 14A.
Figure 15A:
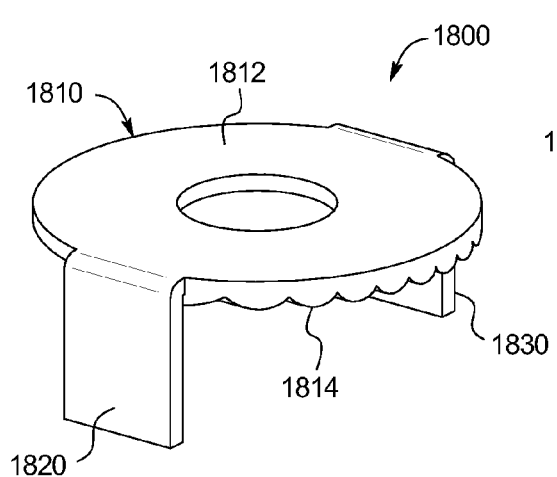
FIG. 15A is a perspective view of a leveler rotation preventer of FIGS. 11A and 11B.
Figure 15B:
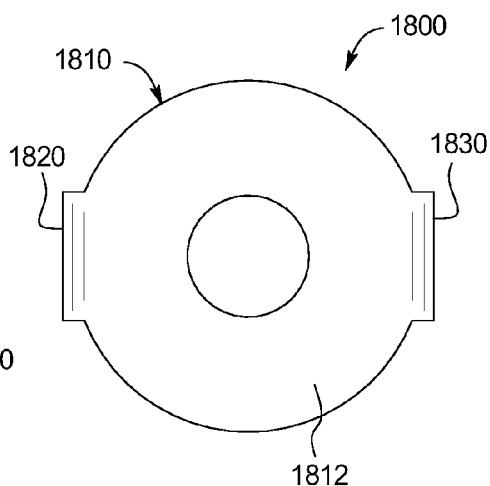
FIG. 15B is a top plan view of the leveler rotation preventer of FIG. 15A.
Figure 15C:
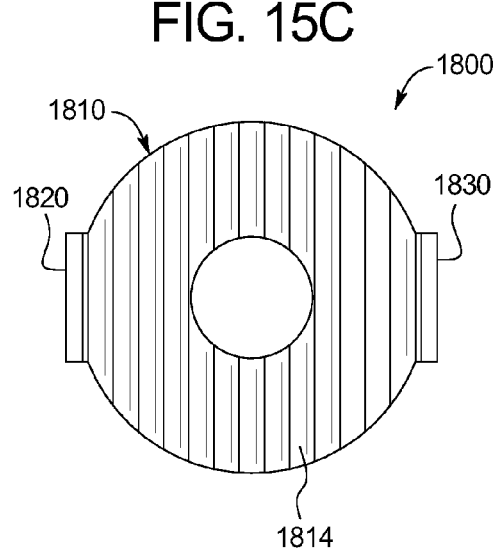
FIG. 15C is a bottom plan view of the leveler rotation preventer of FIG. 15A.
Figure 15D:
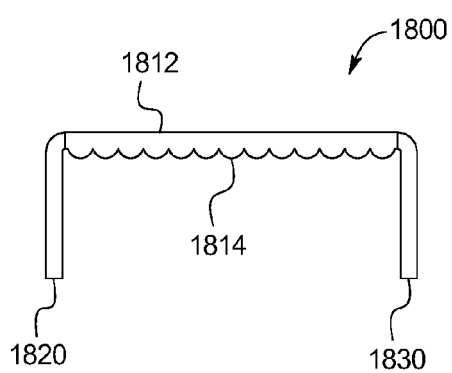
FIG. 15D is a side elevational view of the leveler rotation preventer of FIG. 15A.
Figure 16:
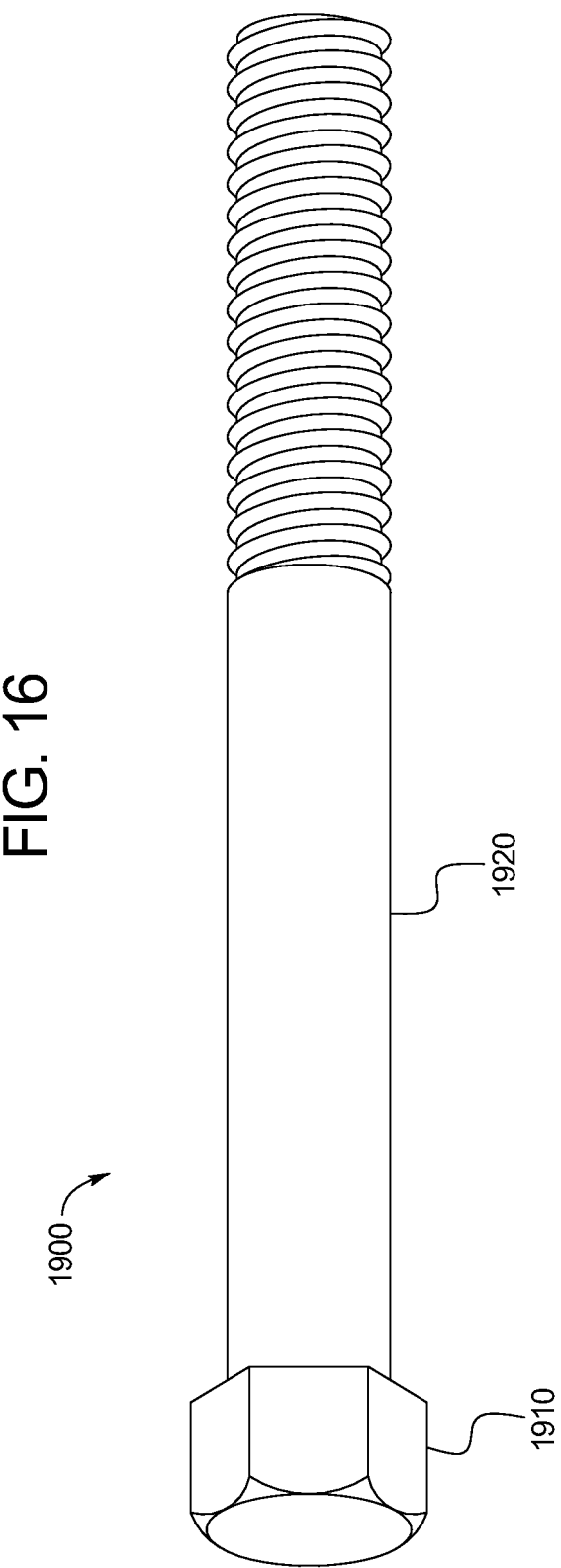
FIG. 16 is a perspective view of a threaded fastener of FIGS. 11A and 11B.

FIGS. 6A and 6B illustrate the anchor assembly. FIGS. 7A to 7D illustrate one of the anchors. FIG. 8 illustrates the anchor connector connecting the anchors of the anchor assembly. FIGS. 9A to 9D illustrate one of the levelers. FIGS. 10A to 10D illustrate the protective cover. FIGS. 11A and 11B illustrate assembled and exploded views of the panel bracket leveling system. FIGS. 12A and 12B illustrate the anchor assembly mounting base. FIGS. 13A to 13D illustrate the panel bracket. FIGS. 14A and 14B illustrate the leveler adjuster. FIGS. 15A to 15D illustrate one of the leveler rotation preventers. FIG. 16 illustrates the fastener. FIGS. 17A to 17K illustrate a process by which the anchor assembly is employed to mount a panel bracket while ensuring that the panel bracket is level and at a desired elevation. FIGS. 18A to 24C illustrate additional embodiments of the panel bracket leveling system and certain components thereof.

Turning to FIGS. 6A and 6B, the anchor assembly 1000 includes the following components, each of which is described in detail below: (a) an anchor array 1050 including a plurality of anchors 1100a, 1100b, and 1100c and an anchor connector 1200 that is attached to and connects each of the anchors 1100a, 1100b, and 1100c to one another; (b) a plurality of threaded levelers 1300a, 1300b, and 1300c threadably received by the anchors 1100a, 1100b, and 1100c, respectively; and (c) a protective cover 1400 that is removably attachable to each of the levelers 1300a, 1300b, and 1300c. While the anchor array includes three anchors arranged in a generally triangular configuration in this embodiment, it should be appreciated that the anchor array may include any suitable quantity of anchors arranged in any suitable configuration.

Turning to FIGS. 7A, 7B, 7C, and 7D, each anchor 1100 includes an anchor body 1110 extending between a first or upper flange 1140 and a second or lower flange 1150.

Figure 7A:
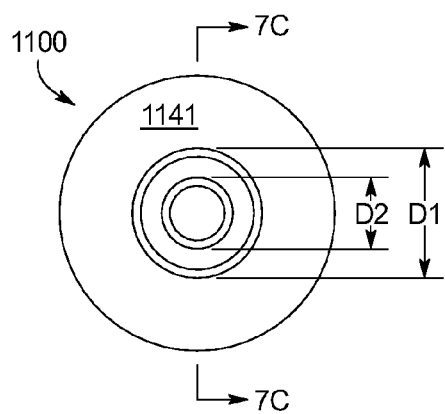
FIG. 7A is a top plan view of an anchor of the anchor assembly of FIGS. 6A and 6B.
Figure 7B:
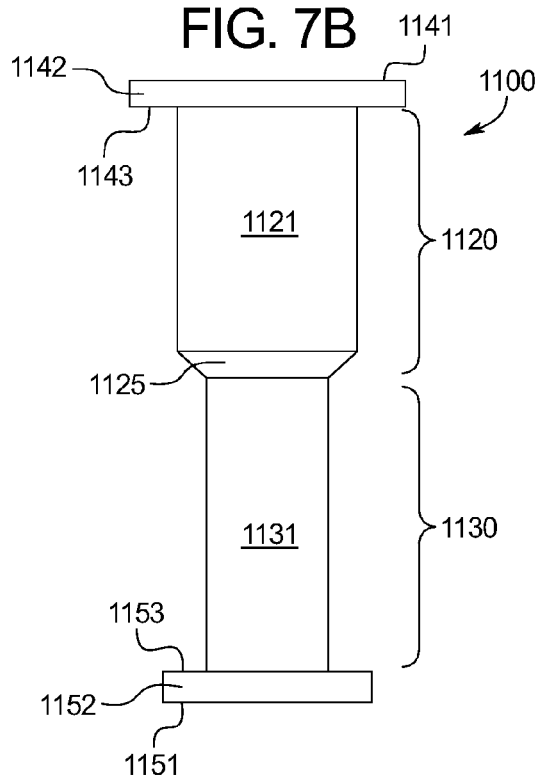
FIG. 7B is a side elevational view of the anchor of FIG. 7A.
Figure 7C:
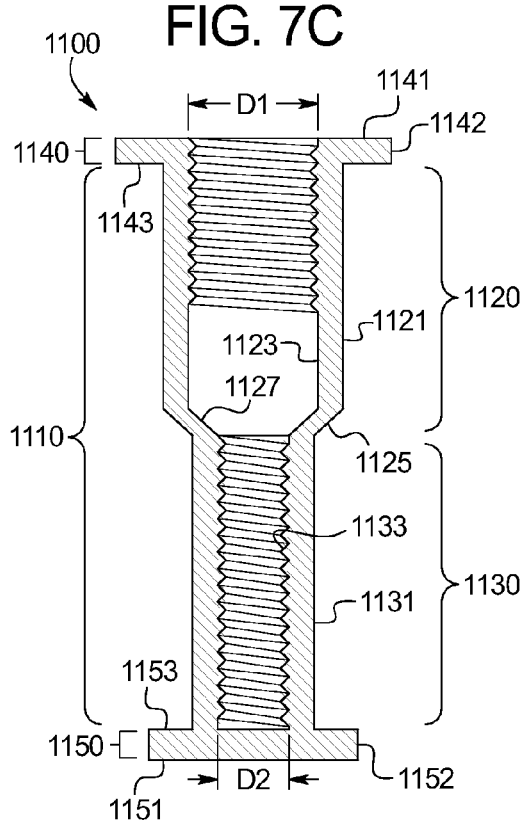
FIG. 7C is a cross-sectional view of the anchor of FIG. 7A taken substantially along line 7C-7C of FIG. 7A.
Figure 7D:
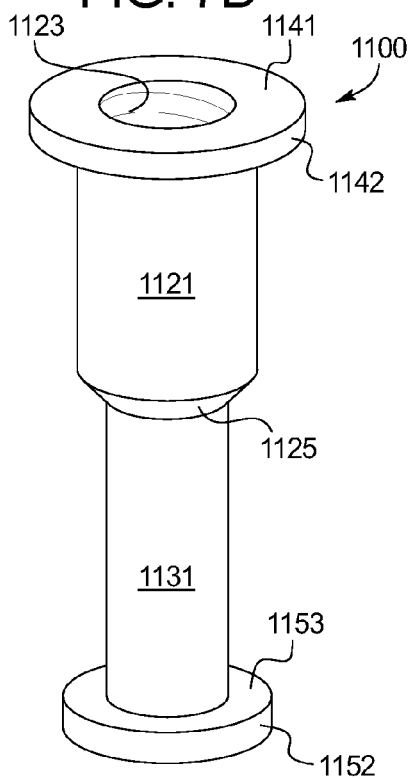
FIG. 7D is a perspective view of the anchor of FIG. 7A.

The anchor body 1110 includes a leveler receiver 1120 and a coaxial fastener receiver 1130. The leveler receiver 1120 is generally a hollow cylinder with a tapered bottom, and is defined by: (a) a generally cylindrical outer surface 1121, (b) a tapered outer surface 1125, (c) a generally cylindrical inner surface 1123, and (d) a tapered inner surface 1127. The fastener receiver 1130 is generally a hollow cylinder, and is defined by: (a) a generally cylindrical outer surface 1131, and (b) a generally cylindrical inner surface 1133. As best shown in FIG. 7C, the tapered outer surface 1125 connects the outer surface 1121 of the leveler receiver 1120 to the outer surface 1131 of the fastener receiver 1130, and the tapered inner surface 1127 connects the inner surface 1123 of the leveler receiver 1120 to the inner surface 1133 of the fastener receiver 1130.

The upper flange 1140 is generally annular, and is defined by: (a) a generally annular upper surface 1141, (b) a generally cylindrical outer surface 1142, (c) a generally annular lower surface 1143, and (d) the inner surface 1123. The lower flange 1150 is generally disc-shaped, and is defined by: (a) a generally annular upper surface 1153, (b) a generally cylindrical outer surface 1152, (c) a generally circular lower surface 1151. As best shown in FIG. 7C, the lower surface 1143 of the upper flange 1140 connects to the outer surface 1121 of the leveler receiver 1120, and the upper surface 1153 of the lower flange 1150 connects to the outer surface 1131 of the fastener receiver 1130.

As also best shown in FIG. 7C, in this illustrated embodiment, the inner surface 1123 of the leveler receiver 1120 has a diameter D1 and is partially threaded such that the leveler receiver 1120 may threadably receive a threaded leveler 1300 (described below). While this inner surface is partially threaded in this illustrated embodiment, it should be appreciated that any suitable amount of threading may be employed for this inner surface of the leveler receiver. Additionally, in this illustrated embodiment, the inner surface 1133 of the fastener receiver 1130 has a diameter D2, which is less than the diameter D1, and is threaded such that the fastener receiver 1130 may threadably receive a threaded fastener, such as a bolt 1900 (described below). While this inner surface is almost completely threaded in this illustrated embodiment, it should be appreciated that any suitable amount of threading may be employed for this inner surface of the fastener receiver.

Turning to FIG. 8, the anchor connector 1200 is generally triangular and includes: (a) a plurality of curved anchor body engagers 1210a, 1210b, and 1210c, each of which is positioned at a different corner of the anchor connector 1200; and (b) a generally cylindrical surface 1220 defining a generally cylindrical mounting base receiving opening through the anchor connector 1200. As best shown in FIG. 17B below, the mounting base receiving opening is configured to enable the anchor connector 1200 to be mounted to a mounting base 1500 (as described below). As best shown in FIGS. 6A and 6B, each anchor body engager 1210 engages the outer surface 1121 of the leveler receiver 1120 of the anchor body 1110 of the anchor 1100. In this illustrated embodiment, each anchor 1100a, 1100b, and 1100c is tack welded to its corresponding anchor body engager 1210a, 1210b, and 1210c.

It should be appreciated that this anchor connector is one example anchor connector, and that any other suitable anchor connector may be employed to connect the anchors. In another embodiment, the anchors are configured to removably attach to the anchor connector via a snap-fit, a press-fit, or in any other suitable manner. In another embodiment, the anchor connector includes one or more wire forms attached to the anchors. It should also be appreciated that the anchor connector may attach to any suitable portion of the anchors, such as any suitable portion of the anchor body, the upper flange, or the lower flange.

Figure 9A:
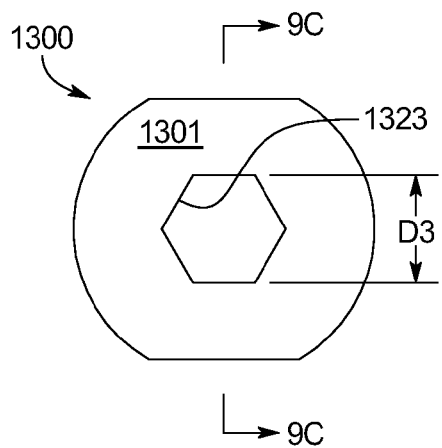
FIG. 9A is a top plan view of a leveler of the anchor assembly of FIGS. 6A and 6B.
Figure 9B:
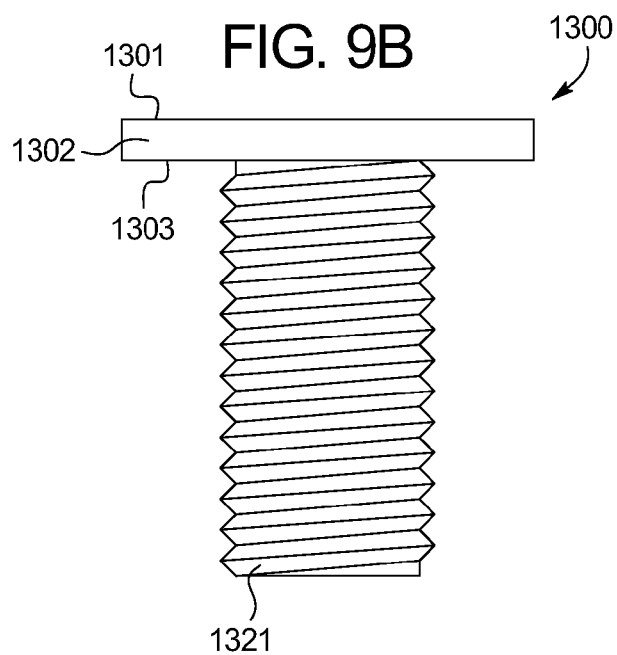
FIG. 9B is a side elevational view of the leveler of FIG. 9A.
Figure 9C:
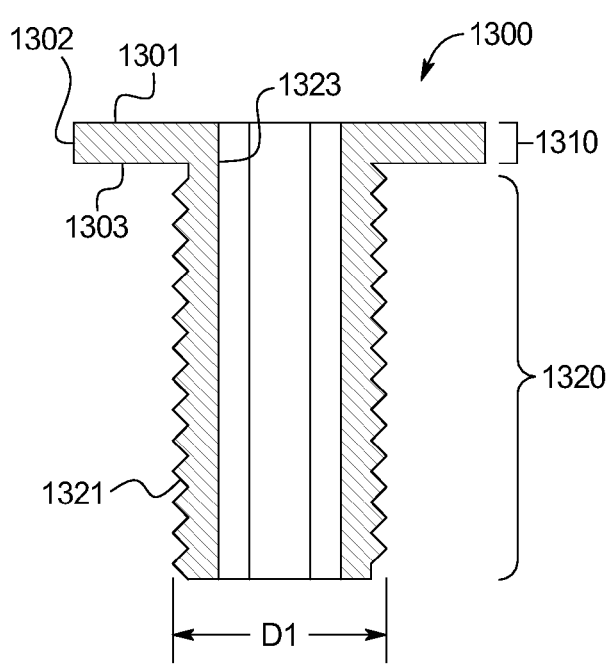
FIG. 9C is a cross-sectional view of the leveler of FIG. 9A taken substantially along line 9C-9C of FIG. 9A.

Turning to FIGS. 9A, 9B, 9C, and 9D, each leveler 1300 includes a leveler head 1310 and a leveler body 1320 extending therefrom. The leveler head 1310 is defined by: (a) an upper surface 1301, (b) an outer surface 1302, (c) a lower surface 1303, and (d) an inner surface 1323. The leveler body 1320 is generally a hollow cylinder, and is defined by: (a) a generally cylindrical outer surface 1321, and (b) the inner surface 1323. As best shown in FIG. 9C, the lower surface 1303 of the leveler head 1310 connects to the outer surface 1321 of the leveler body 1320.

Figure 9D:
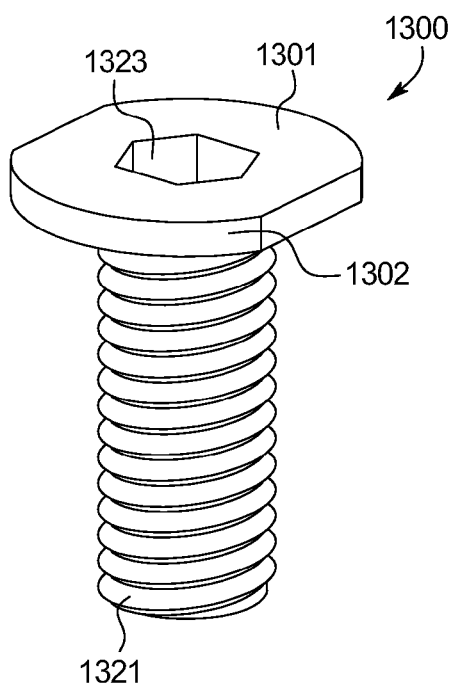
FIG. 9D is a perspective view of the leveler of FIG. 9A.
Figure 10A:
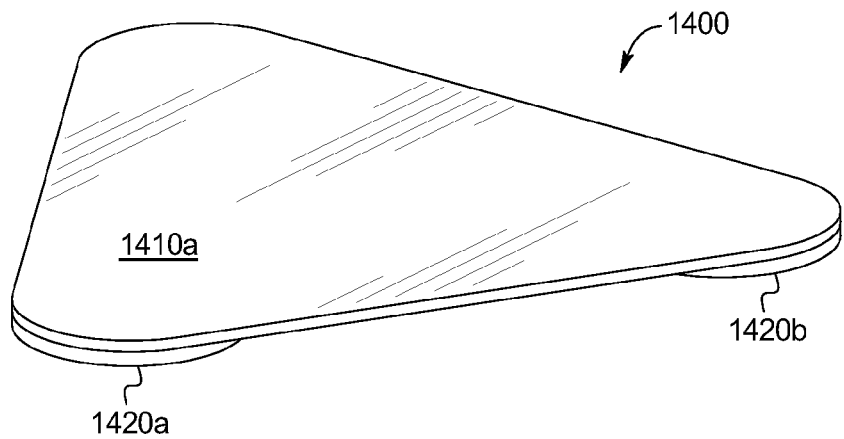
FIG. 10A is a perspective view of a protective cover of the anchor assembly of FIGS. 6A and 6B.
Figure 10B:
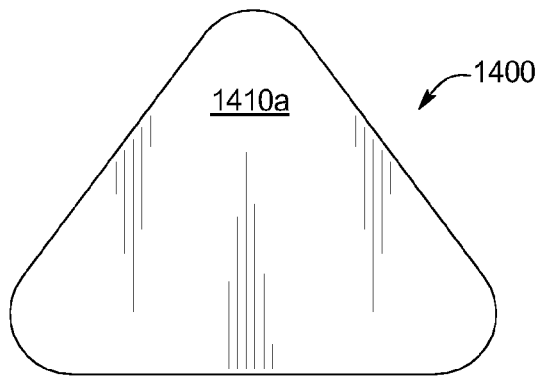
FIG. 10B is a top plan view of the protective cover of FIG. 10A.
Figure 10C:
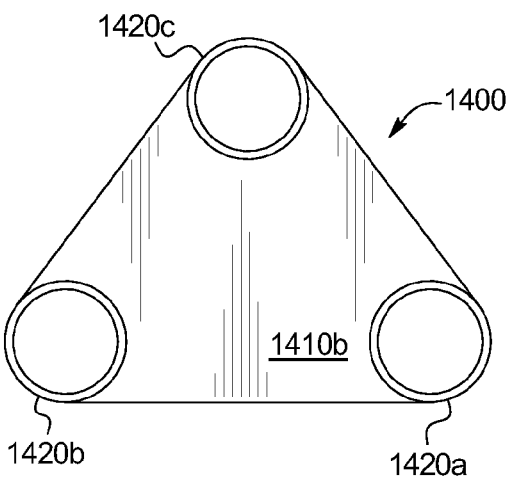
FIG. 10C is a bottom plan view of the protective cover of FIG. 10A.
Figure 10D:
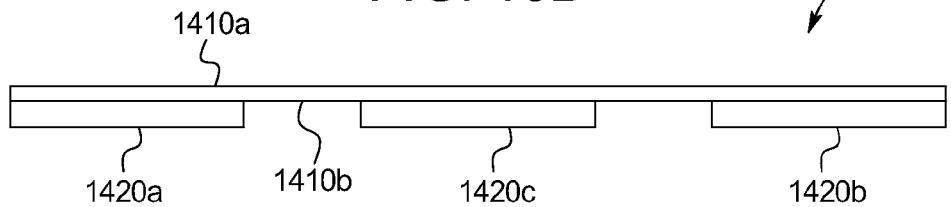
FIG. 10D is a side elevational view of the protective cover of FIG. 10A.

As best shown in FIGS. 9A and 9D, the outer profile of the leveler head 1310, which is formed by the outer edges of the upper surface 1301 and the lower surface 1303, is generally rectangular and includes two opposing, generally straight edges and two opposing, generally curved edges. As best shown in FIG. 9D, this shape of the outer profile causes the outer surface 1302 to have two opposing flat faces and two opposing curved faces. As further described below with respect to FIG. 17I, locking tabs of a leveler rotation preventer 1800 engage these generally flat faces after installation.

While in this illustrated embodiment the outer profile of the leveler head includes two opposing straight edges and two opposing curved edges, it should be appreciated that the outer profile of the leveler head may have any suitable shape. In another embodiment, the outer profile of the leveler head is generally rectangular and includes two sets of opposing straight edges, which causes the outer surface of the leveler head to have two sets of opposing flat faces. In another embodiment, the outer profile of the leveler head is generally hexagonal and includes three sets of opposing straight edges, which causes the outer surface of the leveler head to have three sets of opposing flat faces. In another embodiment, the outer profile of the leveler head is generally octagonal and includes four sets of opposing straight edges, which causes the outer surface of the leveler head to have four sets of opposing flat faces.

As best shown in FIGS. 9A and 9C, the inner surface 1323 has a hexagonal profile formed by six generally rectangular faces. This inner surface defines an opening through the leveler head 1310 and the leveler body 1320 and, therefore, through the leveler 1300, that has a hexagonal profile. In this illustrated embodiment, the distance separating any two opposing faces of the inner surface 1323 is equal to D3, which is less than the diameter D1 and greater than the diameter D2. This enables a bolt 1900, which has the diameter D2 and is described below, to pass through the opening defined through the leveler 1300 without resistance. In other words, in this embodiment, the bolt 1900 and the leveler 1300 may be screwed into or out of the fastener receiver and the leveler receiver, respectively, independent of one another.

While in this illustrated embodiment the profile of the opening defined through the leveler is hexagonal, it should be appreciated that this profile may have any suitable shape. In various embodiments, the profile is: rectangular, square, triangular, octagonal, torx-shaped, or star-shaped.

As best shown in FIGS. 9B, 9C, and 9D, in this illustrated embodiment the outer surface 1321 of the leveler body 1320 has the diameter D1 and is threaded such that the leveler 1300 may be threaded into (and out of) the leveler receiver of an anchor 1100 (described above). While this outer surface is almost completely threaded in this illustrated embodiment, it should be appreciated that any suitable amount of threading may be employed for this outer surface of the leveler body.

Turning to FIGS. 10A, 10B, 10C, and 10D, the removable protective cover 1400 includes: (a) a generally triangular base 1410 having an upper surface 1410a and a lower surface 1410b; and (b) a plurality of leveler head engagers 1420a, 1420b, and 1420c, each of which is positioned at a different corner of the base 1410 and extends from the lower surface 1420b of the base 1410. In this illustrated embodiment, as best shown in FIG. 6A, each leveler head engager 1420 is configured to engage and removably attach to the leveler head 1310 of a different leveler 1300, such as via a snap-fit or a press-fit. Once a leveler head engager 1420 is attached to the leveler head 1310 of a corresponding leveler 1300, the protective cover prevents or substantially prevents undesired materials, such as concrete, construction debris, and the like, from entering the opening defined through the leveler 1300.

In other embodiments, the anchor assembly includes individual protective covers for each of the levelers. In certain such embodiments, each protective cover is configured to engage and removably attach to the leveler head of a different leveler to cover the opening defined through that leveler. In further embodiments, the protective cover is a removable, adhesive-backed plastic sheet that is adhered to the top surfaces of the levelers to cover the openings defined through the levelers. It should be appreciated that any other suitable protective cover or covers may be employed to prevent concrete, debris, and other materials from entering the openings defined through the levelers.

FIG. 11A illustrates a top perspective view of one embodiment of the anchor array after it is cast in the concrete and after a panel bracket is secured to the anchors. FIG. 11B illustrates an exploded configuration of the components used to cast the anchor array in the concrete and to secure the panel bracket to the anchors. It should be appreciated that the concrete is not shown in FIG. 11B for clarity.

The following components (in addition to those described above) are employed to cast the anchor array in the concrete and to secure the panel bracket to the anchors: (a) an anchor assembly mounting base 1500 that is removably attachable to the anchor connector 1200; (b) a panel bracket 1600 that is mountable to the anchors 1100a, 1100b, and 1100c; (c) a plurality of leveler rotation preventers 1800a, 1800b, and 1800c configured to, when installed, prevent the levelers 1300a, 1300b, and 1300c from rotating and the panel bracket 1600 from sliding relative to the anchors 1100a, 1100b, and 1100c; and (d) a plurality of threaded bolts 1900a, 1900b, and 1900c that may be threadably received by the fastener receivers 1130 of the anchors 1100a, 1100b, and 1100c to secure the panel bracket 1600 to the anchors 1100a, 1100b, and 1100c.

Turning to FIGS. 12A and 12B, the anchor assembly mounting base 1500 includes: (a) an anchor assembly mounting base body 1510; (b) a plurality of circumferentially-spaced legs 1520a, 1520b, and 1520c extending downward from the anchor assembly mounting base body 1510 and respectively ending in feet 1530a, 1530b, and 1530c; and (c) a plurality of anchor connector engagers or fingers 1515 extending upward from the anchor assembly mounting base body 1510. In this illustrated embodiment, each of the feet 1530 defines a circular fastener receiving opening therethrough configured to receive a fastener, such as a nail or a screw. This enables the feet 1530 (and, therefore, the anchor assembly mounting base 1500) to be secured to a suitable surface, such as a concrete form or a deck. In certain embodiments in which the feet are metal, the feet may be welded to a metal form or a metal deck.

Additionally, as best shown in FIG. 17B below, in this example embodiment, the anchor connector engagers 1515 are configured to engage and removably attach to the anchor connector 1200 via the mounting base receiving opening defined therethrough, such as through use of a snap-fit or a press-fit. It should be appreciated that the anchor connector may connect to the anchor assembly mounting base in any other suitable manner, such as via fasteners (such as screws) and/or welds.

Turning to FIGS. 13A, 13B, 13C, and 13D, the panel bracket 1600 is "L-shaped" and includes: (a) a generally rectangular base 1610 having an upper surface 1610a and a lower surface 1610b, and (b) a generally rectangular hanger 1630 extending perpendicularly upward from one end of the base 1610. The upper surface 1610a of the base 1610 includes a plurality of teeth configured to engage and interlock with corresponding teeth of leveler rotation preventers 1800 (described below). The base 1610 also includes a plurality of surfaces 1620a, 1620b, and 1620c, which are generally rectangular with rounded edges, that each define a separate mounting slot through the base 1610. It should be appreciated that the positions of the mounting slots generally correspond to the positions of the anchors 1100 in the anchor array such that, when the panel bracket 1600 is placed on the anchor array, each anchor 1100 is positioned under a different mounting slot.

Turning to FIGS. 14A and 14B, the leveler adjuster 1700 includes: (a) a generally cylindrical leveler adjuster body 1710, (b) a handle 1720 at one end of the leveler adjuster body 1710, and (c) a leveler engager 1730 at an opposite end of the leveler adjuster body 1710. The leveler engager 1730 has a profile shaped such that the leveler engager 1730 may engage the inner surface 1323 that defines the opening through the leveler 1300. This enables the leveler 1300 to be threaded into or out of the leveler receiver 1120 of the anchor body 1110 of the anchor 1100 when the leveler engager 1300 is inserted into the opening defined through the leveler 1300 and rotated clockwise or counter-clockwise. Here, the leveler engager 1730 has a hexagonal profile that corresponds to the hexagonal profile of the inner surface 1323 of the leveler 1300.

Turning to FIGS. 15A, 15B, 15C, and 15D, each leveler rotation preventer 1800 includes: (a) a generally annular leveler rotation preventer body 1810 having an upper surface 1812 and a lower surface 1814; and (b) two generally rectangular, opposing locking tabs 1820 and 1830 extending downward from the leveler rotation preventer body 1810. The inner surfaces of the locking tabs 1820 and 1830 are configured to engage the opposing flat faces of the leveler head 1310 of a leveler 1300. The lower surface 1814 includes a plurality of teeth corresponding to and configured to engage and interlock with the teeth on the upper surface 1610a of the base 1610 of the panel bracket 1600.

Turning to FIG. 16, the bolt 1900 includes: (a) a bolt head 1910, and (b) a generally cylindrical, partially threaded bolt body 1920. The bolt body 1920 has the diameter D2, and may be threaded into the fastener receiver 1130 of the anchor body 1110 of an anchor 1100 to (at least in part) secure a panel bracket 1600 to the anchor array 1050.

FIGS. 17A to 17K illustrate a process by which the anchor assembly is employed to mount a panel bracket while ensuring that the panel bracket is level and at a desired elevation. It should be appreciated that this is one suitable example, and that the present disclosure contemplates a variety of additional processes employing the components described herein.

Figure 17A:
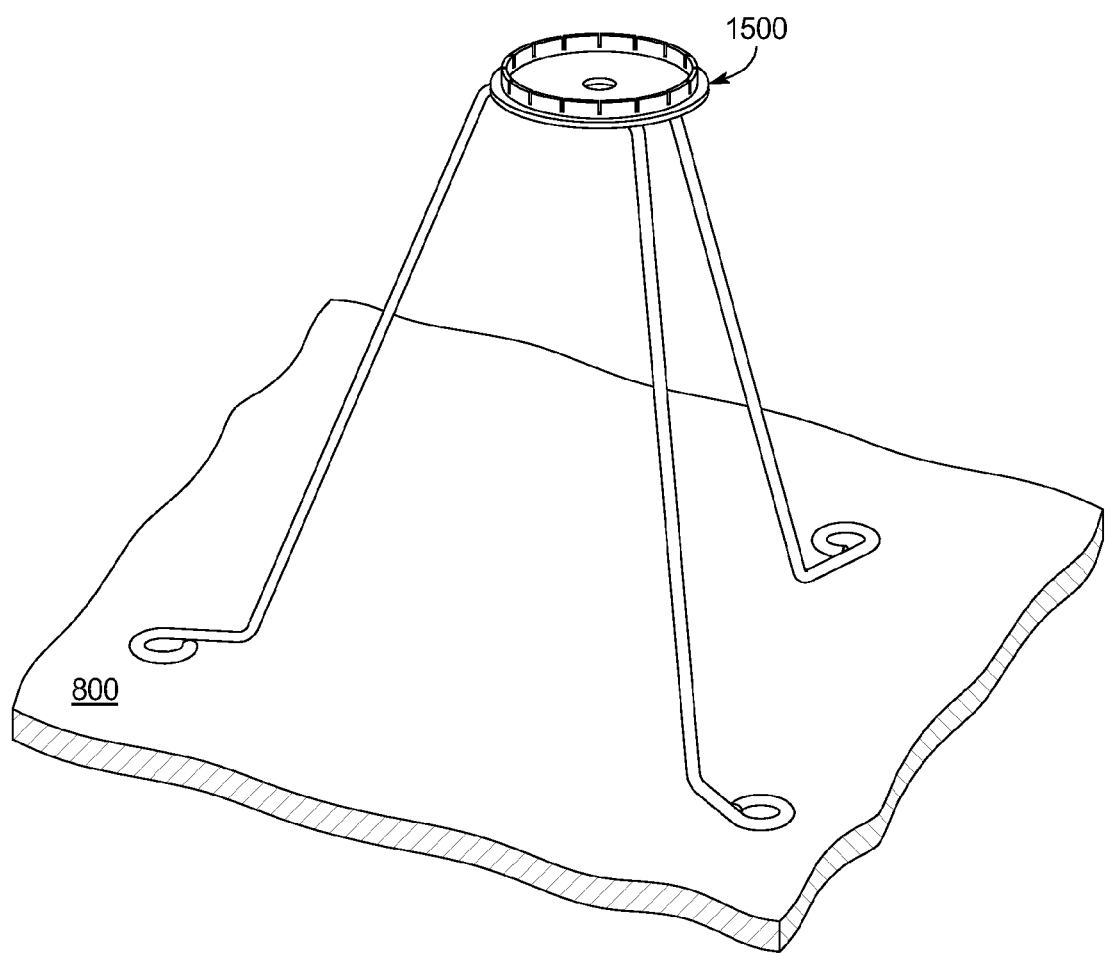
Figure 17B:
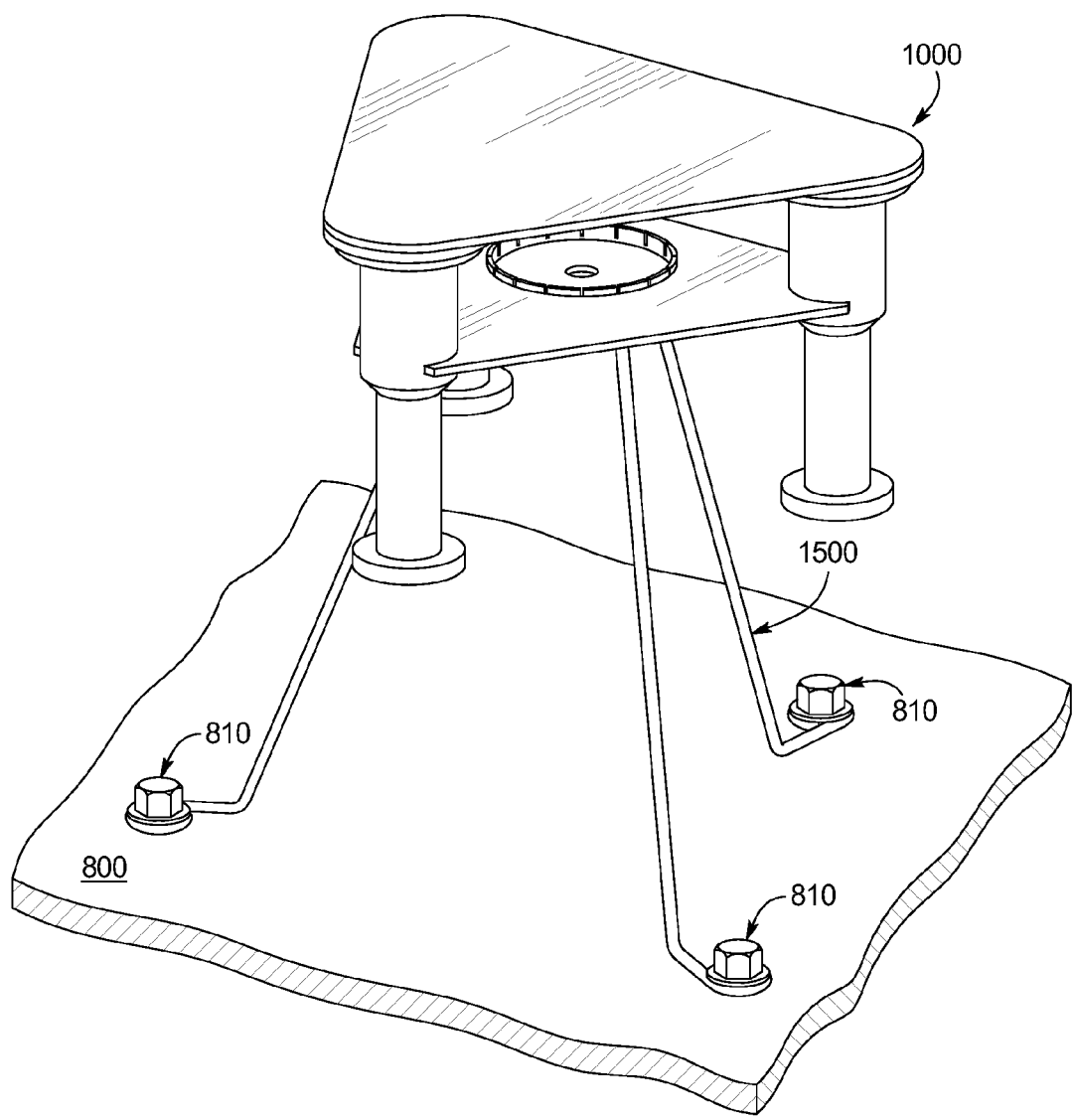

As shown in FIG. 17A, a user positions the anchor assembly mounting base 1500 at a desired location on a deck 800. As shown in FIG. 17B, in this illustrated example, the user secures the anchor assembly mounting base 1500 to the deck 800 by inserting a screw 810 through the fastener receiving opening of each foot 1530 of the anchor assembly mounting base 1500 and into the deck 800. The user attaches the anchor assembly 1000 to the anchor assembly mounting base 1500 by inserting the anchor connector engagers 1515 through the mounting base receiving opening defined through the anchor connector 1200.

Figure 17C:
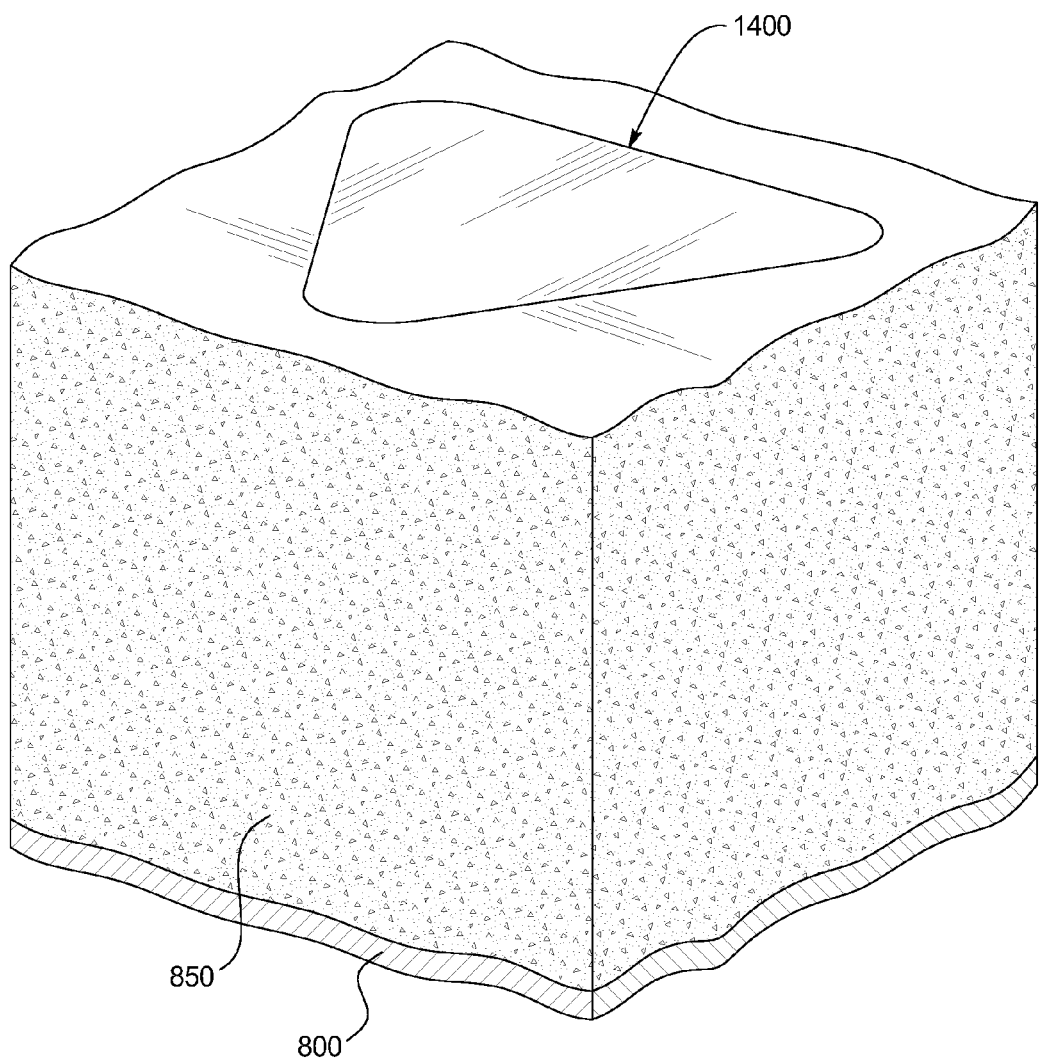
Figure 17D:
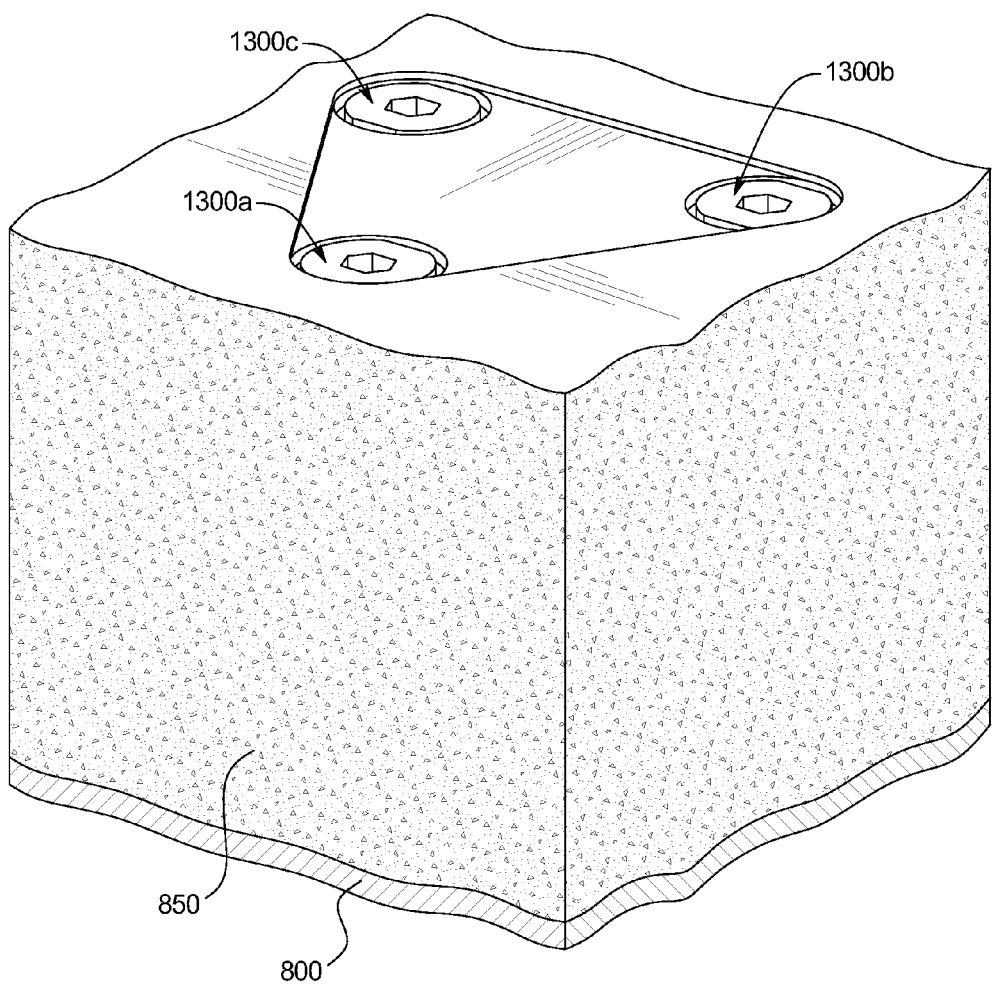

As shown in FIG. 17C, concrete 950 is then poured to a desired depth above the deck 800. It should be appreciated that during pouring the protective cover 1400 prevents the concrete 850 from entering the openings defined through the levelers 1300a, 1300b, and 1300c. As shown in FIG. 17D, after the concrete 850 is cured, the user removes the protective cover 1400 to expose the levelers 1300a, 1300b, and 1300c.

Figure 17E:
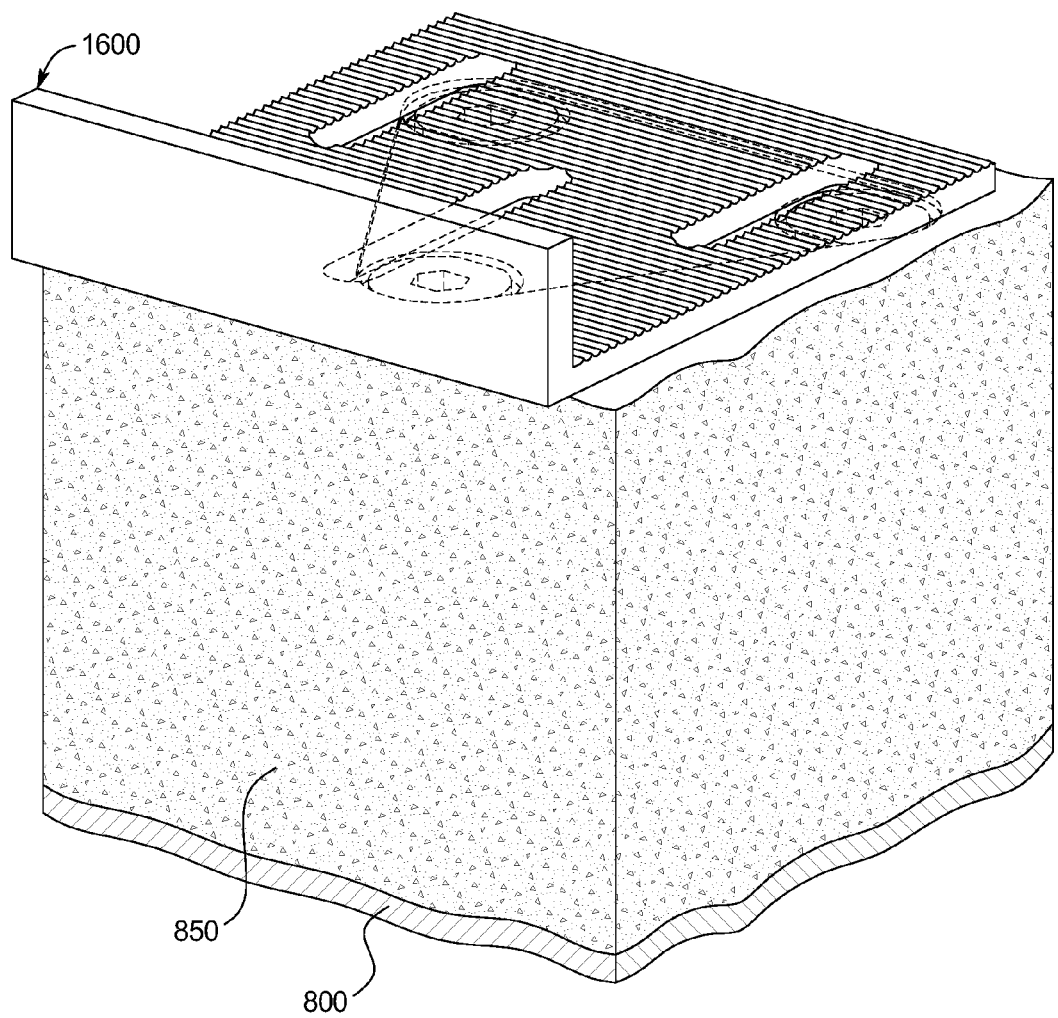

As shown in FIG. 17E, the user places the panel bracket 1600 atop the levelers such that: (a) the lower surface 1610b of the panel bracket abuts or substantially abuts the concrete and is positioned above the upper surfaces 1301a, 1301b, and 1301c of the levelers 1300a, 1300b, and 1300c; (b) the opening defined through the leveler 1300a is aligned with the mounting slot defined by the surface 1620a of the panel bracket 1600; (c) the opening defined through the leveler 1300b is aligned with the mounting slot defined by the surface 1620b of the panel bracket 1600; and (d) the opening defined through the leveler 1300c is aligned with the mounting slot defined by the surface 1620c of the panel bracket 1600.

Figure 17F:
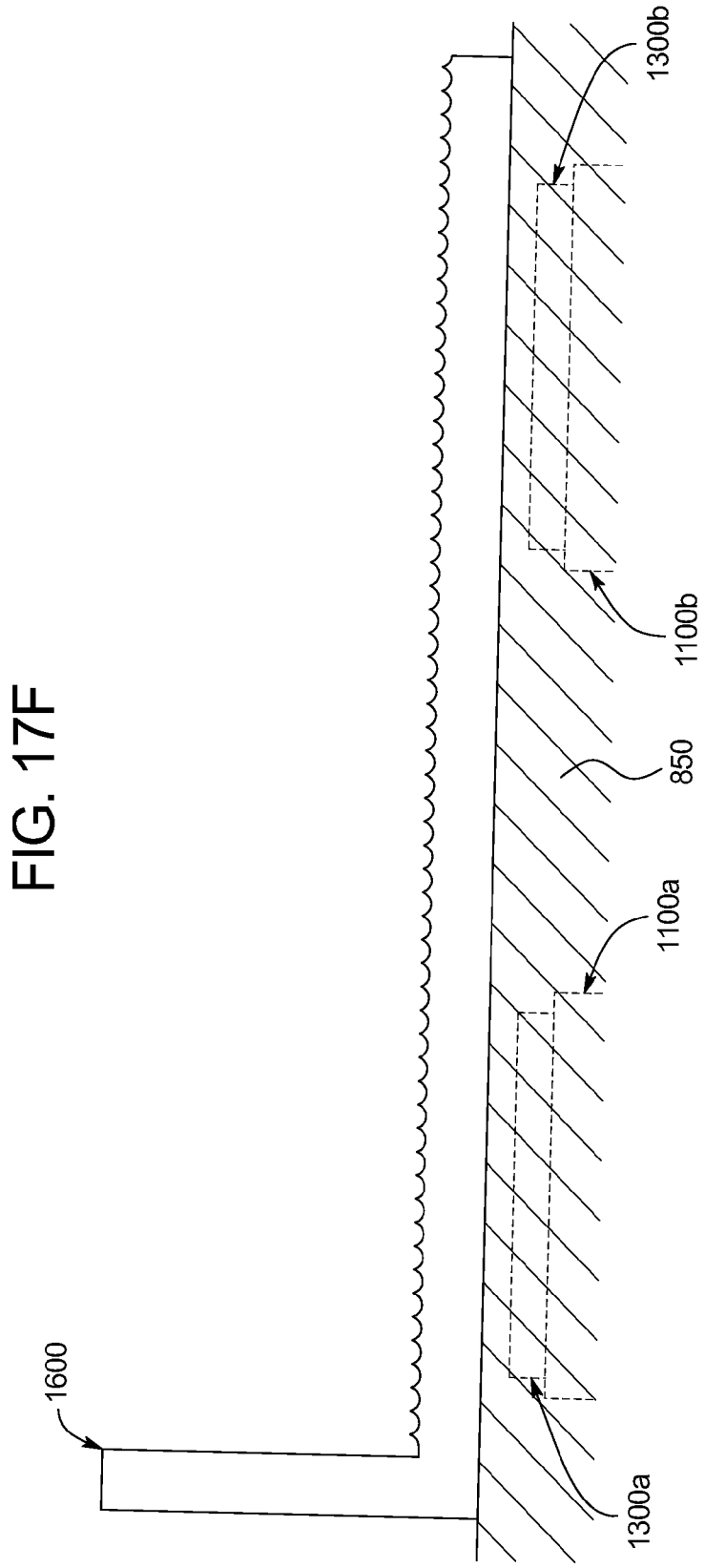
Figure 17G:
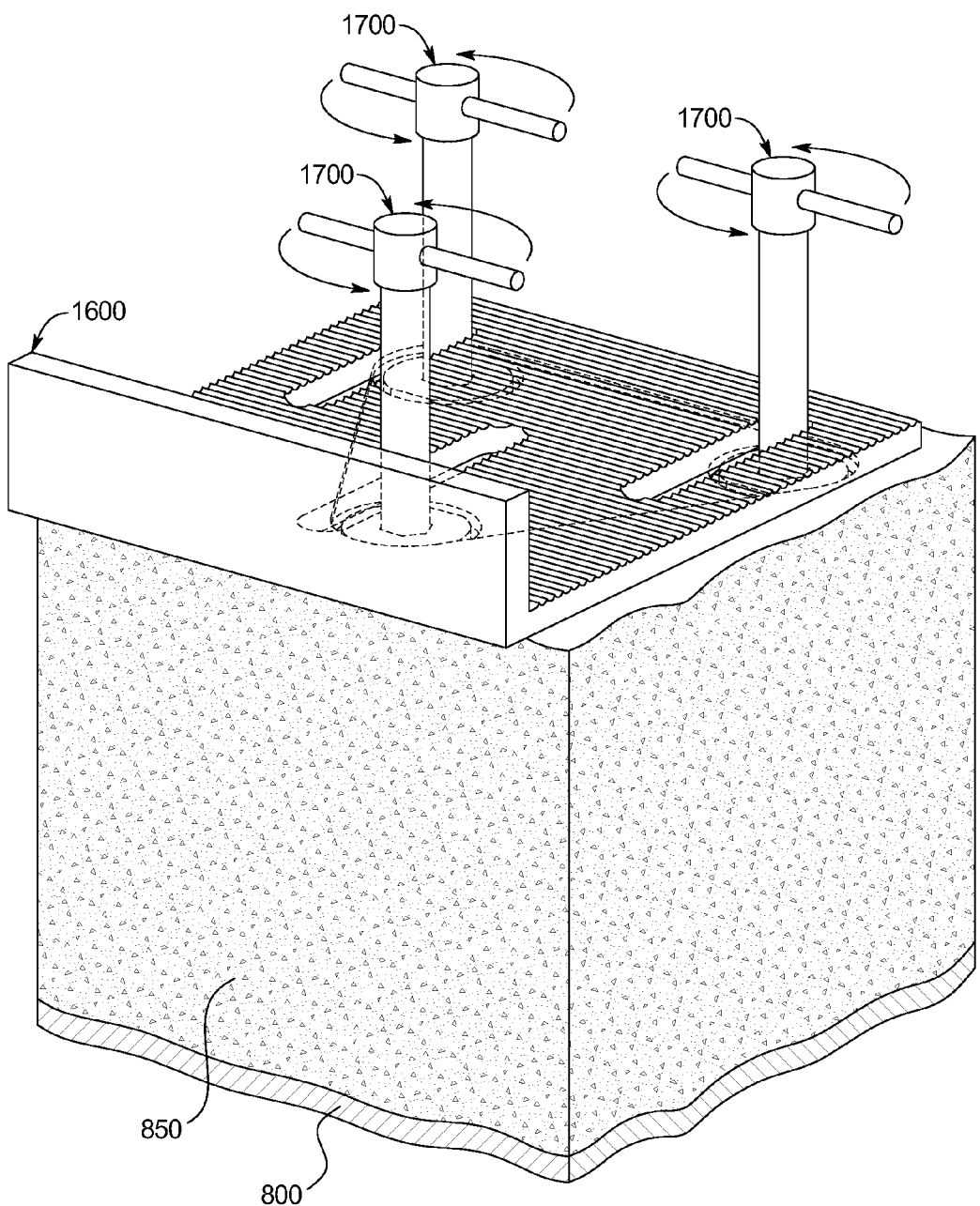

As shown in FIG. 17F, at this point the panel bracket 1600 is not level and it not at a desired elevation. More specifically, at this point, the left end of the panel bracket 1600 (as viewed from the orientation shown in FIG. 17F) is higher than the right end of the panel bracket 1600 (as viewed from the orientation shown in FIG. 17F). As shown in FIGS. 17G and 17H, to level and bring the panel bracket 1600 to the desired elevation in this illustrated embodiment, the user: (a) inserts the leveler engager 1730 of the leveler adjuster 1700 into the opening defined through the leveler 1300b such that the leveler engager 1730 engages the inner surface 1323 of the leveler 1300b, and (b) rotates the lever adjuster counterclockwise. This causes the leveler 1300b to unscrew from the leveler receiver 1120 of the base 1110 of the anchor 1100b, which causes the leveler 1300b to rise and push the panel bracket 1600 upward. This process is repeated for the leveler 1300c and the leveler 1300a, until the panel bracket 1600 is level and at the desired elevation.

Figure 17I:
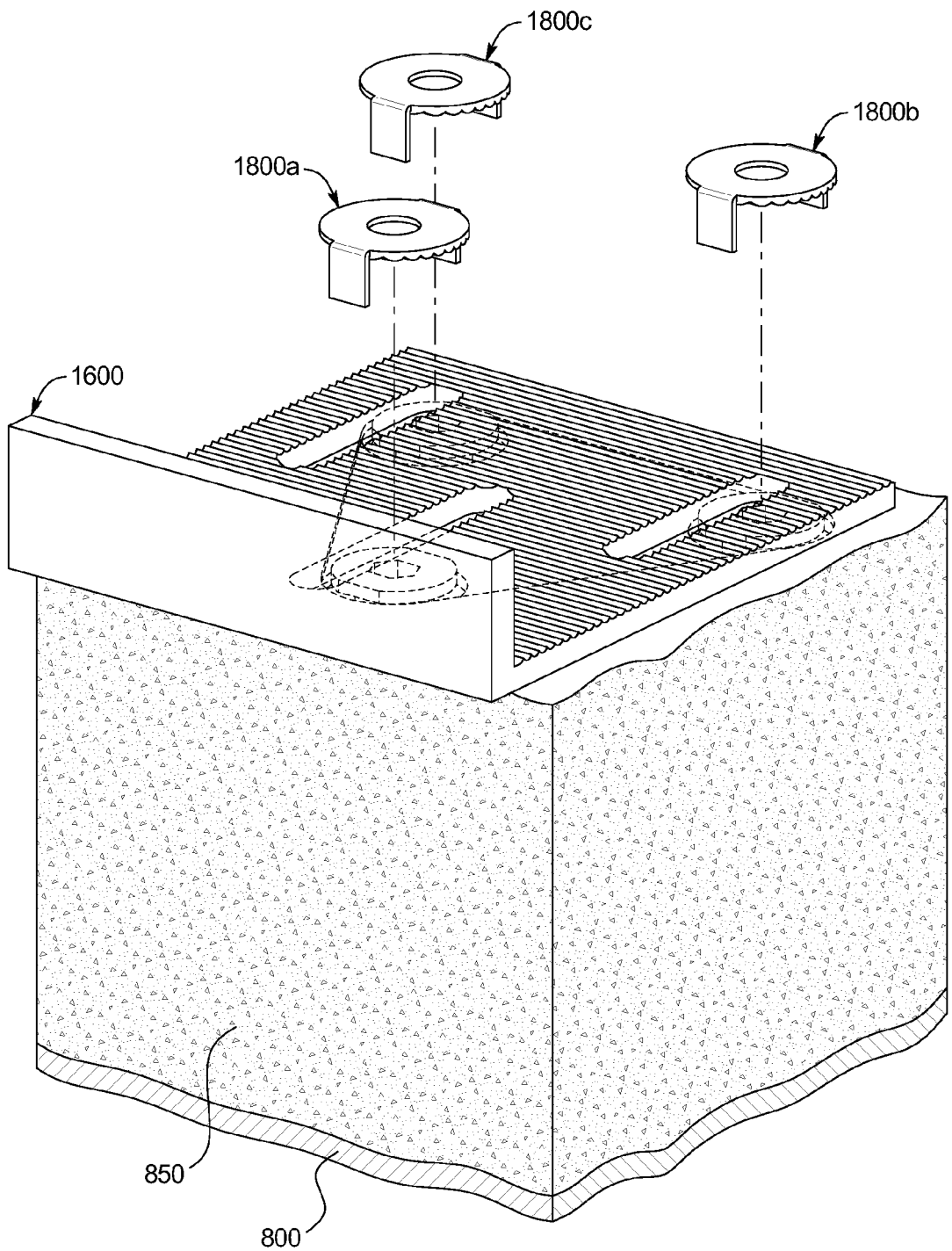

As shown in FIG. 17I, once the panel bracket 1600 is level and at the desired elevation, the user: (a) installs the leveler rotation preventer 1800a such that the locking tabs 1820 and 1830 enter the mounting slot defined by the surface 1620a and engage the flat faces of the leveler head 1310 of the leveler 1300a; (b) installs the leveler rotation preventer 1800b such that the locking tabs 1820 and 1830 enter the mounting slot defined by the surface 1620b and engage the flat surfaces of the leveler head 1310 of the leveler 1300b; and (c) installs the leveler rotation preventer 1800c such that the locking tabs 1820 and 1830 enter the mounting slot defined by the surface 1620c and engage the flat surfaces of the leveler head 1310 of the leveler 1300c. It should be appreciated that the engagement of the locking tabs with the flat faces of the leveler heads of the levelers prevents the levelers from rotating (and, therefore, raising or lowering) relative to the anchors and potentially altering the level of the panel bracket. It should also be appreciated that once the leveler rotation preventers are installed, the teeth of the leveler rotation preventers engage and interlock with the teeth of the panel bracket, which prevents the panel bracket from sliding relative to the anchors.

Figure 17J:
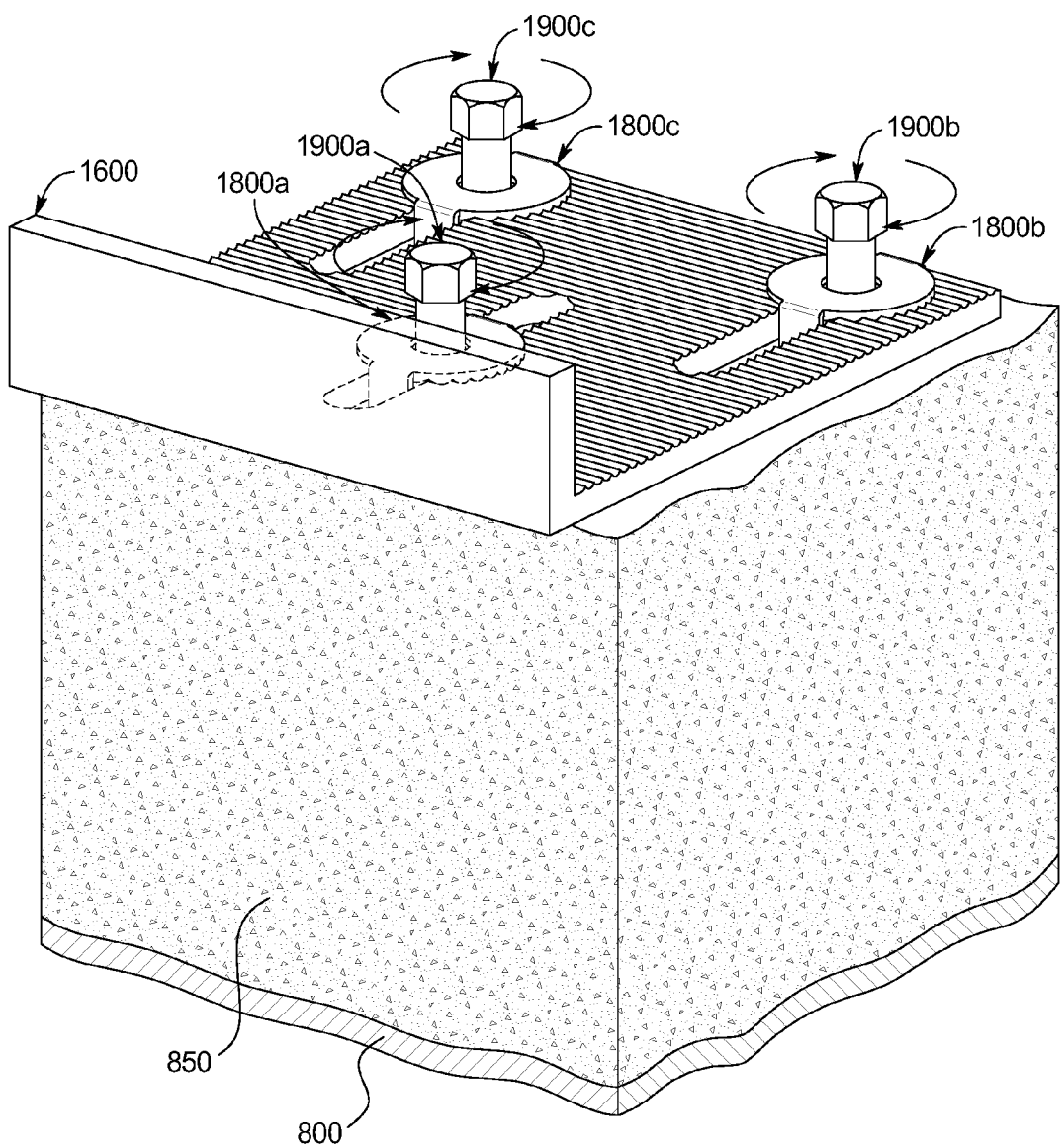
Figure 17K:
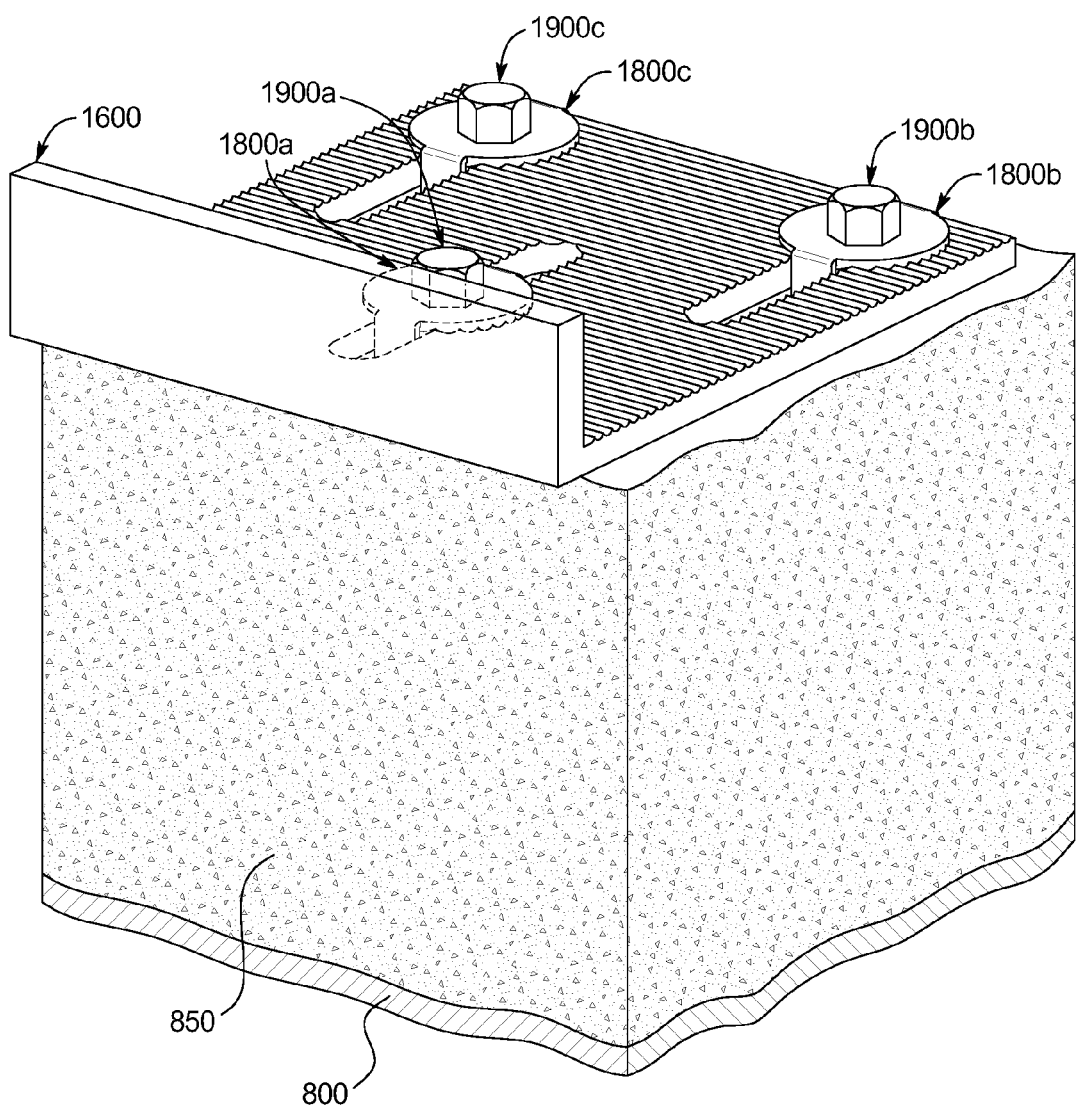

As shown in FIG. 17J, the user: (a) inserts the bolt 1900a through the openings defined through the leveler rotation preventer 1800a and the leveler 1300a and threads the bolt into the fastener receiver 1130 of the anchor body 1110 of the anchor 1100a, (b) inserts the bolt 1900b through the openings defined through the leveler rotation preventer 1800b and the leveler 1300b and threads the bolt into the fastener receiver 1130 of the anchor body 1110 of the anchor 1100b, and (c) inserts the bolt 1900c through the openings defined through the leveler rotation preventer 1800c and the leveler 1300c and threads the bolt into the fastener receiver 1130 of the body 1110 of the anchor 1100c. As shown in FIG. 17K, the user tightens the bolts 1900a, 1900b, and 1900c to secure the panel bracket 1600 to the anchors 1100a, 1100b, and 1100c of the anchor array.

Figure 18A:
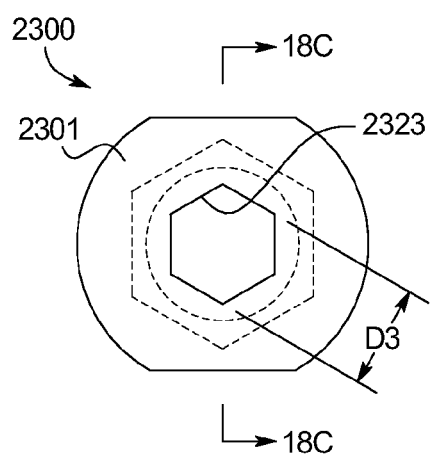
FIG. 18A is a top plan view of another embodiment of the leveler.
Figure 18B:
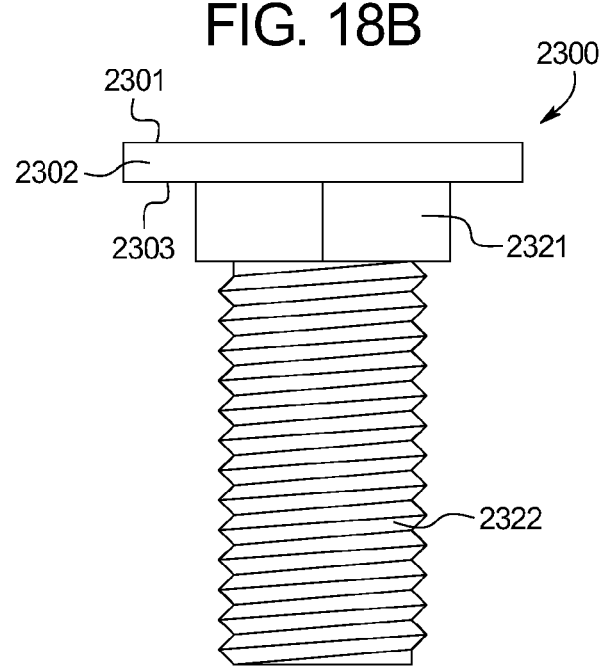
FIG. 18B is a side elevational view of the leveler of FIG. 18A.
Figure 18C:
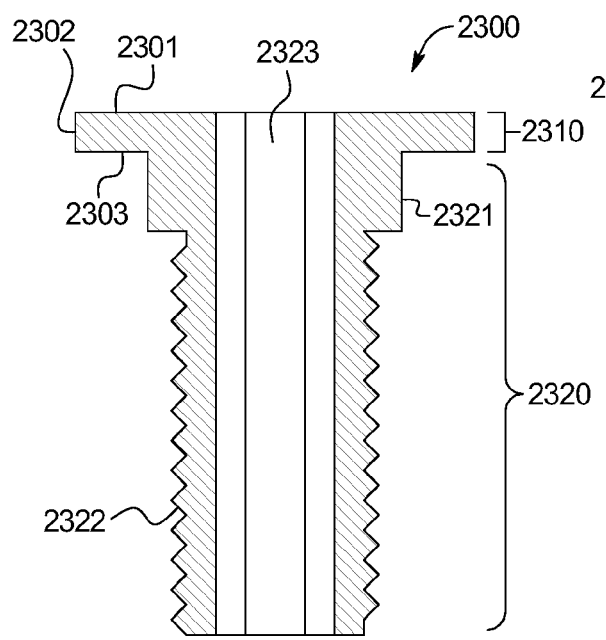
FIG. 18C is a cross-sectional view of the leveler of FIG. 18A taken substantially along line 18C-18C of FIG. 18A.

FIGS. 18A, 18B, 18C, and 18D illustrate another embodiment of the leveler 2300. In this embodiment, the leveler 2300 includes a leveler head 2310 and a leveler body 2320 extending therefrom. The leveler head 2310 is defined by: (a) an upper surface 2301, (b) an outer surface 2302, (c) a lower surface 2303, and (d) an inner surface 2323. The leveler body 2320 is defined by: (a) an outer surface 2321 having a hexagonal profile, (b) a generally cylindrical outer surface 2322, and (b) the inner surface 2323. As best shown in FIG. 18C, the lower surface 2303 of the leveler head 2310 connects to the hexagonal outer surface 2321 of the leveler body 2320, which itself connects to the generally cylindrical outer surface 2322 of the leveler body 2320.

It should be appreciated that the hexagonal outer surface 2321 of the leveler body 2320 of the leveler 2300 in this illustrated embodiment is sized such that a wrench (such as a standard-sized wrench) or other suitable tool may be employed to engage the hexagonal outer surface 2321 and rotate the leveler 2300 relative to the anchor into which it is threaded. In other words, a user may use a tool to engage the hexagonal outer surface of the leveler body to rotate and raise or lower the leveler instead of using the leveler adjuster 1700 described above. This is particularly useful when the user desires to adjust the height of the leveler head of the leveler after partially threading the fastener into the fastener receiver of the anchor. In these instances, the user does not have to completely remove the bolt and the leveler rotation preventer to adjust the height of the leveler head of the leveler. Rather, the user simply partially unscrews the bolt, lifts the leveler rotation preventer such that the locking tabs no longer engage the leveler head of the leveler, and rotates the leveler as desired.

Figure 18D:
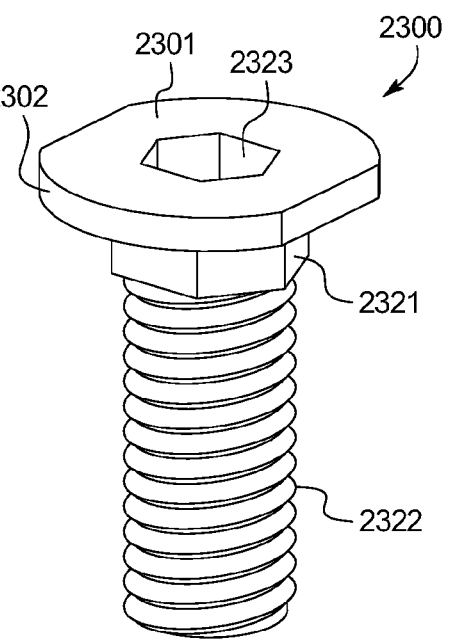
FIG. 18D is a perspective view of the leveler of FIG. 18A.
Figure 19A:
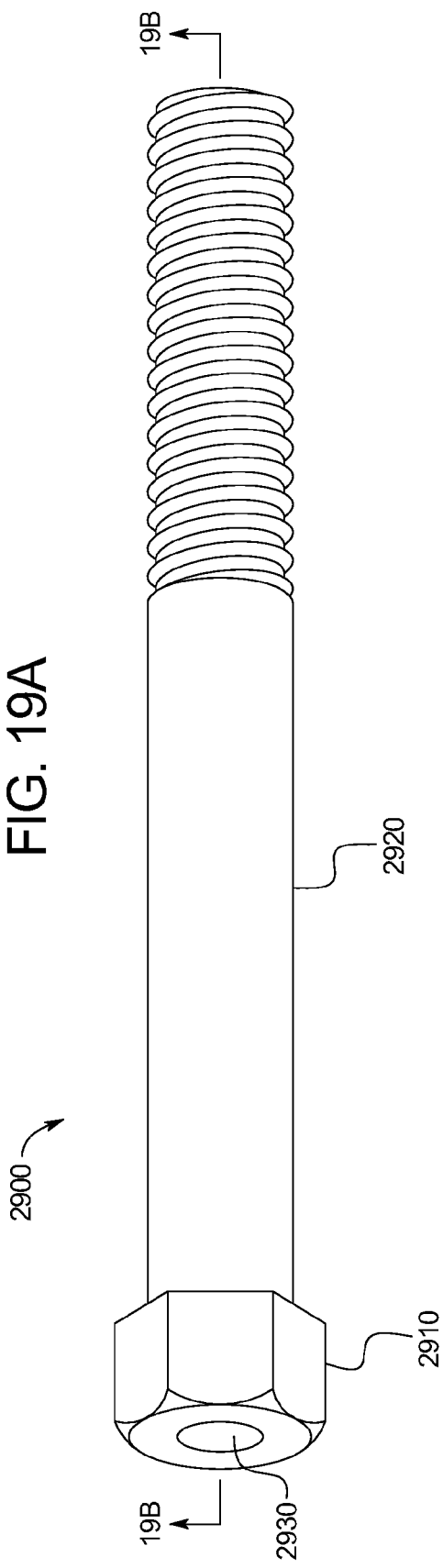
FIG. 19A is a perspective view of another embodiment of the threaded fastener.
Figure 19B:
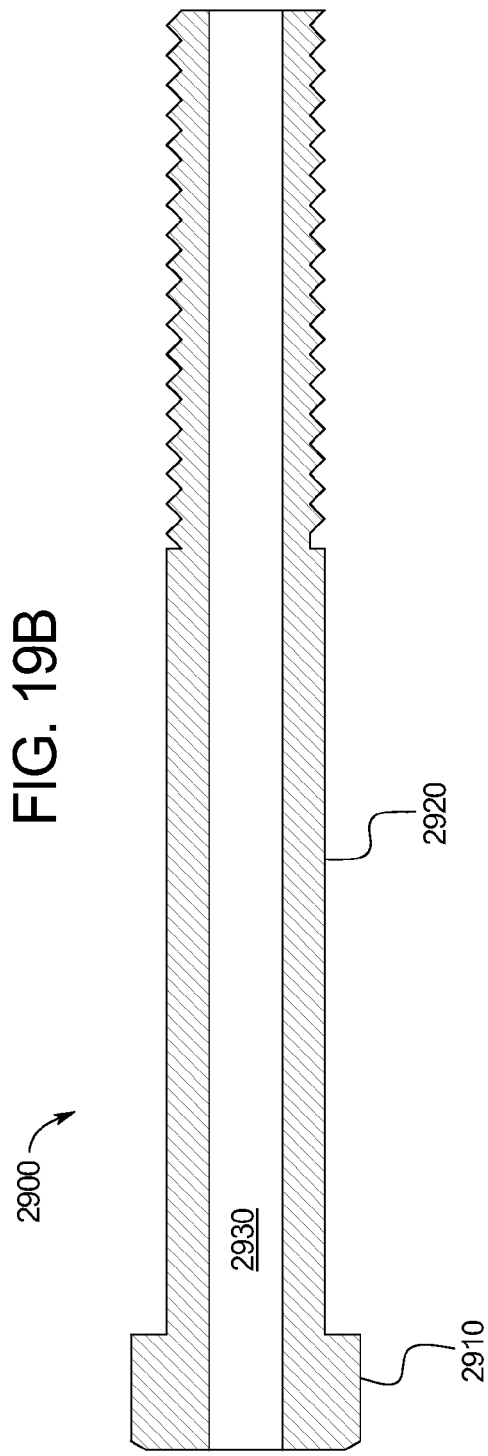
FIG. 19B is a cross-sectional view of the threaded fastener of FIG. 19A taken substantially along line 19B-19B of FIG. 19A.
Figure 20A:
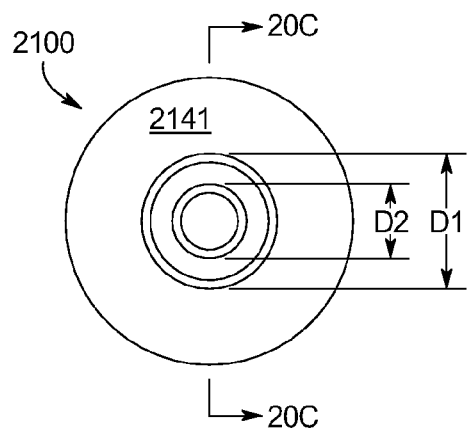
FIG. 20A is a top plan view of another embodiment of the anchor.
Figure 20B:
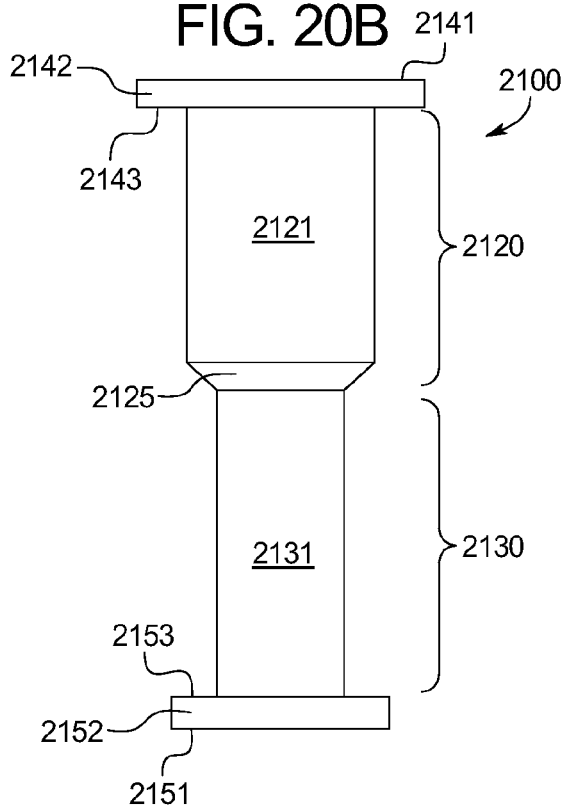
FIG. 20B is a side elevational view of the anchor of FIG. 20A.
Figure 20C:
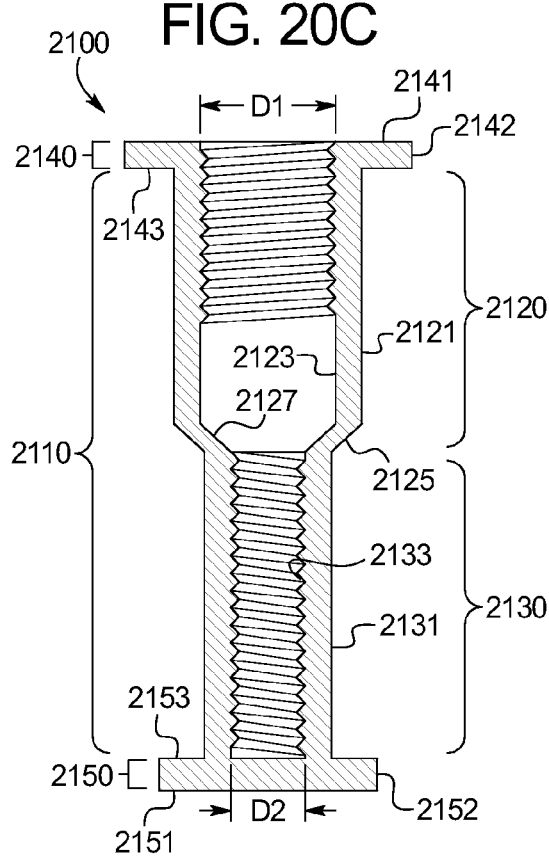
FIG. 20C is a cross-sectional view of the anchor of FIG. 20A taken substantially along line 20C-20C of FIG. 20A.
Figure 20D:
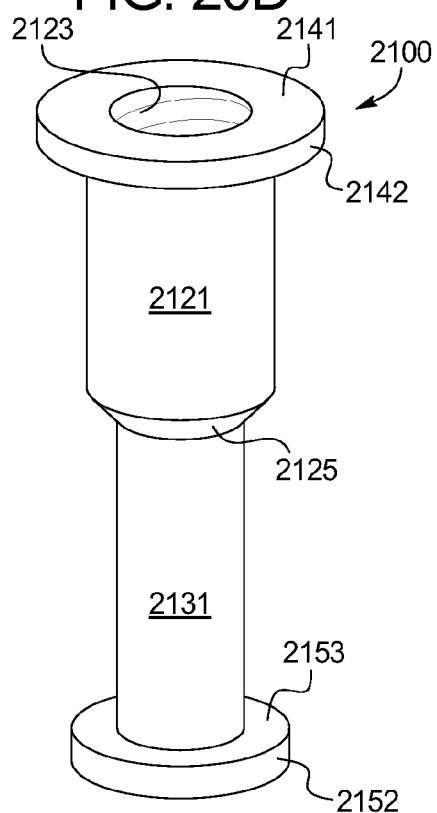
FIG. 20D is a perspective view of the anchor of FIG. 20A.
Figure 21A:
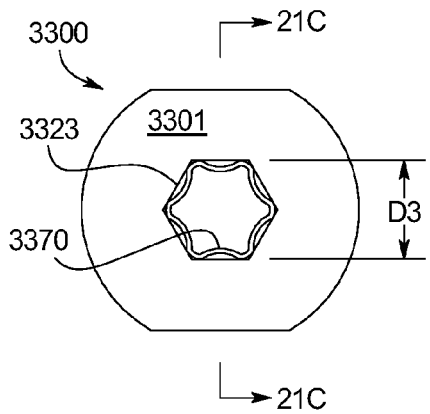
FIG. 21A is a top plan view of another embodiment of the leveler.
Figure 21B:
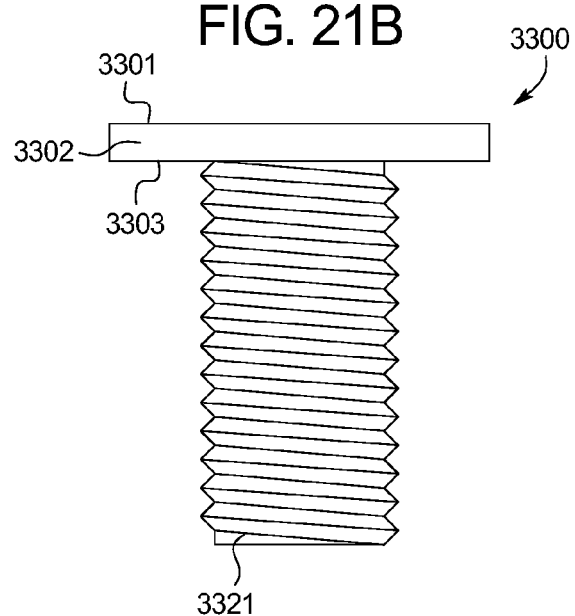
FIG. 21B is a side elevational view of the leveler of FIG. 21A.
Figure 21C:
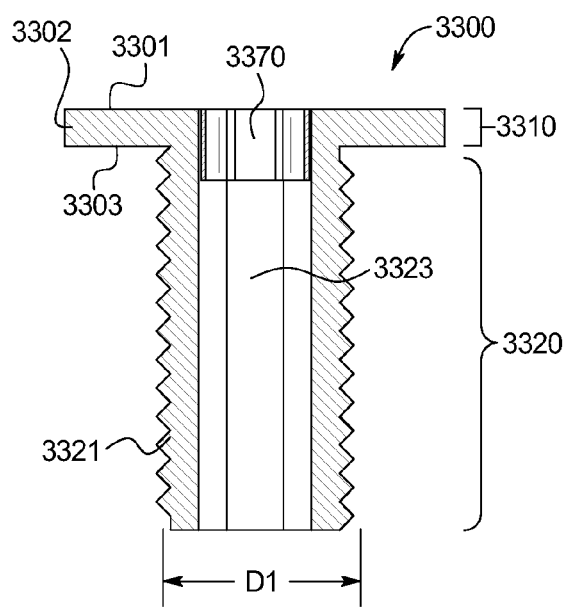
FIG. 21C is a cross-sectional view of the leveler of FIG. 21A taken substantially along line 21C-21C of FIG. 21A.
Figure 21D:
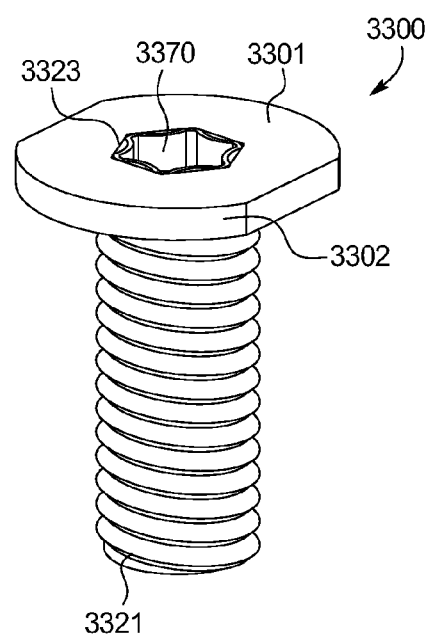
FIG. 21D is a perspective view of the leveler of FIG. 21A.

As best shown in FIGS. 18A and 18D, the outer profile of the leveler head 2310 is similar to that shown in FIGS. 9A to 9D and described above. As best shown in FIGS. 18A and 18C, the inner surface 2323 has a hexagonal profile formed by six generally rectangular faces similar to those shown in FIGS. 9A to 9D and described above. In this illustrated embodiment the outer surface 2322 of the leveler body 2320 has the diameter D1 and is threaded such that the leveler 2300 may be threaded into (and out of) the leveler receiver of an anchor (described above).

FIGS. 19A, 19B, 19C, and 19D illustrate another embodiment of the bolt 2900. In this embodiment, the bolt 2900 includes: (a) a bolt head 2900; (b) a generally cylindrical, partially threaded bolt body 2920; and (c) a generally cylindrical inner surface 2930 defining a cylindrical opening through the bolt head 2910 and the bolt body 2920 and, therefore, through the bolt 2900. This opening enables any water that may be present within the anchor into which the bolt 2900 is threaded to evaporate after a user threads the bolt into the fastener receiver of the anchor. A cap or other filler (not shown) may be used to cover the opening to prevent debris from entering the opening once sufficient time has elapsed since installation to enable any water to evaporate.

FIGS. 20A to 20D and 21A to 21D illustrate alternative embodiments of an anchor 2100 and a leveler 3300. These embodiments of the anchor 2100 and the leveler 3300 are used together in the embodiment described below.

Turning to FIGS. 20A, 20B, 20C, and 20D, the anchor 2100 includes an anchor body 2110 extending between a first or upper flange 2140 and a second or lower flange 2150, as described in detail above with respect to FIGS. 7A to 7D. In this embodiment, however, the inner surface 2123 of the leveler receiver 2120 is partially threaded with left handed threads such that the leveler receiver 2120 may threadably receive the leveler 3300, which is also threaded with left handed threads (described below). Additionally, in this illustrated embodiment, the inner surface 2133 of the fastener receiver 2130 is threaded with right handed threads such that the fastener receiver 2130 may threadably receive a fastener, such as a bolt 1900 (described above), that is threaded with right handed threads. In another embodiment, the inner surface of the leveler receiver is partially threaded with right handed threads (to threadably receive a leveler threaded with right handed threads) and the inner surface of the fastener receiver is threaded with left handed threads (to threadably receive a fastener threaded with left handed threads)

Turning to FIGS. 21A, 21B, 21C, and 21D, the leveler 3300 includes a leveler head 3310 and a leveler body 3320 extending therefrom, as described above with respect to FIGS. 9A to 9D. In this embodiment, the leveler 3300 includes a fastener ring 3370. The fastener ring 3370 is generally hexagonal, and is positioned and secured within the hexagonal opening defined through the leveler 3300 proximate the top surface 3301 of the leveler head 3310. The fastener ring 3370 is sized and shaped such that there is frictional interference between the outer surface of the bolt body 1920 of the bolt 1900 and the fastener ring 3370 when the bolt 1900 is inserted into the opening defined through the leveler 3300.

This frictional interference enables a user to use the bolt 1900 itself to rotate and raise or lower the leveler 3300 relative to the anchor in which it is threaded. For example, in this illustrated embodiment, to raise the leveler 3300 the user inserts the bolt 1900 through the fastener ring 3370 (without engaging the threaded portion of the fastener receiver 2130 of the anchor 2100) and rotates the bolt 1900 clockwise. The frictional interference between the outer surface of the bolt body 1920 of the bolt 1900 causes the leveler 3300 to rotate (and rise) along with the bolt 1900. This process is reversed to lower the leveler 3300. Once the leveler 3300 is at a desired elevation, the user removes the bolt 1900, positions the panel bracket and the leveler rotation preventer, pushes the bolt 1900 through the fastener ring 3370 until the bolt 1900 engages the threaded portion of the fastener receiver 2130 of the anchor 2100, and threads the bolt 1900 into the fastener receiver 2130 to secure the panel bracket.

It should be appreciated that the use of opposing threads for the leveler receiver and the fastener receiver causes the leveler to rise, if necessary, to fill any additional space between the leveler head of the leveler and the bottom surface of the panel bracket. It should also be appreciated that the use of the fastener ring eliminates the need for the leveler adjuster 1700 to adjust the leveler.

Figure 22A:
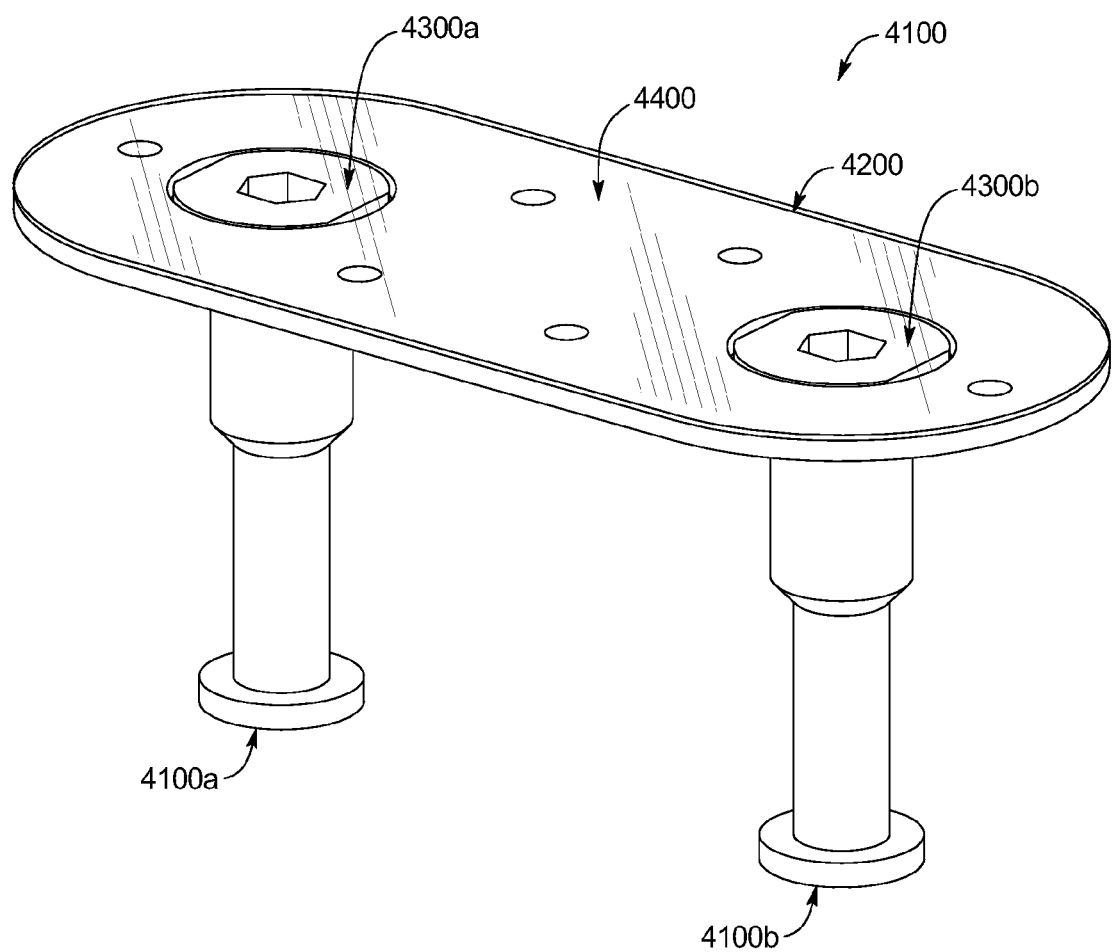
FIG. 22A is a perspective view of another embodiment of the anchor assembly in an assembled configuration.

FIG. 22A illustrates a top perspective view of another embodiment of the anchor assembly, which is generally indicated by numeral 4000, in an assembled configuration and FIG. 22B illustrates the anchor assembly 4000 in an exploded configuration. This embodiment of the anchor assembly is employed for front-of-slab mounting.

The anchor assembly 4000 includes the following components, each of which is described in detail below: (a) an anchor array 4050 including a plurality of anchors 4100*a* and 4100*b* and an anchor connector 4200 that is attached to and connects each of the anchors 4100*a* and 4100*b* to one another; (b) a plurality of threaded levelers 4300*a* and 4300*b* threadably received by the anchors 4100*a* and 4100*b*, respectively; and (c) a protective cover 4400 that is removably attached to the anchor connector 4200 and each of the levelers 4300*a* and 4300*b*.

Turning to FIGS. 23A, 23B, 23C, and 23D, each anchor 4100 includes an anchor body 4110 extending between a first or upper flange 4140 and a second or lower flange 4150, as described in detail above with respect to FIGS. 7A to 7D. In this illustrated embodiment, the anchor connector 4200 is generally rectangular with rounded edges and includes: (a) a plurality of curved surfaces 4210*a* and 4210*b* positioned at opposite ends of the anchor connector 4200 and defining anchor access openings therethrough; and (b) a plurality of fastener receiving openings 4220*a*, 4220*b*, 4220*c*, 4220*d*, 4220*e*, and 4220*f* defined therethrough.

Figure 23A:
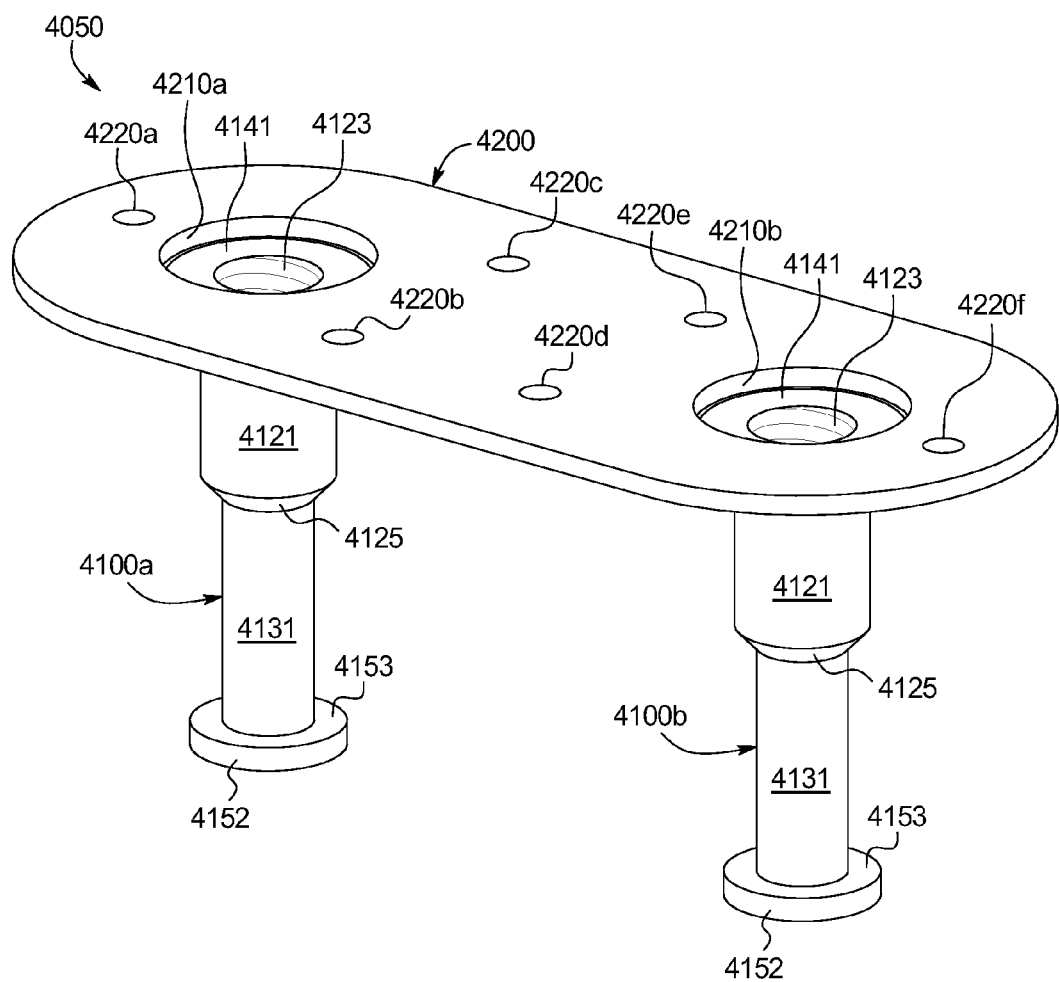
FIG. 23A is a perspective view of an anchor array of FIGS. 22A and 22B.
Figure 23D:
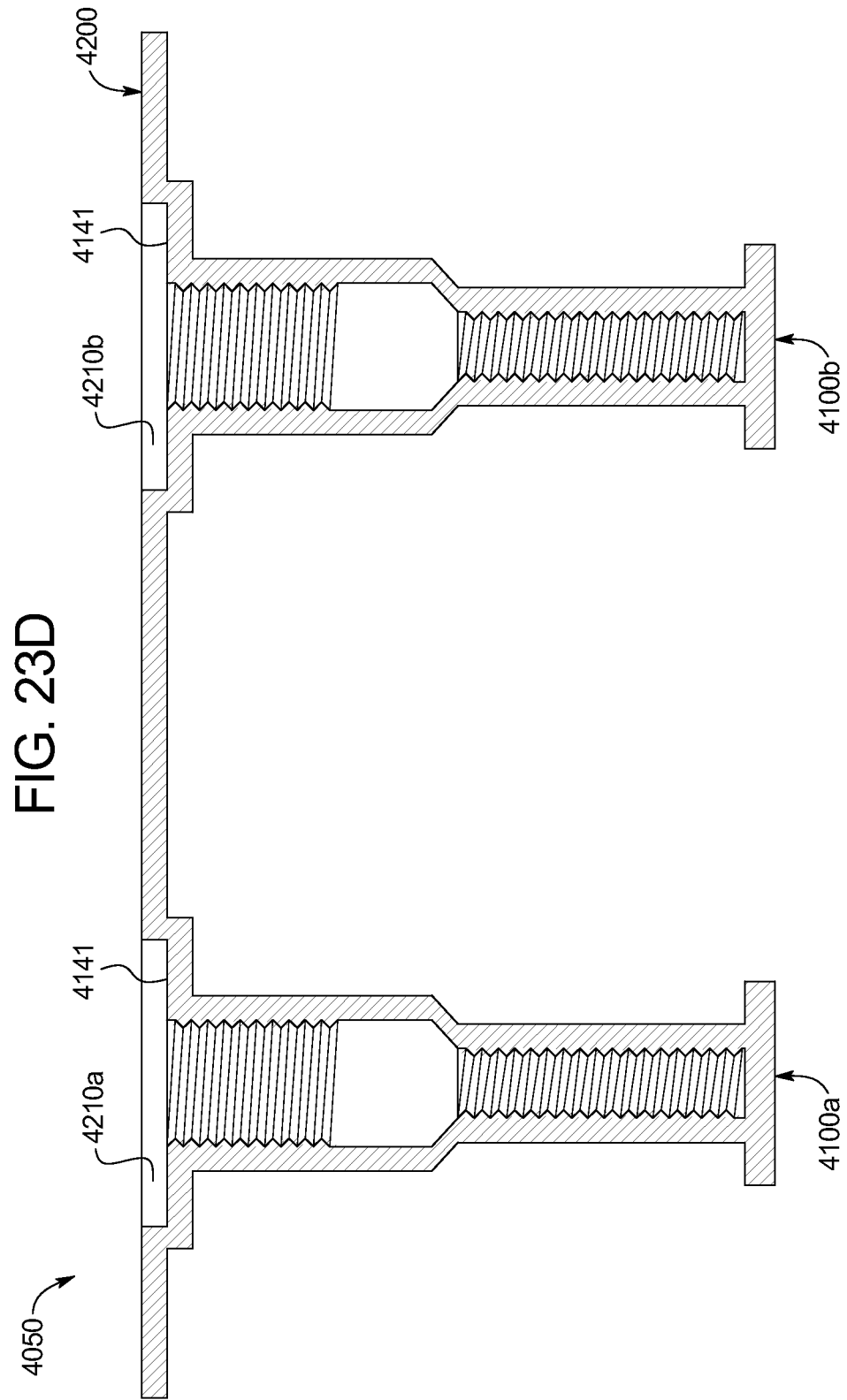
FIG. 23D is a cross-sectional view of the anchor array of FIG. 23A taken substantially along line 23C-23C of FIG. 23B.

As best shown in FIGS. 23C and 23D, the upper surface of the upper flange of each anchor is welded or otherwise attached to the lower surface of the anchor connector proximate one of the anchor access openings such that that anchor and that anchor access opening are substantially coaxial. As best shown in FIG. 22A, the anchor connector 4200 has a thickness substantially the same as the leveler head of the leveler such that the upper surface of the leveler head of the leveler and the upper surface of the anchor connector are substantially flush relative to one another when the leveler is completely threaded into the leveler receiver of the anchor, which facilitates flush face mounting of the anchor assembly 4000.

Figure 24A:
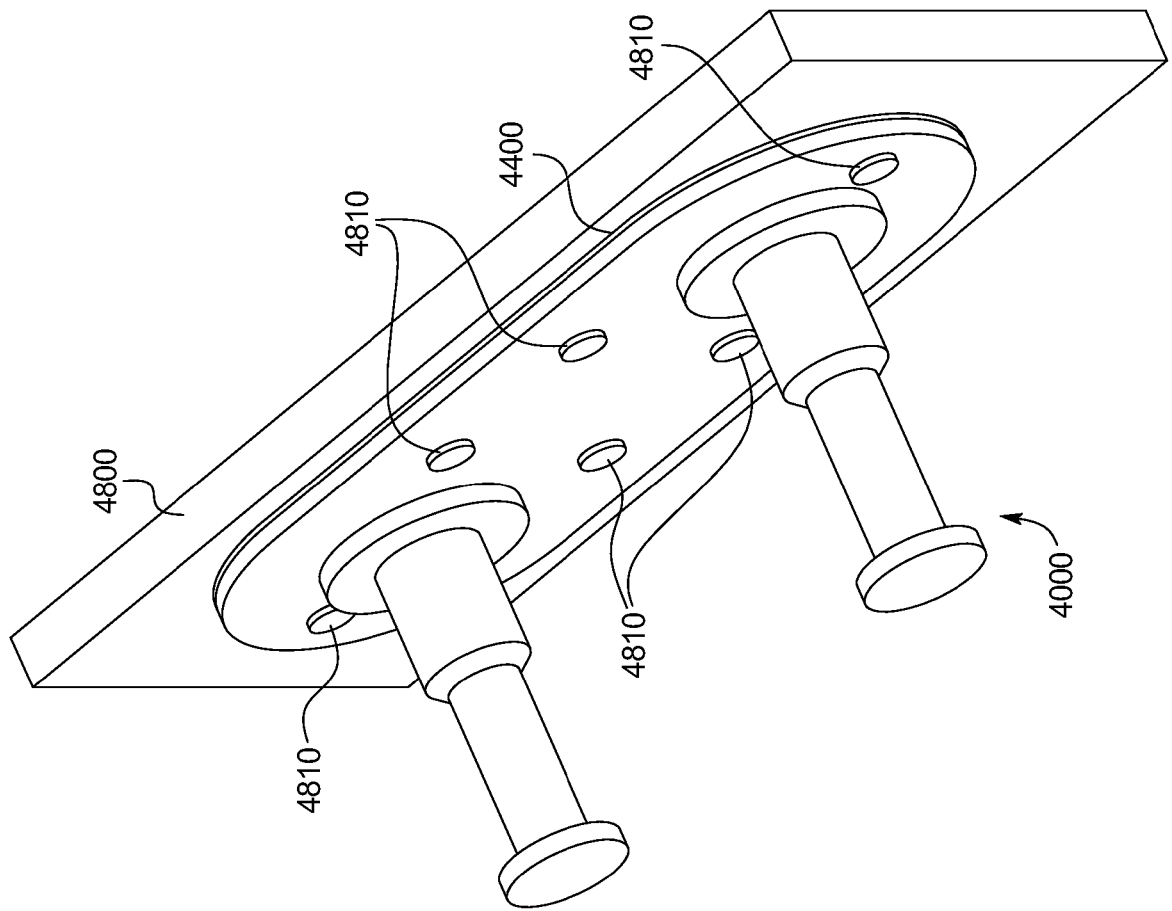
FIGS. 24A, 24B, and 24C illustrate a process by which the anchor assembly of FIGS. 22A and 22B is cast in concrete.
Figure 24B:
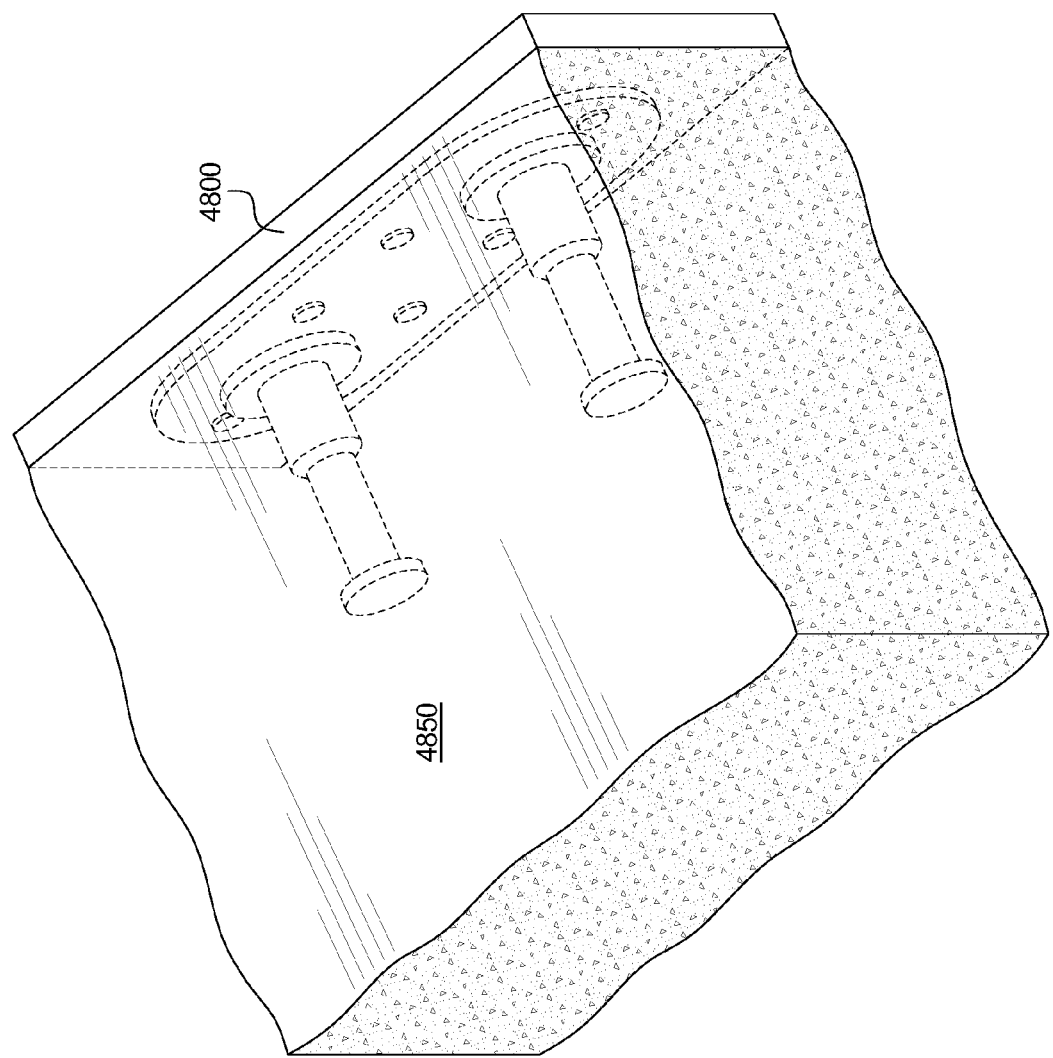
Figure 24C:
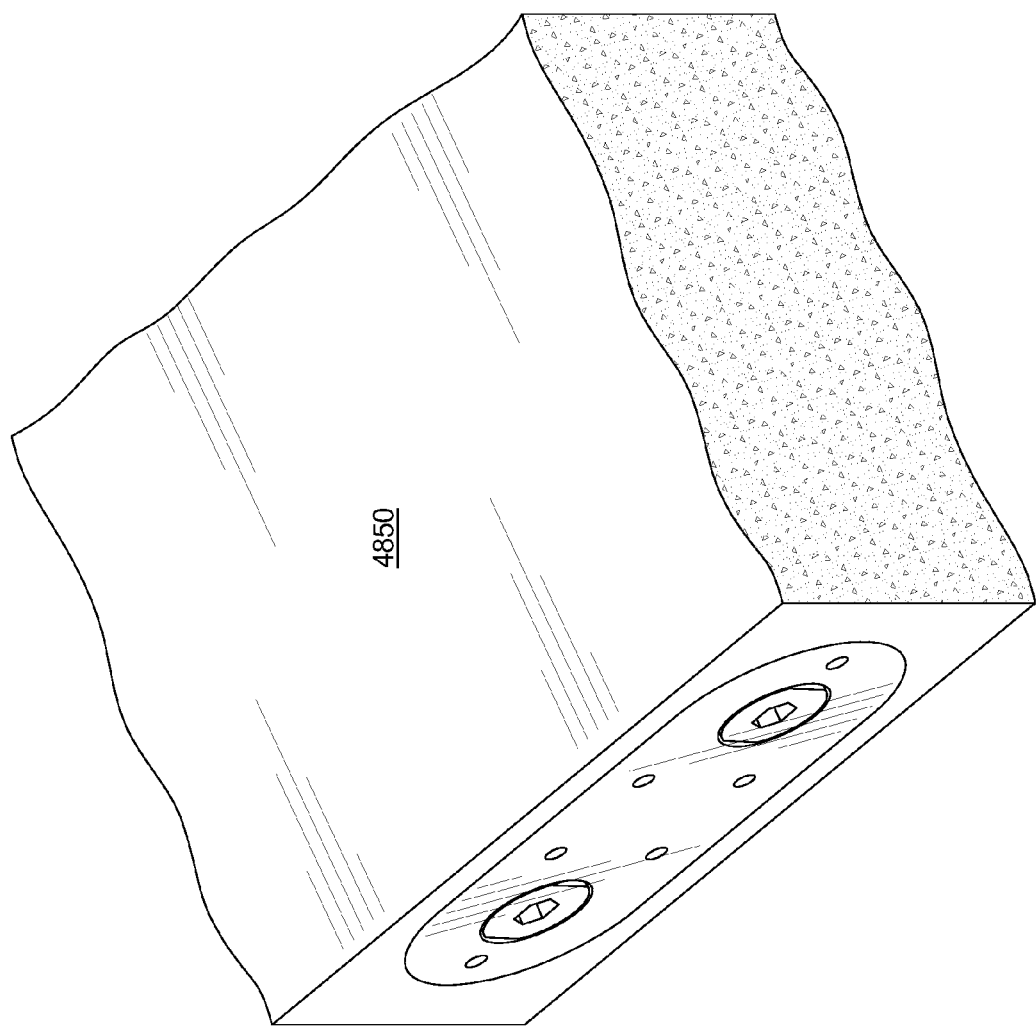

FIGS. 24A to 24C illustrate a process by which the anchor assembly 4000 is cast in concrete. It should be appreciated that this is one suitable example, and that the present disclosure contemplates a variety of additional processes employing the components described herein.

As shown in FIG. 24A, a user positions the anchor assembly 4000 at a desired location on a concrete form 4800 and secures the anchor assembly 4000 to the concrete form by inserting fasteners (such as nails 4810) through the fastener receiving openings 4220*a*, 4220*b*, 4220*c*, 4220*d*, 4220*e*, and 4220*f*. As shown in FIG. 24B, concrete 4850 is then poured to a desired depth. It should be appreciated that during pouring the protective cover 4400 prevents the concrete 4850 from entering the openings defined through the levelers 4300*a* and 4300*b*. As shown in FIG. 24C, after the concrete 4850 is cured, the user removes the concrete form 4800 to expose the levelers 4300*a* and 4300*b*. At this point the user may remove the protective cover 4400 and mount a panel bracket to the anchors, as described above.

In another embodiment, the inner surface of the leveler is threaded such that the inner surface of the leveler can threadably receive a fastener. In one such embodiment, the leveling anchors do not include a fastener receiver. That is, in this embodiment, the panel bracket is secured by threading the fasteners into the corresponding levelers, which are themselves threaded into the leveler receivers of the anchors and prevented from rotating by the leveler rotation preventers. Thus, in this embodiment, the fasteners are not directly threaded into the anchors. In another such embodiment, the levelers include fastener receivers. That is, in this embodiment, the panel bracket is secured by threading the fasteners into the corresponding fastener receivers and the corresponding levelers. Thus, in this embodiment, the fasteners are directly threaded into both the anchors and the levelers.

This embodiment of the panel bracket leveling system including the anchor assembly with levelers solves certain of the above-described problems. First, this embodiment of the panel bracket leveling system eliminates the need to manually shim each individual panel bracket, which eliminates: the time required to sift through a variety of shims to pick the proper shim(s) for the job, the time and labor (and associated cost) required to manually insert the shim(s) to level the panel bracket, the need to maintain an inventory of shims, and the need to (in certain instances) purchase custom shims. Second, this embodiment of the panel bracket leveling system enables installers of different skill levels to more consistently level panel brackets, which reduces the potential for improper installation and compromised panel brackets and curtain wall panels. Third, the variable adjustment of the levelers of this embodiment of the panel bracket leveling system enables a wide range of adjustment, unlike shims that enable a comparatively smaller range of adjustment.

Fourth, the elimination of shims increases the speed at which each panel bracket is installed and leveled, which reduces construction time and labor costs. Fifth, the elimination of shims eliminates the need to weld stacks of shims together in certain instances. Sixth, the elimination of shims significantly reduces the likelihood of the mounting bolts bending over time. Seventh, unlike shims, the levelers of this embodiment of the panel bracket leveling system enable future level adjustments. Eighth, unlike shims, the levelers of this embodiment of the panel bracket leveling system are unlikely to shift in areas where seismic activity occurs.

The components described herein may be made from any suitable materials and by any suitable process. In certain embodiments, the components described herein are made from the same material, while in other embodiments at least two of the components described herein are made from different materials. In one embodiment, the components described herein made of aluminum. In another embodiments, the components are made of steel (such as stainless steel). In one embodiment, each of the components is made of the same material, while in another embodiment at least two of the components are made of different materials.

It should be appreciated that while the leveling systems described herein are employed to level panel brackets, the leveling systems described herein may be employed to level any suitable object or objects, such as columns, light poles, telephone poles, and heating, ventilation, and air conditioning (HVAC) components.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A leveling system comprising:
an anchor including a leveler receiver and a fastener receiver connected to and extending from the leveler receiver, the leveler receiver and the fastener receiver having different inner diameters;
a leveler threadably receivable by the leveler receiver, wherein the leveler defines a passage therethrough that is sized such that at least part of a fastener can pass through the passage; and
a locking device engageable to the leveler when the leveler is partially threaded into the leveler receiver to prevent the leveler from substantially rotating relative to the anchor.

2. The leveling system of claim 1, wherein the inner diameter of the leveler receiver is greater than the inner diameter of the fastener receiver.

3. The leveling system of claim 1, wherein the leveler receiver and the fastener receiver are coaxial.

4. The leveling system of claim 1, wherein the leveler receiver and the fastener receiver are integrally formed.

5. The leveling system of claim 1, wherein the leveler is threadably receivable by the leveler receiver such that, when the leveler is threadably received by the leveler receiver and a bracket is positioned atop the leveler, rotation of the leveler in a first direction causes the bracket to move further from the anchor and rotation of the leveler in a second opposite direction causes the bracket to move closer to the anchor.

6. The leveling system of claim 1, wherein the leveler includes a leveler head and a leveler body connected to and extending from the leveler head.

7. The leveling system of claim 6, wherein when the leveler is partially threaded into the leveler receiver and the locking device engages the leveler to prevent the leveler from substantially rotating relative to the anchor, an underside of the leveler head is vertically spaced apart from the leveler receiver.

8. The leveling system of claim 1, wherein the fastener receiver includes an external annular flange.

9. A leveling system comprising:
an anchor connector;
a plurality of anchors connected to the anchor connector, each anchor including a leveler receiver and a fastener receiver connected to and extending from the leveler receiver, the leveler receiver and the fastener receiver having different inner diameters;
a plurality of levelers, each leveler threadably receivable by the leveler receiver of one of the plurality of anchors, wherein each leveler defines a passage therethrough that is sized such that at least part of a fastener can pass through said passage; and
a plurality of locking devices, each locking device engageable to one of the plurality of levelers when said leveler is partially threaded into the leveler receiver of one of the plurality of anchors to prevent said leveler from substantially rotating relative to said one of the plurality of anchors.

10. The leveling system of claim 9, wherein, for each of at least one anchor, the inner diameter of the leveler receiver of said anchor is greater than the inner diameter of the fastener receiver of said anchor.

11. The leveling system of claim 9, wherein, for each of at least one anchor, the leveler receiver of said anchor and the fastener receiver of said anchor are coaxial.

12. The leveling system of claim 9, wherein, for each of at least one anchor, the leveler receiver of said anchor and the fastener receiver of said anchor are integrally formed.

13. The leveling system of claim 9, wherein, for each leveler, said leveler is threadably receivable by the leveler receiver of said one of the plurality of anchors such that, when said leveler is threadably received by the leveler receiver of said one of the plurality of anchors and a bracket is positioned atop said leveler, rotation of said leveler in a first direction causes the bracket to move further from said one of the plurality of anchors and rotation of said leveler in a second opposite direction causes the bracket to move closer to said one of the plurality of anchors.

14. The leveling system of claim 9, wherein, for each of at least one leveler, said leveler includes a leveler head and a leveler body connected to and extending from the leveler head.

15. The leveling system of claim 14, wherein, for each of the at least one leveler, when said leveler is partially threaded into the leveler receiver of said one of the plurality of anchors and one of the plurality of locking devices engages said leveler to prevent said leveler from substantially rotating relative to said anchor, an underside of the leveler head of said leveler facing said anchor is vertically spaced apart from the leveler receiver.

16. The leveling system of claim 9, wherein the fastener receiver of at least one anchor includes an external annular flange.

17. The leveling system of claim 9, wherein at least one anchor is removably connected to the anchor connector.

18. The leveling system of claim 9, which includes a cover removably attachable to the plurality of levelers.

19. A leveling system comprising:
an anchor connector;
a first anchor connected to the anchor connector, the first anchor including a first leveler receiver and a first fastener receiver connected to and extending from the first leveler receiver, the first leveler receiver and the first fastener receiver having different inner diameters;
a second anchor connected to the anchor connector, the second anchor including a second leveler receiver and a second fastener receiver connected to and extending from the second leveler receiver, the second leveler receiver and the second fastener receiver having different inner diameters;
a first leveler threadably receivable by the first leveler receiver, the first leveler defining a first passage therethrough that is sized such that at least part of a first fastener can pass through said first passage;
a first locking device engageable to the first leveler when the first leveler is partially threaded into the first leveler receiver to prevent the first leveler from substantially rotating relative to the first anchor;
a second leveler threadably receivable by the second leveler receiver, the second leveler defining a second passage therethrough that is sized such that at least part of a second fastener can pass through said second passage; and
a second locking device engageable to the second leveler when the second leveler is partially threaded into the second leveler receiver to prevent the second leveler from substantially rotating relative to the second anchor.

20. The leveling system of claim 19, wherein at least one of the first and second anchors is removably connected to the anchor connector.

21. The leveling system of claim 19, which includes a cover that is removably attachable to at least one of the first leveler and the second leveler.

22. The leveling system of claim 21, wherein the first leveler includes a first leveler head, the second leveler includes a second leveler head, and the cover is removably attachable to the first and second leveler heads.

23. The leveling system of claim 19, which includes a third anchor connected to the anchor connector, the third anchor including a third leveler receiver and a third fastener receiver connected to and extending from the third leveler receiver, the third leveler receiver and the third fastener receiver having different inner diameters;
a third leveler threadably receivable by the third leveler receiver, the third leveler defining a third passage therethrough that is sized such that at least part of a third fastener can pass through said third passage; and
a third locking device engageable to the third leveler when the third leveler is partially threaded into the third leveler receiver to prevent the third leveler from substantially rotating relative to the third anchor.

24. The leveling system of claim 23, wherein the first, second, and third anchors are arranged in a triangular configuration.

* * * * *